United States Patent [19]
Ozawa et al.

[11] Patent Number: 5,910,544
[45] Date of Patent: Jun. 8, 1999

[54] THERMOPLASTIC ELASTOMER COMPOSITION AND PROCESS FOR PRODUCTION THEREOF AND LOW PERMEABILITY HOSE USING THE SAME

[75] Inventors: Osamu Ozawa; Tetsuji Kawazura; Noriaki Kuroda; Yoshihiro Aoyagi; Jiro Watanabe; Gou Kawaguchi, all of Kanagawa, Japan

[73] Assignee: The Yokohama Rubber Co., Ltd., Tokyo, Japan

[21] Appl. No.: 08/860,251

[22] PCT Filed: Nov. 1, 1996

[86] PCT No.: PCT/KP96/03215

§ 371 Date: Jun. 25, 1997

§ 102(e) Date: Jun. 25, 1997

[87] PCT Pub. No.: WO97/16485

PCT Pub. Date: May 9, 1997

[30] Foreign Application Priority Data

| Nov. 2, 1995 | [JP] | Japan | 7-286168 |
| Nov. 21, 1995 | [JP] | Japan | 7-303022 |
| Jul. 12, 1996 | [JP] | Japan | 8-183683 |
| Jul. 23, 1996 | [JP] | Japan | 8-193545 |
| Jul. 23, 1996 | [JP] | Japan | 8-210492 |

[51] Int. Cl.$^6$ ..................................................... C08F 8/30
[52] U.S. Cl. ................................... 525/178; 525/179
[58] Field of Search ..................................... 525/178, 179

[56] References Cited

U.S. PATENT DOCUMENTS 5,591,551  1/1997  Audett ........................................ 430/18

FOREIGN PATENT DOCUMENTS

| 1-135846 | 5/1989 | Japan. |
| 1-213357 | 8/1989 | Japan. |
| 4-108838 | 4/1992 | Japan. |
| 4-202247 | 7/1992 | Japan. |
| 5-507303 | 10/1993 | Japan. |

*Primary Examiner*—Terressa Mosley
*Attorney, Agent, or Firm*—Finnegan, Henderson, Farabow, Garrett & Dunner, L.L.P.

[57] ABSTRACT

A thermoplastic elastomer composition comprising:
i) from 15 to 80 parts by weight of a polyamide thermoplastic resin as component A;
ii) from 20 to 85 parts by weight of a rubber composition as component B, the rubber composition containing a copolymer rubber composed of a copolymer of a $C_4$ to $C_7$ isomonoolefin and a p-alkylstyrene, where at least a part of the p-alkylstyrene unit portions thereof have a halogen atom; and
iii) a cross-linking agent,
wherein the thermoplastic resin component A forms a continuous phase and at least part of component B is dispersed in component A as a dispersed phase and at least part of the dispersed phase is cross-linked by the cross-linking agent.

20 Claims, 6 Drawing Sheets

EFFECT OF T-DIE EXTRUSION SPEED FOR
THERMOPLASTIC ELASTOMER FILM EXTRUSION

○ X−IPMS+H−NBR／N6.66 (CM6001) =50／50
△ X−IPMS／N11／N6.66 (CM6001) =60／29／11
□ X−IPMS／N11／N6.66 (CM6041) =60／29／11
▽ X−IPMS／N11／PET=59／29／12
◇ X−IPMS／N11／MXD6=59／29／12

5,910,544

THERMOPLASTIC ELASTOMER COMPOSITION AND PROCESS FOR PRODUCTION THEREOF AND LOW PERMEABILITY HOSE USING THE SAME

TECHNICAL FIELD

The present invention relates to the field of art of a thermoplastic elastomer composition superior in, for example, resistance to gas and moisture permeation, flexibility, and suited for hoses for the transport of a refrigerant, such as fluorocarbon gases and for the transport of a fuel such as gasoline, light oil, and of a process for producing the same and also relates to the field of art of low permeability hoses using this thermoplastic elastomer composition. The present invention further relates to a thermoplastic elastomer composition having an excellent flexibility and resistance to gas permeation which enables the elastomer component to be made the discontinuous phase and the thermoplastic resin component to be made the continuous phase and further which enables achievement of a high elastomer component ratio, more particularly relates to a low permeability hose which makes the hose inner tube or other gas barrier layer thinner to lighten the weight of the same by using the above thermoplastic elastomer composition as the gas barrier layer. The present invention further relates to a thermoplastic elastomer resin composition comprising a rubber/matrix thermoplastic resin/gas barrier thermoplastic resin which, in addition to flexibility, vastly enhances the gas barrier property by controlling the morphology of the low permeability thermoplastic resin composition (gas barrier thermoplastic resin) layer, whereby the air (gas) barrier layer in the hose can be made thinner and can considerably reduce the weight, and to a process for the production of such a composition. The present invention further relates to a functional thermoplastic elastomer composition which comprises a thermoplastic resin component as its continuous phase and an elastomer component as its dispersed face wherein at least partially cross-linked thermoplastic composition imparts the inherent rubber elasticity function and further the desired functionalities (e.g., adhesiveness, antistatic property, barrier property, UV absorption, and biocompatibility), a process for its production, and a hose using that functional thermoplastic elastomer composition.

BACKGROUND ART

In recent years, as is well known, there have been increasingly stronger calls for reduction of the weight of the hoses used for fluorocarbon gases etc. and the hoses used for transporting fuels using low molecular weight hydrocarbon compounds.

However, use of hoses which have been processed to prevent permeation of the refrigerant or fuel as the hoses for transport of refrigerants or for transport of fuels is important in terms of environmental protection. The important properties which the materials used for such applications should have are a superior gas barrier property and moisture barrier property with respect to Freon gas, hydrocarbon gas, etc., an excellent flexibility, a superior heat resistance, and a high rate of retention of physical properties when heated.

For example, in the above various applications in automobile air-conditioners etc. in the past chlorofluorocarbons (CFCs), which is one type of fluorocarbon gas, are used as the refrigerant. However, as is well known in the art, fluorocarbons are problematical in that they cause destruction of the ozone layer, global warming, and other destruction of the environment. Therefore, use of certain types of fluorocarbons has been prohibited and alternative fluorocarbons such as hydrofluorocarbons (HFCs) not containing chlorine have come into use. These alternative fluorocarbons are less destructive to the ozone layer, but remain problematical in terms of global warming, and therefore, hoses for transport of refrigerants are still required to have a superior gas barrier property to prevent the refrigerant gas from being discharged to the outside.

On the other hand, if the moisture barrier property of hoses is low, moisture will pass through the hoses into the refrigerant and causes freezing. The ice will become a cause of breakdowns in the apparatus such as ending up breaking the compressor etc. Further, if a hose does not have excellent flexibility, there will be the problem that it will not be able to absorb the vibration of the apparatus, noise, etc. Further, it will not be able to be freely laid in the apparatus or between apparatuses. Further, if a rigid hose is forcibly bent to install it, problems will occur in the durability of the hose.

In the past, as a low permeability hose, a hose of an inner tube made of nitrile rubber (NBR) and an outer cover made of chloroprene rubber (CR) is used, but in recent years this has been shifting to hoses which satisfy the above important properties, that is, low permeability hoses which have an inner tube of a double layer construction and have as the inner layer of the inner tube a polyamide thermoplastic resin layer superior in gas barrier property.

The properties sought for such low permeability hoses will be explained in more detail below:

(1) Reduction of Permeation of, for example, Fluorocarbon Gases, Hydrocarbon Gases Low permeability hoses have been developed for the purpose preventing environmental pollution and destruction of the ozone layer caused by dispersion into the air of gas permeating from the inside of hoses by basically reducing the amount of leakage of gas of conventional rubber hoses (for example, hoses having NBR inner tubes and CR outer covers) and in particular have been developed for elimination of maintenance, that is, making the replacement cycle for gas 10 years in the case of hoses for transporting refrigerants.

The leakage amount of conventional rubber hose had in general been 20 to 25 gf/m/72 hr (at 100° C.) (gas leakage for 72 hours) and the refrigerant replacement cycle had been about two years. Therefore, to eliminate maintenance for 10 years, it is necessary to decrease the amount of gas leakage to 5 gf/m/72 hr (at 100° C.) or less. Therefore, even with the above HFC, it is necessary to achieve the above values in order to eliminate the maintenance.

Further, the refrigerant used in the past had mainly been dichlorodifluoromethane (hereinafter, referred to as CFC 12), but in recent years, the less ozone layer destructive trifluoromonofluoroethane (hereinafter referred to as HFC134a) has appeared as one alternative. Therefore, even if using HFC134a as a refrigerant, due to the above-mentioned reasons, it is necessary to decrease the amount of gas leakage to 5 gf/m/72 hours (100° C.) or less.

(2) Flexibility of Hoses

Low permeability hoses are meant for the transport of refrigerant, fuel, etc., but at the same time play important roles in absorbing the vibration of the portions where they are connected, for example, the compressors and coolers, and therefore, flexibility is also requested. Conventional rubber hoses have had the flexibility for achieving this purpose, therefore hoses which have been improved in gas barrier property as well have been required to have a flexibility equivalent to that of conventional rubber hoses, that is, a bending force or flexural stress of not more than 3.0 kgf, preferably not more than 2.0 kgf.

(3) Prevention of Leakage at Metal Parts

A low permeability hose, for example, connects between the above compressor, cooler, and other apparatuses by affixing the two ends of the hose to them by metal fittings etc. so as to secure the connections to the apparatuses and to prevent leakage of the refrigerant etc. If the rate of retention of physical properties of the hoses at the connection parts when heating is low, the initial stress applied to the connection parts will be reduced by the heat during the use thereof causing a rapid decline in the residual stress and leakage of the refrigerant etc. from the connection parts. Therefore a low permeability hose is required to have a high rate of retention of stress at the time of heating.

As such a low permeability hose, there is known a low permeability hose having as an inner layer of the inner tube a polyamide thermoplastic resin layer and forming the outer layer of the inner tube and the outer cover by rubber. This hose satisfies the above properties and is superior functionally too, but requires a vulcanization process and has other problems resulting in high manufacturing costs.

As a hose for solving this problem, there has been proposed a low permeability hose having an inner tube of a single tube formed by a polyamide thermoplastic resin or other material with a superior gas barrier property and having an outer cover formed by a fluoro resin or other thermoplastic resin material superior in moisture barrier property which has few manufacturing steps and does not require cross-linking, and therefore, is low in manufacturing cost, but this hose is poor in flexibility and further has a low resistance to softening when heated, and therefore suffers from leakage at connections with metal and cannot be put to practical use.

To solve this problem, there is known a hose using a thermoplastic elastomer composed of a thermoplastic resin such as a polyolefin thermoplastic resin, polyvinyl chloride thermoplastic resin, polyamide thermoplastic resin, polyester thermoplastic resin, in which a cross-linked rubber has been dispersed (see Japanese Unexamined Patent Publication (Kokai) No. 6-64102). However, this thermoplastic elastomer cannot easily provide the desired properties in terms of the balance of the gas barrier property and flexibility, and therefore, cannot easily be used in practice for the desired hose applications.

In this way, there are not now known any low permeability hoses having the desired properties and functions and low in manufacturing cost.

A composition composed of thermoplastic resin/ thermoplastic resin blends such as a high density polyethylene thermoplastic resin and nylon 6 or nylon 66 (HDPE/ PA6,66), polyethylene terephthalate and aromatic nylon (PET/MDX6), polyethylene terephthalate and vinylalcohol-ethylene copolymer (PET/EVOH), which, by molding, results in one of the thermoplastic resins forming a layer and thereby providing a double layer to give a low gas permeation performance (gas barrier performance) and a process for its production are already known from Isao Hata: Polymers, 40(4), p. 244 (1991) etc. Further, the technique of using a rubber/thermoplastic resin blend composed of a specific modified butyl rubber/thermoplastic resin for a material for a low permeability hose was also already proposed by the present inventors (Japanese Patent Application No. 7-286168), but this material, while superior in flexibility, did not have a sufficient gas barrier property.

That is, the material for forming the gas barrier layer used for the inner tube of a hose etc. is required to have flexibility and a gas barrier property, but no material has yet be presented which has both of these properties.

A thermoplastic elastomer composition which is composed of a thermoplastic resin component as a continuous phase and an elastomer component as a dispersed phase and in which at least part of the elastomer component is cross-linked (vulcanized), has the rubber elasticity performance derived from the elastomer component which has generally been cross-linked in the past, and, due to the thermoplastic resin component forming the continuous phase, can be thermoplastically molded at a high temperature where it melts and becomes fluid, it is known.

That is, a thermoplastic elastomer composition having this dispersed structure has the characteristic of enabling processing by processing techniques similar to those of plastics while maintaining the properties of a vulcanized rubber.

Therefore, the above elastomer composition has the following basic advantages compared with vulcanized rubber:

(1) The vulcanization process is not required.

(2) The recycle of the products and the scrap produced during the processing are possible.

(3) The lighten in the weight is possible.

Among these, in particular, a thermoplastic elastomer composition where part or all of the elastomer component forming the dispersed phase is cross-linked (vulcanized) with the thermoplastic resin forming the continuous phase during the kneading (or mixing), that is, is dynamically cross-linked (vulcanized), can in particular give a product superior in the mechanical physical properties of a rubber elastomer, resistance to compression set, and resistance to oil and can be used, instead of conventional rubber, for auto parts, building materials, medical equipments, general industrial materials, etc.

The above thermoplastic elastomer composition for a low permeability hose use, when used for the hose inner tube or part of the outer cover, has an excellent gas barrier property and flexibility as well and further the lightness of weight can be extremely improved as well, but in the same way, with this thermoplastic elastomer alone, there is a problem of insufficient adhesiveness in the case of making a double layer structure with a reinforcing layer or if necessary another rubber material.

That is, as explained above, a thermoplastic elastomer composition where a thermoplastic resin component is used as the continuous phase and an elastomer component is used as the dispersed phase wherein the thermoplastic elastomer composition has rubber elasticity, is flexible, and can be thermoplastically processed and, further, enables the control of the air permeability or gas permeability is known. Further, a thermoplastic resin composition which can have formed integrally inside it a layer having a gas barrier property is known as well. Still, a thermoplastic elastomer composition having a rubber elasticity can be thermoplastically processed, and which can have formed integrally outside with a layer having the functions necessary for bonding has still not been known before.

DISCLOSURE OF INVENTION

An object of the present invention is to solve the above problems in the prior art and to provide a thermoplastic elastomer composition which has a superior gas barrier property and moisture barrier property and an excellent flexibility in a good balance, a process for its production, and also a hose using the thermoplastic elastomer composition.

Another object of the present invention is to provide a low permeability hose which is made in response to the needs of industry and satisfies the various properties sought for a low permeability hose, is light in weight, and does not require a vulcanization process, so is lower in manufacturing cost.

Still another object of the present invention is to provide a thermoplastic elastomer composition having a high elastomer ratio and where the thermoplastic resin component can be made a matrix phase, and therefore, which is excellent in flexibility and superior in gas barrier property and to provide a low permeability hose which satisfies the various properties sought for a low permeability hose, is light in weight, and does not require a vulcanization process, so is lower in manufacturing cost.

Still another object of the present invention, in view of the above situation, is to provide a thermoplastic elastomer composition which is made in response to the demands of industry and has, in addition to flexibility, a gas barrier property, whereby the gas barrier film used in the above hoses can be made thinner and the lighter weight of the same can be contributed.

Still another object of the present invention is to provide a functional thermoplastic elastomer composition imparting, in addition to the inherent properties of various thermoplastic elastomer compositions, various functionalities (bonding, anti-static property, barrier property, UV blocking, and biocompatibility) and further to provide a process for production giving a composition having the functions integrally, while maintaining the performance of the above thermoplastic elastomer material, by just processing with an existing apparatus by further blending in a small amount of a functional thermoplastic resin component and to provide a hose using a thermoplastic elastomer composition having adhesiveness as such a function.

That is, in accordance with a first aspect of the present invention, there is provided a thermoplastic elastomer composition comprising 15 to 80 parts by weight of a polyamide thermoplastic resin (component A), 20 to 85 parts by weight of a rubber composition (component B) containing a copolymer rubber composed of a copolymer rubber of a copolymer of a $C_4$–$C_7$ isomonoolefin and p-alkylstyrene wherein a part of the p-alkylstyrene unit portion has a halogen atom, and a cross-linking agent, wherein at least a part of the above component B is dispersed in the above component A and at least a part of the dispersed phase is cross-linked.

Further, in accordance with the present invention, there is provided a process for production of a thermoplastic elastomer composition comprising.

mixing 15 to 80 parts by weight of a polyamide thermoplastic resin (component A) and 20 to 85 parts by weight of a rubber composition (component B) containing a copolymer rubber containing a copolymer rubber composed of a copolymer of a $C_4$ to $C_7$ isomonoolefin and p-alkylstyrene, where a part of the p-alkylstyrene unit portion has a halogen atom, at least at the melting temperature of the above component A, then adding a cross-linking agent during the mixing to cross-link the above component B and thereby give a thermoplastic elastomer composition wherein at least a part of the above component B is dispersed in the above component A and at least a part of a dispersed phase is cross-linked.

Further, in accordance with the present invention, there is provided a hose which has at least an inner tube, reinforcing layer, and outer cover, wherein at least part of the inner tube and/or outer cover is formed by the above thermoplastic elastomer composition of the present invention.

In accordance with a second aspect of the present invention, there is provided a thermoplastic elastomer composition for a low permeability hose comprising (i) a rubber component composed of at least one bromide of a copolymer of a $C_4$ to $C_7$ isomonoolefin and a p-alkylstyrene having a p-alkylstyrene content of 5.5 to 25% by weight and a halogen content of at least 1.0% by wight and also a Mooney viscosity $ML_{1+8}$ (125° C.) of at least 30 and (ii) a thermoplastic resin component comprised of at least one thermoplastic resin with a gas permeation coefficient of not more than 2 mg·mm/24 hr·cm² mixed in a ratio by weight of the rubber component/thermoplastic resin component of 10/90 to 85/15, where at least part of the thermoplastic resin component (ii) forms a continuous phase and at least part of the rubber component (i) forms a dispersed phase.

In accordance with a third aspect of the present invention, there is provided a thermoplastic elastomer composition comprising (A) at least one thermoplastic resin component having an air permeation coefficient of not more than $25 \times 10^{-12}$ cc·cm/cm²·sec·cmHg and (B) at least one elastomer component having an air permeation coefficient of not more than $1.0 \times 10^{-10}$ cc·cm/cm²·sec·cmHg, where the melt viscosity ($\eta_m$) of the above thermoplastic resin component (A), the melt viscosity ($\eta_d$) of the above elastomer component (B), and the difference in solubility parameters of the elastomer component (A) and the thermoplastic resin component (B) at the kneading or mixing temperature satisfy the relation of the following formula (1) and where the elastomer component (B) is the discontinuous phase and the thermoplastic resin component (A) is the continuous phase.

$$\frac{a|\Delta SP|+b}{\phi_m} < \frac{\eta_d}{\eta_m} \quad (1)$$

(wherein, $\Delta SP$: difference in solubility parameters of elastomer component (B) and thermoplastic resin component (A)

$\Phi_m$: volume fraction of thermoplastic resin component (A)

a=–0.0518, b=0.90)

In accordance with the present invention, further, there is provided a thermoplastic elastomer composition comprising (A) at least one thermoplastic resin component having a gas permeation coefficient of not more than 5.0 mg·mm/24 hr·cm² and (B) at least one elastomer component having a gas permeation coefficient of not more than 30.0 mg·mm/24 hr·cm² where the melt viscosity ($\eta_m$) of the above thermoplastic resin component (A), the melt viscosity ($\eta_d$) of the above elastomer component (B), and the difference in solubility parameters of the elastomer component (A) and the thermoplastic resin component (B) at the kneading temperature satisfy the relation of the following formula (1):

$$\frac{a|\Delta SP|+b}{\phi_m} < \frac{\eta_d}{\eta_m} \quad (1)$$

wherein, $\Delta SP$: difference in solubility parameters of elastomer component (B) and thermoplastic resin component (A)

$\Phi_m$: volume fraction of thermoplastic resin component (A)

a=–0.0518, b=0.90, and where the elastomer component (B) is the discontinuous phase and the thermoplastic resin component (A) is the continuous phase.

Further, in accordance with the present invention, there is provided a low permeability hose using the above thermoplastic elastomer composition for a gas barrier layer.

In accordance with the present invention, in the thermoplastic elastomer composition, by setting the ratios of melt viscosities of the elastomer component (B) and the thermoplastic resin component (A) and the relationship between the ΔSP value and the volume fraction of the thermoplastic resin component (A) to satisfy the above formula (1), it is possible to achieve a high elastomer ratio and to make the thermoplastic resin component (A) the matrix phase.

In accordance with a fourth aspect of the present invention, there is provided a low permeability thermoplastic elastomer composition composed of a thermoplastic elastomer having a thermoplastic resin composition as the continuous phase and a rubber composition as the dispersed phase in which is contained a barrier thermoplastic resin composition, the low permeability thermoplastic elastomer composition having a phase structure where the above barrier thermoplastic resin composition is dispersed in the form of flat in the above thermoplastic elastomer.

In accordance with the present invention, there is further provided a low permeability thermoplastic elastomer composition where the volume fractions and the melt viscosities of the above thermoplastic elastomer with the thermoplastic resin composition as the continuous phase and the rubber composition as the dispersed phase and the above barrier thermoplastic resin composition satisfy the following formula (2) and formula (3):

$$\eta_d / \eta_m > 3.0 \tag{2}$$

$$\alpha = \frac{\phi_d}{\phi_m} \times \frac{\eta_m}{\eta_d} < 1.0 \tag{3}$$

where, $\Phi_d$: volume fraction of barrier thermoplastic resin composition $\eta_d$: melt viscosity of barrier thermoplastic resin composition $\Phi_m$: volume fraction of thermoplastic elastomer with the thermoplastic resin composition as the continuous phase and the rubber composition as the dispersed phase $\eta_m$: melt viscosity of thermoplastic elastomer with the thermoplastic resin composition as the continuous phase and the rubber composition as the dispersed phase.

In accordance with the present invention, there is further provided a process of producing a low permeability thermoplastic elastomer composition comprising; a first step of preforming a thermoplastic elastomer composed of a thermoplastic resin/rubber composition; and a second step of kneading a barrier thermoplastic resin composition in the above thermoplastic elastomer.

In accordance with the present invention, further, there is provided a low permeability hose using the above low permeability thermoplastic elastomer composition.

In accordance with a fifth aspect of the present invention, there is provided a functional thermoplastic elastomer composition comprising a thermoplastic composition (A), composed of a thermoplastic resin component constituting a continuous phase in which an elastomer component constituting a dispersed phase is dispersed at a weight ratio of blending of the elastomer component of 10/90 to 80/20, into which is blended an insoluble functional thermoplastic resin component (B) having a difference in solubility parameter (SP value) with respect to the thermoplastic resin component (A) of more than 1.0, where the following formula (4) is satisfied:

$$\alpha = \frac{\phi_A}{\phi_B} \times \frac{\eta_B}{\eta_A} < 1.0 \tag{4}$$

where, $\Phi_A$: volume fraction of thermoplastic elastomer composition component $\Phi_B$: volume fraction of functional thermoplastic resin component $\eta_A$: melt viscosity of thermoplastic elastomer composition component at time of mixing $\eta_B$: melt viscosity of functional thermoplastic resin component at time of mixing, and the volume fraction with respect to the total of (B) and (A) is controlled to 1 to 40%.

Further, in accordance with the present invention, there is provided a functional thermoplastic elastomer composition where a solubilizing component (C) is further added in an amount of 0.5 to 10% by weight based upon the total weight of the component (A) and component (B) of the above functional thermoplastic elastomer composition.

Further, in accordance with the present invention, there is provided a process of producing a functional thermoplastic elastomer composition comprising:

preparing a thermoplastic elastomer composition (A) composed of a thermoplastic resin component constituting a continuous phase and an elastomer component constituting a dispersed phase in a ratio of weight of the latter to the former of 10/90 to 80/20, and then mixing into this an insoluble functional thermoplastic resin component (B) having a difference of the solubility parameter (ΔSP value) with respect to the thermoplastic resin component of (A) more than 1.0 under conditions satisfying the following formula (4): and $$\alpha = \frac{\phi_A}{\phi_B} \times \frac{\eta_B}{\eta_A} < 1.0 \tag{4}$$

where, $\Phi_A$: volume fraction of thermoplastic elastomer composition component $\Phi_B$: volume fraction of functional thermoplastic resin component $\eta_A$: melt viscosity of thermoplastic elastomer composition component at time of mixing $\eta_B$: melt viscosity of functional thermoplastic resin component at time of mixing controlling the volume fraction of the component (B) with respect to the total amount of the component (B) and the component (A) to 1 to 40%, followed by processing this into a sheet or tube while applying shear stress so as to make the above functional thermoplastic resin component be positioned at the surface portion.

Further, in accordance with the present invention, there is provided an adhesive thermoplastic elastomer composition comprising an adhesive thermoplastic resin component blended in as the functional thermoplastic resin component (B) and, further, there is provided a hose using the adhesive thermoplastic elastomer composition at least for one of the material of the outer layer of the hose adjoining the reinforcing layer, the material of the inner layer of the inner tube, the material of the outer layer of the inner tube, and, in the case where the reinforcing layer is a double layer, the reinforcing layer.

BRIEF DESCRIPTION OF DRAWINGS

FIG. 1(a) is a view showing conceptually the properties of the thermoplastic elastomer composition of the present invention, whereas

FIGS. 2(a) and 2(b) are views of an example of a hose using the thermoplastic elastomer composition of the present invention, wherein FIG. 2(a) is a schematic perspective view and FIG. 2(b) is a schematic sectional view.

BEST MODE FOR CARRYING OUT THE INVENTION

Figure 1A:
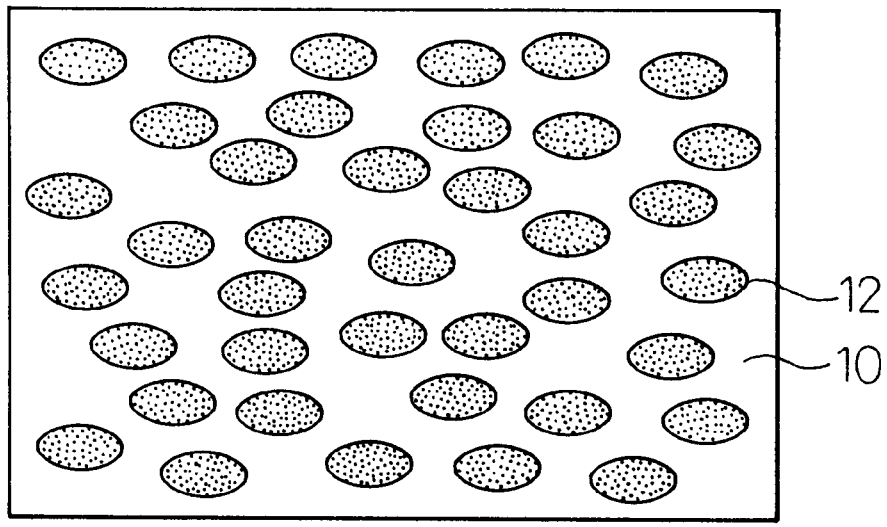

As a material superior in gas barrier property, a polyamide thermoplastic resin (hereinafter, referred to as a polyamide thermoplastic resin) has been known. Also, as a material superior in a moisture barrier property and flexibility, a butyl rubber has been known. Even if it were possible to blend (mix) the polyamide resin and the butyl resin well, then it would be possible to realize a composition having a gas barrier property, moisture barrier property, flexibility, and elongation at break in a good balance.

However, according to the studies of the present inventors, since they have completely different polarities (polyamide thermoplastic resins have a high polarity, while butyl rubbers have a low polarity), their mutual solubility is poor, and therefore, it is extremely difficult to blend the polyamide resin and the butyl resin well. Further, to blend these two thermoplastic resins, it is necessary to mix them by heating to the melting temperature (200 to 250° C. or so) of the polyamide thermoplastic resin, but at this temperature, a normal butyl rubber deteriorates, and therefore, even if a good blend were possible, it would not be possible to express well the butyl rubber's moisture barrier property, flexibility, and elongation at break.

Here, the present inventors engaged in repeated studies and, as a result, found that a $C_4$ to $C_7$ isomonoolefin and p-alkylstyrene copolymer, that is, a copolymer rubber where a part of the p-alkylstyrene unit portion is a halogen, for example, bromine (halogenated-polyisomonoolefin-p-alkylstyrene copolymer rubber=X-IPMS) has, in addition to an excellent moisture barrier property and flexibility, a superior resistance to heat degradation due to the fact it does not include any double bonds in its main chain and further can be blended well with a polyamide thermoplastic resin due to the action of the amide and halogen.

Further, we found that, by not merely mixing these two materials, but by using the polyamide thermoplastic resin as a matrix and dispersing the X-IPMS composition as at least partially cross-linked fine particles, it was possible to realize a thermoplastic elastomer composition having a superior gas barrier property and moisture barrier property and an excellent flexibility and elongation at break in a good balance and that by melting and mixing the polyamide thermoplastic resin and X-IPMS composition and adding a cross-linking agent during the melting and mixing, it was possible to suitably produce the above thermoplastic elastomer composition, whereby the present invention was completed.

The thermoplastic elastomer composition according to the first aspect of the present invention comprises 15 to 80 parts by weight of a polyamide thermoplastic resin (component A, hereinafter referred to as a polyamide thermoplastic resin) and 20 to 85 parts by weight of a rubber composition having the afore-mentioned X-IPMS (halogenated-polyisomonoolefin-p-alkylstyrene copolymer rubber) (component B, hereinafter referred to as the X-IPMS composition) mixed with a cross-linking agent wherein, as shown conceptually in FIG. 1(a), the polyamide thermoplastic resin phase 10 is used as the matrix (continuous phase) and in this matrix at least partially cross-linked fine particles 12 of the X-IPMS composition are dispersed as the domain (dispersed phase).

In the present invention, as the polyamide thermoplastic resin, various known types thermoplastic resins may be used.

More specifically, nylon 6 (N6), nylon 66 (N66), nylon 11(N11), nylon 12(N12), an aliphatic polyamide (MXD6) having an aromatic ring, and other various polyamide thermoplastic resins, mixtures of the same, and polyamide thermoplastic resin compositions having these as main components may be preferably illustrated.

Further, copolymers of these polyamide thermoplastic resins may also be used.

More specifically, a nylon 6 and nylon 66 copolymer N6/N66), a nylon 6 and nylon 10 alternating copolymer (nylon 610: N610), a nylon 6 and nylon 12 alternating copolymer (nylon 612: N612), and other various types of polyamide thermoplastic resins, their mixtures, and further polyamide thermoplastic resin compositions having these as main components may be preferably illustrated.

Further, blends of these polyamide thermoplastic resins may also be used.

Specifically, as a two-component system blend, a nylon 6 and nylon 66 blend N6/N66), a nylon 6 and nylon 11 blend (N6/N11), a nylon 6 and nylon 12 blend (N6/N12), a nylon 6 and nylon 610 blend (N6/N610), a nylon 6 and nylon 612 blend (N6/N612), a nylon 66 and nylon 11 blend (N66/N11), a nylon 66 and nylon 12 blend (N66/N12), a nylon 66 and nylon 610 blend (N66/N610), a nylon 66 and nylon 612 blend (N66/N612), a nylon 11 and nylon 12 blend (N11/N12), a nylon 11 and nylon 610 blend (N11/N610), a nylon 11 and nylon 612 blend (N11/N612), a nylon 12 and nylon 610 blend (N12/N610), a nylon 12 and nylon 612 blend (N12/N612), a nylon 610 and nylon 612 blend (N610/N612), etc. may be mentioned. Further, a similar three-component system blend, four-component system blend, five-component system blend, and other various types of polyamide thermoplastic resins and polyamide thermoplastic resin compositions including these as main components may be suitably mentioned.

Note that the composition of the blend may be suitably selected according to the application thereof etc.

Among these, in particular, nylon 6 (N6), nylon 66 (N66), a nylon 6 and nylon 66 copolymer N6/N66), a nylon 6 and nylon 10 alternating copolymer (nylon 610: N610), a nylon 6 and nylon 12 alternating copolymer (nylon 612: N612), a nylon 6 and nylon 66 blend N6/N66), a nylon 6 and nylon 11 blend (N1/N11), a nylon 6 and nylon 12 blend (N6/N12), a nylon 6 and nylon 610 blend (N6/N610), a nylon 6 and nylon 612 blend (N6/N612), a nylon 66 and nylon 11 blend (N66/N11), a nylon 66 and nylon 12 blend (N66/N12), a nylon 66 and nylon 610 blend (N66/N610), a nylon 66 and nylon 612 blend (N66/N612), a nylon 11 and nylon 610 blend (N11/N610), a nylon 11 and nylon 612 blend (N11/N612), a nylon 12 and nylon 610 blend (N12/N610), a nylon 12 and nylon 612 blend (N12/N612), a nylon 610 and nylon 612 blend (N610/N612), a nylon 6, nylon 11, and nylon 610 blend (N6/N11/N610), a nylon 6, nylon 11, and nylon 612 blend (N6/N11/N612), a nylon 6, nylon 12, and nylon 610 blend (N6/N12/N610), a nylon 6, nylon 12, and nylon 612 blend (N6/N12/N612), a nylon 6, nylon 610, and nylon 612 blend (N6/N610/N612), a nylon 66, nylon 11, and nylon 610 blend (N66/N11/N610), a nylon 66, nylon 11, and nylon 612 blend (N66/N11/N612), a nylon 66, nylon 12, and nylon 610 blend (N66/N12/N610), a nylon 66, nylon 12, and nylon 612 blend (N66/N12/N612), a nylon 66, nylon 610, and nylon 612 blend (N66/N610/N612), a nylon 6, nylon 66, nylon 11, and nylon 610 blend (N6/N66/N11/N610), a nylon 6, nylon 66, nylon 11, and nylon 612 blend (N6/N66/N11/N612), a nylon 6, nylon 66, nylon 12, and nylon 610 blend (N6/N66/N12/N610), a nylon 6, nylon 66, nylon 12, and nylon 612 blend (N6/N66/N12/N612), a nylon 6, nylon 66. nylon 610, and nylon 612 blend (N6/N66/N610/N612), a nylon 6, nylon 11, nylon 12, and nylon 610 blend (N6/N11/N12/N610), a nylon 6, nylon 11, nylon 12, and nylon 612 blend (N6/N11/N12/N612), a nylon 6, nylon 11, nylon 610, nylon 612 blend (N6/N11/N610/N612), a nylon 6, nylon 12, nylon 610, nylon 612 blend (N6/N12/N610/N612), a nylon 6, nylon 66, nylon 11, nylon 610, nylon 62 blend (N6/N66/N11/N610/N612), a nylon 6, nylon 66, nylon 12, nylon 610, and nylon 612 blend (N6/N66/N12/N610/N612), a nylon 6, nylon 66, nylon 11, nylon 12, nylon 610, and nylon 612 blend (N6/N66/N11/N12/N610/N612), etc. may be suitably mentioned.

In the thermoplastic elastomer composition of the present invention, the amount of the polyamide thermoplastic resin blended is 15 to 80 parts by weight.

If the amount of the polyamide thermoplastic resin blended is less than 15 parts by weight, the gas barrier property of low molecular weight components such as fluorocarbon gases, gasoline, solvents, heavy oils, etc. will unpreferably fall, and it will become substantially difficult for the polyamide thermoplastic resin to form the matrix phase and the desired performance will not be able to be obtained.

Conversely, if the polyamide thermoplastic resin is blended in an amount of more than 80 parts by weight, the amount of the X-IPMS composition blended will be small and substantial effects of improvement in the moisture barrier property, flexibility, elongation at break, and other points will not be able to be obtained.

In the thermoplastic elastomer composition of the present invention, the amount of blending of the polyamide thermoplastic resin is preferably 20 to 80 parts by weight, more preferably 25 to 75 parts by weight.

By making the content of the polyamide thermoplastic resin the above range, it is possible to obtain more preferable results in terms of giving a shaped article superior in the balance of the gas barrier property to HFC134a and other fluorocarbon gas refrigerants, hydrocarbon gasoline, solvents, etc., moisture permeation resistance, flexibility, and elongation at break.

On the other hand, the X-IPMS used as the thermoplastic elastomer composition of the present invention, as mentioned above, is a copolymer rubber obtained by copolymerization of a $C_4$ to $C_7$ isomonoolefin and p-alkylstyrene where all or part of the p-alkylstyrene unit portions have a bromine or other halogen atom and is represented in general by the following formulae (1) and (2).

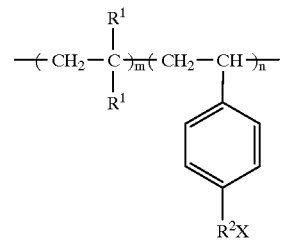

(1)

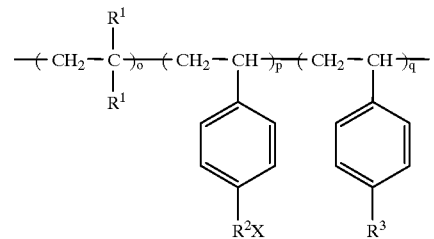

(2)

Note that, in the above formulas (1) and (2), $R^1$ may be the same or different and is a $C_1$ to $C_4$ monovalent hydrocarbon group, $R^2$ is a $C_1$ to $C_5$ bivalent hydrocarbon group, $R^3$ is a $C_1$ to $C_5$ monovalent hydrocarbon group, and X is a halogen atom.

Further, m to q are each at least 1 and show that the unit portions are repeatedly bonded in blocks or random. That is, the X-IPMS used in the present invention is a block or random copolymer of the above two or three repeating units.

In the above X-IPMS, as the p-alkylstyrene, a p-alkylstyrene having a $C_1$ to $C_5$ primary alkyl group and a p-alkylstyrene where this alkyl group is halogenated may be mentioned, for example, p-methylstyrene, p-ethylstyrene, and their halides may be mentioned.

The content of the p-alkylstyrene in the X-IPMS is preferably 5.5 to 25% by weight, more preferably 6 to 20% by weight.

By making the content of the p-alkylstyrene in the X-IPMS at least 5.5% by weight, it is possible to introduce sufficient halogen into the X-IPMS, whereby sufficient cross-linking is possible. By making the content of the p-alkylstyrene not more than 25% by weight, it is possible to reliably prevent the molecules from becoming rigid and to obtain a shaped article having sufficient rubber elasticity. That is, by making the content of the p-alkylstyrene in the X-IPMS the above range, it is possible to obtain desirable results in that it is possible to obtain sufficient cross-linking and to realize a processed shaped article having superior rubber elasticity.

On the other hand, as the $C_4$ to $C_7$ isomonoolefin, isobutylene, isopentene, etc. may be mentioned. In particular, isobutylene is preferably mentioned.

Further, the halogen content of the X-IPMS is not particularly limited, but at least 1% by weight is preferred, particularly, 1 to 5% by weight is preferred.

Note that the halogen atom may be bromine, iodine, chlorine, or any other so-called halogen, but bromine is particularly preferred.

As the X-IPMS, those having a Mooney viscosity ($ML_{1+8}$ at 100° C.) of at least 20, more preferably 30 to 70 are preferably used.

Using an X-IPMS with a Mooney viscosity in the above range is preferable in the point of the dispersion with respect to the afore-mentioned polyamide thermoplastic resin.

Such an X-IPMS may be obtained, for example, as shown in the following formula (3), by partially halogenating, for example, partially brominating by $Br_2$, a copolymer of isobutylene and p-methylstyrene. This X-IPMS is commercially sold by Exxon Chemical under the brand name EXXPRO and is suitably used. Further, the brominated or other halogenated p-alkylstyrene may be copolymerized.

This X-IPMS may be used alone or as a mixture of two or more Lypes.

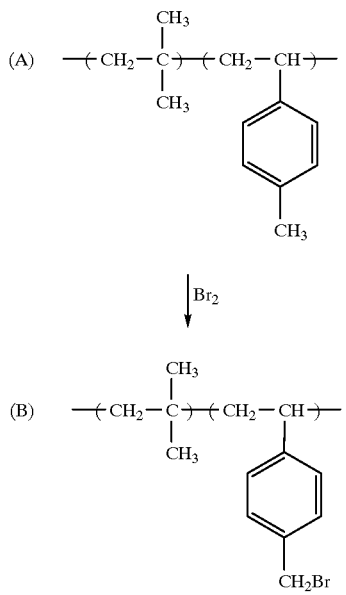

(3)

In the thermoplastic elastomer composition of the present invention, the amount blended of the X-IPMS composition including this X-IPMS as a main component is 20 to 85 parts by weight.

If the amount blended of the X-IPMS composition is less than 20 parts by weight, it is not possible to obtain substantive effects of improvement of the moisture barrier property and flexibility.

Conversely, if the X-IPMS composition is included in over 85 parts by weight, the gas barrier property of fluorocarbon gases, gasoline, solvent, heavy oil, and other low molecular weight components falls, which is not preferred, while the amount blended of the polyamide family thermoplastic resin will become too small and it will be substantially difficult for the polyamide family thermoplastic resin to form a matrix phase and the desired performance cannot be obtained.

The X-IPMS composition may of course include various compounding agents normally blended into rubber compositions in addition to the X-IPMS such as carbon black, white carbon, and other reinforcing agents, softening agents, plasticizers, antioxidants, processing aids, pigments, dyes, and other coloring agents, but the content of the X-IPMS in the X-IPMS composition is preferably 99.5 to 20% by weight or so, in particular, 98 to 25% by weight or so.

By making the content of the X-IPMS in the above range, a sufficient effect of improvement of the moisture barrier property and flexibility etc. is obtained and it is possible to stably obtain a thermoplastic elastomer composition with superior properties.

The size of the fine particles of the at least partially cross-linked X-IPMS composition which are dispersed in the matrix polyamide thermoplastic resin is not particularly limited, but preferably is an average particle size of not more than 50 $\mu$m, particularly preferably not more than 10 $\mu$m.

By making the size of the particles of the X-IPMS composition in the above range, it is possible to obtain more desirable results in terms of the resistance to permeation of fluorocarbon gas and other gas permeation, the moisture barrier property, flexibility, breakage strength, etc.

The thermoplastic elastomer composition of the present invention includes, in addition to this polyamide family thermoplastic resin and X-IPMS composition, a cross-linking agent of the X-IPMS composition.

As the cross-linking agent, a general rubber cross-linking agent may be used.

More specifically, first, a sulfur cross-linking agent may be mentioned. Powdered sulfur, precipitated sulfur, high dispersion sulfur, surface treated sulfur, insoluble sulfur, dimorpholinedisulfide, alkylphenoldisulfide, etc. may be mentioned. For example, they may be used in amounts of about 0.5 to 4 phr (parts by weight per 100 parts by weight of X-IPMS in X-IPMS composition) (same below).

Further, as the cross-linking agent, an aliphatic acid zinc may also be used.

The aliphatic acid portion of the aliphatic acid zinc may be saturated or unsaturated and further may be a straight chain or branched. In particular, a $C_9$ to $C_{19}$ monocarboxylic acid zinc is preferred.

More specifically, zinc acetylate, zinc proprionate, zinc butanate, zinc laurate myristate, zinc palmitate, zinc stearate, zinc acrylate, zinc maleate, zinc fumarate, etc. are preferably mentioned. In particular, zinc stearate is preferably used. These aliphatic acid zincs may be used alone or as mixtures of two types or more. Further, zinc oxide and one or more types of aliphatic acid zincs may be used together.

The aliphatic acid zinc (total when use with zinc oxide) may be used in an amount of, for example, 0.1 to 10 phr or so.

Further, a phenol thermoplastic resin cross-linking agent may also be used. More specifically, a brominated alkylphenol thermoplastic resin, a mixed cross-linking system containing stannous chloride, chloroprene or another halogen donor and alkylphenol thermoplastic resin, etc. may be mentioned. For example, 1 to 20 phr or so may be used.

In addition, zinc oxide (5 phr or so), magnesium oxide (4 phr or so), lyserge (10 to 20 phr or so), p-quinonedioxime, p-dibenzoylquinonedioxime, tetrachloro-p-benzoquinone, poly-p-dinitrosobenzene (2 to 10 phr or so), and methylenedianiline (0.2 to 10 phr or so) may be mentioned.

By making the amount of the cross-linking agent blended the above range, it is possible to obtain desirable results in terms of enabling sufficient cross-linking for expressing the rubber elasticity of the X-IPMS.

Further, optionally or if necessary, a cross-linking promoter may be added. As the cross-linking accelerator, an aldehyde-ammonia based, guanidine based, thiazole based, sulfenamide based, thiuram based, dithio acid salt based, thiourea based, and other general cross-linking promoters may be added for example in 0.5 to 2 phr or so.

More specifically, as the aldehyde-ammonia based cross-linking accelerator, hexamethylene tetraamine etc. may be mentioned.

As the guadinine based cross-linking accelerator, diphenylguadinine etc. may be mentioned.

As the thiazole based cross-linking accelerator, dibenzothiazoyldisulfide (DM), 2-mercaptobenzothiazole and its Zn salt, cyclohexylamine salt, etc. may be mentioned.

As the sulfenamide based cross-linking accelerator, cyclohexylbenzothiazoyl-sulfenamide (CBS), N-oxydiethylenebenzothiazoyl-2-sulfenamide, N-t-butyl-2-benzothiazolesulfenamie, 2-(thymolpolynyldithio)benzothiazole, etc. may be mentioned.

As the thiuram based cross-linking accelerator, tetramethylthiuramdisulfide (TMDM), tetraethylthiuramdisulfide, tetramethylthiurammonosulfide (TMTM), dipentamethylenethiuramtetrasulfide, etc. may be mentioned.

As the dithioacetate based cross-linking accelerator, Zn-dimethyldithio-carbamate, Zn-diethyldithiocarbamate, Zn-di-n-butyldithiocarbamate, Zn-ethylphenyldithiocarbamate, Te-diethyldithiocarbamate, Cu-dimethyldithiocarbamate, Fe-dimethyldithiocarbamate, pipecolinepipecoryldithiocarbamate, etc. may be mentioned.

As the thiourea based cross-linking accelerator, ethylenethiourea, diethylthiourea, etc. are disclosed.

Further, as the cross-linking accelerator, it is possible to also use a general rubber aid, for example, stearic acid or oleic acid and their Zn salts (2 to 4 phr or so).

Further, the thermoplastic elastomer composition of the present invention may contain therein, if necessary, in addition to the above essential components, various components used in the normal rubber field such as fillers, reinforcing agents, plasticizers, softening agents, antioxidants, processing aids, pigments, etc.

As mentioned above, the thermoplastic elastomer composition of the present invention is composed of a blend of a polyamide thermoplastic resin, X-IPMS composition, and cross-linking agent in which at least part of the X-IPMS composition is dispersed in the matrix of the polyamide thermoplastic resin and in which at least part of the dispersed X-IPMS phase is cross-linked giving the configuration shown conceptually in FIG. 1(a).

The thermoplastic elastomer composition of the present invention may be suitably produced by the process of production of the present invention using dynamic cross-linking. The process of production of the present invention will now be explained in detail.

First, predetermined amounts of the polyamide thermoplastic resin and the X-IPMS composition are mixed at the above melting temperature of the polyamide thermoplastic resin. In this state, it is possible to make a construction where the polyamide thermoplastic resin phase is the matrix and the X-IPMS composition phase is the dispersed phase (domain).

All or part of the compounding agents of the X-IPMS composition, other than the cross-linking agent, may be added to or prepared with the X-IPMS in advance.

After the polyamide thermoplastic resin and the X-IPMS composition have been sufficiently kneaded, the cross-linking agent is added in the mixed state to cross-link the X-IPMS composition. That is, the dispersed phase of the X-IPMS composition is cross-linked dynamically under heating and mixing.

Here, since the cross-linking agent is added during mixing in the heated state, the cross-linking of the X-IPMS composition is quickly started in a state where the X-IPMS composition is suitably dispersed and mixed with the polyamide thermoplastic resin. Therefore, according to the process of production of the present invention using this dynamic cross-linking, the dispersion and cross-linking proceed simultaneously and it is possible to easily produce the thermoplastic elastomer composition of the present invention composed of the polyamide thermoplastic resin as the matrix and cross-linked particles of the X-IPMS composition, preferably cross-linked particles of the X-IPMS composition having an average particle size of not more than 50 $\mu$m, dispersed as the domain.

In a normal blend of a thermoplastic resin and a rubber composition, the mixing is performed without blending a cross-linking agent.

Figure 1B:
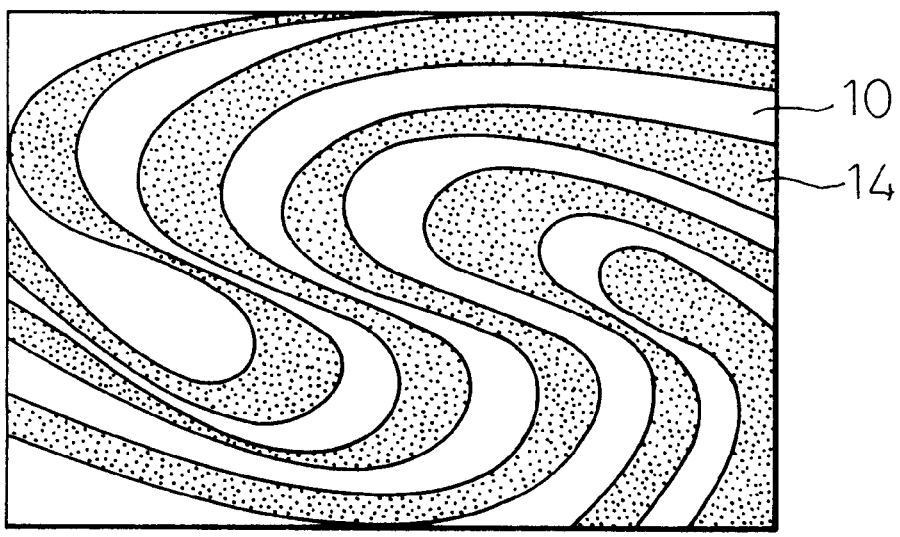
FIG. 1(b) shows the properties of a conventional blend composition.

If this blending method were used to mix the polyamide thermoplastic resin and X-IPMS composition, then it would be difficult to cause the X-IPMS composition to stably disperse in the polyamide thermoplastic resin and usually, as shown conceptually in FIG. 1(b), the polyamide thermoplastic resin phase 10 and the X-IPMS composition phase 14 would separate again after mixing and form independent layers.

Therefore, it would not be possible to draw out the properties of the thermoplastic resin and rubber in a good balance and a composition would result leaning toward the properties of one or with poor properties of the two compounds. Further, since the two compounds would be present independently as layers, there would be the practical problems of easy breakage such as separation of layers and lower mechanical strength such as tensile strength, elongation at break, etc.

As opposed to this, according to the production process of the present invention using dynamic cross-lining, it is possible to easily and suitably produce the thermoplastic elastomer composition of the present invention composed, as shown in FIG. 1(a), the polyamide thermoplastic resin phase 10 as a matrix and, dispersed in the matrix, fine particles 12 of the X-IPMS composition, where at least part of the IPMS composition is cross-linked.

Further, the thermoplastic elastomer composition of the present invention having this configuration exhibits suitably the properties of a polyamide thermoplastic resin and X-IPMS composition in a good balance, has a superior gas barrier property and moisture barrier property and an excellent flexibility and further is superior in the tensile strength, elongation at break, and other mechanical strength and in the resistance to softening upon heating (up to the melting temperature of the polyamide family thermoplastic resin). Further, since the matrix is a polyamide thermoplastic resin and the fine particles of the X-IPMS composition are dispersed in it, it is possible to use a thermoplastic resin use molding machine to process it in the same way as with a thermoplastic resin and the excellent thermoplasticity can be used advantageously for recycling as well. Further, there is the advantage that use of a nylon thermoplastic resin, which has a lower specific gravity compared with a rubber material, results in a lighter weight.

In the above production process of the present invention using dynamic cross-linking, the mixing temperature of the polyamide thermoplastic resin and X-IPMS composition should be in the range of the melting temperature of the polyamide thermoplastic resin used, but is not particularly limited. However, at the time of adding the cross-linking agent, the mixing temperature is preferably 200 to 350° C., more preferably 200 to 330° C. By using the above mixing temperature at the time of adding the cross-linking agent, the cross-linking speed of the X-IPMS composition is made suitable and a desirable result obtained in terms of stability etc.

Further, the mixing method of the polyamide thermoplastic resin and X-IPMS composition is not particularly limited. Known kneading using a screw extruder, kneader, Bambury mixer, etc. may be used, but kneading using a twin-screw extruder is particularly preferably used.

This thermoplastic elastomer composition of the present invention may be used for various applications such as belts, rolls, shaped articles, hoses, etc., but making use of its properties is suitably used for hoses, in particular hoses for transport of refrigerants.

Figure 2A:
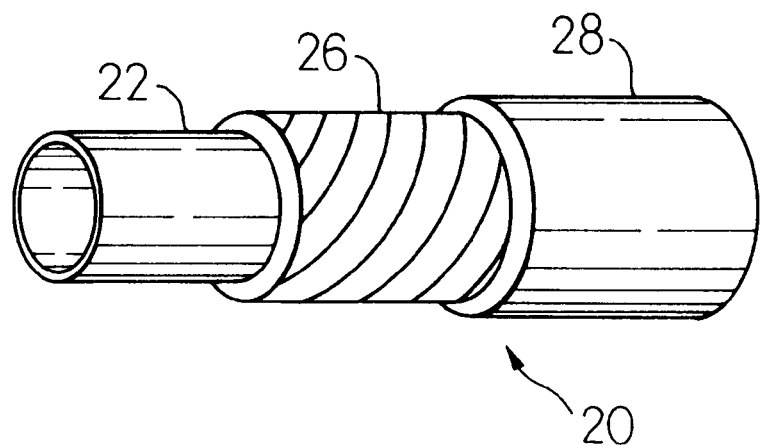

FIG. 2 shows schematically an example of a hose using the thermoplastic elastomer composition of the present invention (that is, the hose of the present invention). Note that, in FIG. 2, 2(a) is a partially cutaway schematic perspective view and 2(b) is a schematic sectional view.

Figure 2B:
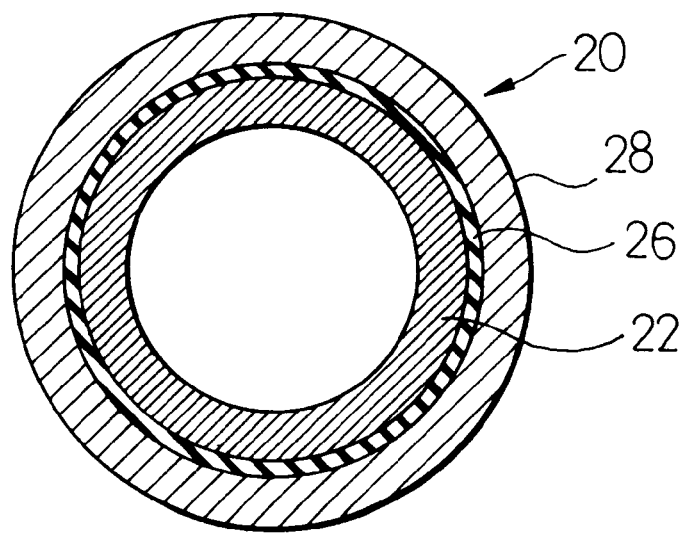

As shown in FIG. 2(a) and FIG. 2(b), the hose 20 is comprised of an inner tube 22, fiber reinforcing layer 26, and outer cover 28.

The hose of the present invention has at least part of the inner tube and/or outer cover formed by the thermoplastic elastomer composition of the present invention, so, as shown in the drawing, at least one of the inner tube 22 and outer cover 28 is formed by the thermoplastic elastomer composition of the present invention.

The hose of the present invention is not limited to the illustrated example in configuration and may have an inner tube of two layers or three layers or more. Further, the outer cover may also be configured as a multiple layer tube. Further, if necessary, the textile reinforcing layer may be formed as a multiple layer.

Whatever the case, at least part of the inner tube and/or outer cover is formed by the thermoplastic elastomer of the present invention.

That is, the hose of the present invention can be configured in many ways according to its application. For example, when used as a hose for transport of a refrigerant, it may have the construction of the hose disclosed in Japanese Unexamined Patent Publication (Kokai) Nos. 63-125885 and 63-302086.

Where to use the thermoplastic elastomer of the present invention may be decided depending upon the application of the hose and the required properties. For example, if resistance to permeation of fluorocarbon gas is more important, then at least part of the inner tube (in particular, the innermost layer) is preferably formed with the thermoplastic elastomer of the present invention, while if the moisture barrier property is more important, then at least part of the outer cover (in particular the outermost layer) is preferably formed by the thermoplastic elastomer of the present invention.

Further, in the hose of the present invention, various types of materials used for known hoses may all be used for the tubes (or layers) not using the thermoplastic elastomer of the present invention.

Further, the fiber reinforcing layer 26 may be a normally used braid layer formed by reinforcing yarn, a cord type (spiral type), net type, or film type reinforcing layer. The reinforcing yarn used may be a natural fiber or synthetic fiber. More specifically, a vinylon, aliphatic polyamide, aromatic polyamide, nylon, rayon, polyamide, polyester, or other yarn may be used. In particular, rayon and polyester are more preferred.

The production process of the hose of the present invention is not particularly limited. Various known processes of production may be used.

For example, in the case of the hose 20 shown in FIGS. 2(a) and 2(b), an inner tube 22 is extruded from an extruder for thermoplastic resin having a cross-head construction onto a mandrel coated in advance with a release agent. A braiding machine is used to braid suitable reinforcing yarns over this to form the fiber reinforcing layer 26, then, similarly, an outer cover 28 is extruded on to this using an extruder for thermoplastic resin having a cross-head construction. Further, the layers of the inner tube/reinforcing layer/outer cover may be bonded by a suitable adhesive etc.

Next, heat treatment etc. is performed, if necessary, then the result is cooled, then finally the mandrel is pulled out, whereby the hose 20 of the present invention shown in FIGS. 2(a) and 2(b) is obtained.

Note that, in the above production process of a hose, a mandrel was used, but in the low permeability hose of the present invention, there is no cross-linking process as required for the production of a normal rubber hose or rubber/thermoplastic resin composite hose, and therefore, there is no compression deformation caused by the heat during cross-linking or deformation caused by the pressure during cross-linking and the dimensions of the hose can be easily maintained. Thus, when strict dimensional precision is not particularly required, the hose may be produced without using a mandrel as well.

Above, the thermoplastic elastomer composition of the present invention, a process for its production, and also a low permeability hose will now be explained, but the present invention is not limited to the above and may of course be improved and modified in various ways within a range not going beyond the gist of the present invention.

According to the second aspect of the present invention, as explained in the above, by forming the inner tube and/or outer cover of a hose from the specified rubber component and specified thermoplastic resin component, it is possible to obtain a thermoplastic elastomer composition for a low permeability hose.

In the thermoplastic elastomer composition according to the present invention, the copolymer (X-IPMS) composed of a halide of a copolymer of p-alkylstyrene and an isomonoolefin composed of a $C_4$ to $C_7$ component as the rubber component is the composition serving as a polymer component and which is shown by the above formula 1 (and formula 2).

The content of the p-alkylstyrene in the X-IPMS polymer component is 5.5 to 25% by weight, preferably 6 to 20% by weight. As the p-alkylstyrene usable in the present invention, for example, p-methylstyrene, p-ethylstyrene, and other $C_1$ to $C_5$ primary and secondary alkylhalides thereof may be exemplified.

As the isomonoolefin composed of the $C_4$ to $C_7$ component, for example, isobutylene may be mentioned. Further, the content of the halogen atom X (for example, bromine, iodine, chlorine, and particularly bromine) of the copolymer is preferably at least 1.0% by weight, further preferably 1.0 to 5.0% by weight, with respect to the copolymer of p-alkylstyrene and isomonoolefin.

The Mooney viscosity ($ML_{1+8}$, 125° C.) of the copolymer is preferably at least 30, further preferably 35 to 70, which is suitable in terms of the excellent dispersion with the thermoplastic resin component and giving excellent gas barrier property, strength, and low temperature properties.

The copolymer may be used alone or in any mixtures of two or more types.

Note that as one of these copolymer rubbers, EXXPRO is being marketed by Exxon Chemical. This is a copolymer rubber of the structure (B) of the above formula (3) where the copolymer rubber of the isobutylene and p-methylstyrene of the structure (A) shown in the above formula (3) is partially brominated by $Br_2$. In particular, grade name 89-4, 90-1, 90-2, 90-10, etc. may be suitably used in the present invention.

If the p-alkylstyrene content of the above copolymer used as the polymer used for the rubber component in the present invention is too small, the resistance to permeation of freon gas, gasoline, heavy oil, and other low polymer components will drop, making this undesirable, while conversely if too large, the composition will tend to be brittle at low temperatures (will easily break in low temperature environments), which is also not desired. Further, if the halogen content of the above copolymer is less than 1.0% by weight, there will be few cross-linking points, so the mechanical strength such as the stress at the time of breakage will fall, which is also not desired, and further there will be a detrimental effect on the gas barrier property. Further if the Mooney viscosity of the above copolymer is less than 30, the resistance to permeation will fall, which is again not wanted.

The thermoplastic elastomer composition according to the present invention contains, in addition to the above rubber component, a thermoplastic resin with a gas permeation coefficient of not more than 2 mg·mm/24 hr·cm², preferably 0.01 to 1.50 mg·mm/24 hr·cm², preferably a Young's modulus of not more than 2000 MPa, further preferably not more than 1000 MPa. If the gas permeation coefficient is more than 2 mg·mm/24 hr·cm², the desired low permeability cannot be achieved, so this is not preferred. As the thermoplastic resin, for example, the following thermoplastic resins and any thermoplastic resin mixtures of the same or including the same may be mentioned.

Polyolefin thermoplastic resins (for example, high density polyethylene (HDPE), ultrahigh molecular weight polyethylene (UHMWPE), polypropylene (PP), and ethylene.propylene copolymer thermoplastic resin), polyamide thermoplastic resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer), polyester thermoplastic resins (for example, polybutylene terephthalate (PBT), polyethylene terephthalate (PET), polyethylene isophthalate (PEI), PET/PEI copolymer, polyacrylate (PAR), polybutylenenaphthalate (PBN), liquid crystal polyester, polyoxyalkylenediimidate/polybutyrateterephthalate copolymer, and other aromatic polyesters), polynitrile thermoplastic resins (for example, polyacrylonitrile (PAN), polymethacrylonitrile, acrylonitrile/styrene copolymer (AS), methacrylonitrile/styrene copolymer, methacrylonitrile/styrene/butadiene copolymer), polymethacrylate thermoplastic resins (for example, polymethyl methacrylate (PMMA), and polyethylmethacrylate), vinyl resins (for example, vinyl acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer), cellulose thermoplastic resins (for example, cellulose acetate, cellulose acetate butyrate), fluororesins (for example, polyvinylidene fluoride (PVDF), polyvinyl fluoride (PVF), polychlorofluoroethylene (PCTFE), and tetrachloroethylene/ethylene copolymer (ETFE)), imide thermoplastic resins (for example, aromatic polyimide (PI)), etc. may be mentioned.

According to the present invention, the above rubber component and the thermoplastic resin component are blended in a weight ratio of the rubber component/thermoplastic resin component of 10/90 to 85/15, preferably 15/85 to 85/15. If this ratio is smaller than 10/90, the flexibility decreases, which is not desirable, while conversely if more than 85/15, the barrier property will unpreferably fall. Note that, in the thermoplastic elastomer composition for a low permeability hose of the present invention, the above rubber component forms the discontinuous phase (domain) and the thermoplastic resin component forms the continuous phase (matrix).

The production process of the polymer composition constituting the thermoplastic elastomer composition for a low permeability hose of the present invention comprises mixing in advance the thermoplastic resin component (ii) and rubber (unvulcanized) component (i) by a twin-screw extruder etc. to cause the rubber component to disperse in the thermoplastic resin component forming the continuous phase. When cross-linking the rubber component, the cross-linking agent may be added during the mixing so as to dynamically cross-link the rubber. Further, the various compounding agents (except the vulcanizer) added to the thermoplastic resin or the rubber component may be added during the above mixing, but are preferably premixed before the mixing. The kneader used for mixing the thermoplastic resin and the rubber is not particularly limited, but a screw extruder, kneader, Bambury mixer, twin-screw extruder, etc. may be mentioned. Among these, for mixing the thermoplastic resin component and the rubber component and for dynamic vulcanization of the rubber component, use of a twin-screw extruder is preferred. Further, two or more types of kneaders may be used for successive mixing. As the conditions for the mixing, the temperature should be at least the temperature at which the thermoplastic resin melts. Further, the shear rate at the time of mixing is preferably 1000 to 7500 sec$^{-1}$. The time for the overall kneading is from 30 sec to 10 minutes. Further, when adding a cross-linking agent, the cross-linking time after vulcanization is preferably from 15 sec to 5 minutes.

The thermoplastic elastomer composition thus obtained forms a structure where at least part of the rubber component is dispersed in the thermoplastic resin component as a discontinuous phase. By this structure, it is possible to obtain flexibility and a resistance to permeation of HFC134a and other freon gas refrigerants, hydrocarbon gasoline, solvents, and low molecular weight components with a good balance. Further, by dynamically cross-linking the rubber component, it is possible to obtain the effects of resistance to heat deformation and resistance to moisture derived from the rubber elasticity of the rubber component which are not offered by a thermoplastic resin and possible to perform thermoplastic processing as well so possible to use an ordinary molding machine for thermoplastic resin, that is, perform extrusion, to produce the hose.

That is, the type of the cross-linking agent (vulcanizer) and the dynamic cross-linking conditions (temperature and time) etc. may be suitably selected depending upon the composition of the elastomer component added and are not particularly limited.

As the cross-linking agent, a general rubber cross-linking agent may be used. More specifically, as the sulfur vulcanizer, powdered sulfur, precipitated sulfur, high dispersion sulfur, surface treated sulfur, insoluble sulfur, dimorpholinedisulfide, alkylphenoldisulfide, etc. may be mentioned. For example, they may be used in amounts of about 0.5 to 4 phr (parts by weight per 100 parts by weight of the rubber component (polymer) in the component B).

Further, as the cross-linking agent, the above-mentioned aliphatic acid zinc phenol thermoplastic resin vulcanizer and also zinc oxide (5 phr or so), magnesium oxide (4 phr or so), lyserge (10 to 20 phr or so), p-quinonedioxime, p-dibenzoylquinone-dioxime, tetrachloro-p-benzoquinone, poly-p-dinitrosobenzene (2 to 10 phr or so), etc. may be used. Further, if necessary, the above-mentioned vulcanization accelerator may be added and, further, as a vulcanization accelerating aid, it is also possible to use together a general rubber aid. For example, zinc oxide (5 phr or so), stearic acid, oleic acid, and their Zn salts (2 to 4 phr or so) etc. may be used.

The thermoplastic elastomer composition according to the present invention may have mixed therein, in addition to the above essential components (i) and (ii), a third component of a compatibilizer polymer or other polymer to an extent not impairing the necessary properties of the thermoplastic elastomer composition for a low permeability hose of the present invention. To improve the solubility of the rubber component and the thermoplastic resin component, to improve the processability of the material, to improve the heat resistance, to reduce costs, etc., as these materials, for example, polyethylene (PE), polypropylene (PP), polystyrene (PS), ABS, SBS, polycarbonate (PC), etc. may be mentioned. The third component polymer is not particularly limited so long as it has the prescribed values of the air permeation coefficient, Young's modulus, etc. as a polymer composition.

The elastomer component or thermoplastic resin component of the thermoplastic elastomer composition according to the present invention may, if necessary, have suitably blended therein, in addition to the above essential components and optional third component, various additives usually used in the field of rubber and hoses, for example, fillers, carbon black, anhydrous silicates, and other reinforcing agents, plasticizers, softeners, antioxidants, processing aids, pigments, etc. to an extent not impairing the desired physical properties.

The thermoplastic elastomer composition of the present invention may be used for the inner tube and/or outer cover of a hose, but here the case of use of the thermoplastic elastomer of the present invention for both of the inner tube and the outer covers will be explained. Either of the inner tube and outer covers may be comprised by a general thermoplastic resin, thermoplastic elastomer, etc., further one or both of the inner tube and outer cover may be made a double-layer or more layer construction. At that time, at least one layer should be comprised by the thermoplastic elastomer composition of the present invention. Note that, as the reinforcing layer, in the same way as in the past, a braid layer composed of the usually used reinforcing yarns, a cord type (spiral type), net type, or film type reinforcing layer may be mentioned. The reinforcing fiber may be any natural fiber, synthetic fiber, etc. More specifically, Vinylon, aliphatic polyamide, aromatic polyamide, rayon, nylon 6, nylon 66, or other polyamide and polyester yarn is preferably used. In particular, rayon, nylon, and polyester are more preferred.

Further, as a reinforcing wire, hard steel wire may be mentioned. More specifically, brass plated or zinc plated steel wire may be illustrated as imparting rust-proofness and adhesiveness.

The low permeability hose of the present invention has at least an inner tube, reinforcing layer, and outer cover and, if necessary, further has an inner tube composed of an inner layer and an outer layer, but depending on the purpose of use, conditions of use, etc. of the hose, the inner tube may be made multiple layered or an anti-stress-crack layer may be provided.

The method of producing a hose composed of an inner tube, reinforcing layer, and outer cover using the thermoplastic elastomer composition according to the present invention will now be explained.

First, pellets of the low permeability thermoplastic elastomer of the present invention composition are used and the thermoplastic elastomer composition extruded on a mandrel coated in advance with a release agent from a thermoplastic resin-use extruder by the cross-head extrusion method to form an inner tube. Then, another thermoplastic elastomer of the present invention or another general type is extruded on the inner tube to form the outer layer of the inner tube.

Next, an adhesive is coated, sprayed, or otherwise applied on the inner tube depending upon the need.

Next, a reinforcing yarn or reinforcing steel wire is braided the inner tube by a braiding machine.

If necessary, an adhesive is coated on the reinforcing layer for the bonding with the outer cover, then a low permeability thermoplastic elastomer composition is similarly extruded from a cross-head thermoplastic resin-use extruder to form the outer cover.

Finally, the mandrel is pulled out, whereupon a low permeability hose of the present invention is obtained.

As the adhesive to be coated on the inner tube or on the reinforcing layer, an isocyanate urethane, phenol thermoplastic resin, resorcin chloride rubber, HRH, or other adhesive may be mentioned, but the isocyanate and urethane are particularly preferred.

In the above process of production, a mandrel was used, but there is no vulcanization process as required for the production of a normal rubber hose or rubber/thermoplastic resin composite hose, and therefore, there is no compression deformation caused by the heat during vulcanization or deformation caused by the pressure during vulcanization and the dimensions of the hose can be easily maintained, thus, when strict dimensional precision is not particularly required, the hose may be produced without using a mandrel as well.

The thermoplastic resin blended as the component (A) in the thermoplastic elastomer composition according to the third aspect of the present invention may be any thermoplastic resin having an air permeation coefficient of not more than $25 \times 10^{-12}$ cc·cm/cm$^2$·sec·cmHg, preferably $0.05 \times 10^{-12}$ to $10 \times 10^{-12}$ cc·cm/cm$^2$·sec·cmHg. The amount blended, according to the present invention, is 15 to 80% by weight per total weight of the entire polymer component including the thermoplastic resin component (A) and elastomer component (B) and is preferably 15 to 60% by weight in terms of the flexibility.

Further, the thermoplastic resin blended as the component (A) in the thermoplastic elastomer composition according to the present invention may be any thermoplastic resin having a gas permeation coefficient of not more than 5.0 mg·mm/24 hr·cm$^2$, preferably not more than 2.0 mg·mm/24 hr·cm$^2$. The amount blended is the same ratio as with the case of the control of the air permeability per total weight of the entire polymer component including the elastomer component.

If the amount of the above thermoplastic resin is more than 80% by weight based upon the total weight of the entire polymer component including the elastomer component, then mixing is possible, but the thermoplastic elastomer composition obtained will lack flexibility, which is undesirable, while if less than 15% by weight, it will not be sufficient for formation of the continuous phase including the elastomer component and the thermoplastic elastomer composition will not be able to be formed.

As the thermoplastic resin, for example, the following thermoplastic resins and any thermoplastic resin mixtures of the same or including the same may be mentioned.

Polyamide thermoplastic resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer), polyester thermoplastic resins (for example, polybutylene terephthalate (PBT), polyethylene terephthalate (PET), polyethylene isophthalate (PEI), PET/PEI copolymer, polyacrylate (PAR), polybutylenenaphthalate (PBN), liquid crystal polyester, polyoxyalkylenediimidate/polybutyrateterephthalate copolymer, and other aromatic polyesters), polynitrile thermoplastic resins (for example, polyacrylonitrile (PAN), polymethacrylonitrile, acrylonitrile/styrene copolymer (AS), methacrylonitrile/styrene copolymer, and methacrylonitrile/styrene/butadiene copolymer), polymethacrylate thermoplastic resins (for example, polymethyl methacrylate (PMMA), and polyethylmethacrylate), vinyl resins (for example, vinyl acetate (EVA), polyvinylalcohol (PVA), vinylalcohol/ethylene copolymer (EVOH), polyvinylidene chloride (PVDC), polyvinyl chloride (PVC), vinyl chloride/vinylidene chloride copolymer, and vinylidene chloride/methylacrylate copolymer), cellulose thermoplastic resins (for example, cellulose acetate, cellulose acetate butyrate), fluororesins (for example, polyvinylidene fluoride (PVDF), polyvinyl fluoride (PVF), polychlorofluoroethylene (PCTFE), and tetrafluoroethylene/ethylene copolymer (ETFE)), imide thermoplastic resins (for example, aromatic polyimide (PI)), etc. may be mentioned.

The elastomer component blended as the (B) component in the thermoplastic elastomer composition according to the present invention is any elastomer having an air permeation coefficient of not more than $1.0 \times 10^{-10}$ cc·cm/cm$^2$·sec·cmHg or a freon gas (HFC134a) or other gas permeation coefficient of not more than 30.0 mg·mm/24 hr·cm$^2$ or an elastomer composition comprising this and a reinforcing agent, filler, cross-linking agent, softener, antioxidant, processing aid, and other compounding agents added in the necessary amounts which are blended with general elastomers for the purpose of improving the dispersion of the elastomer, heat resistance, etc. The amount blended, according to the present invention, is 20 to 85% by weight with respect to the total weight of the polymer component containing the thermoplastic resin (A) and elastomer component (B), preferably 40 to 85% by weight.

If the amount of the above elastomer component is less than 20% per total weight of the polymer component including the thermoplastic resin component, this is not sufficient to impair the flexibility required for the thermoplastic elastomer of the present invention, Further, if more than 85% by weight, the amount of the thermoplastic resin component forming the continuous phase is not sufficient and mixing and processing become impossible, so this is also not preferred.

As the elastomer material comprising the elastomer component, for example, the following may be mentioned:

A halide of the $C_4$ to $C_7$ isomonoolefin and p-alkylstyrene copolymer, particularly brominated isobutylene/p-methylstyrene copolymer (Br-IPMS), hydrogenated NBR, acrylonitrile butadiene rubber (NBR), chlorosulfonated polyethylene (CSM), chlorinated polyethylene (CM), epichlorohydrin rubber (CHC, CHR), chlorinated butyl rubber (Cl-IIR), or brominated butyl rubber (Br-IIR). In particular, an elastomer component including brominated isobutylene and p-methylstyrene copolymer (Br-IPMS) is preferred.

The elastomer composition according to the present invention may further have blended thereto any components blended into general elastomers such as fillers (calcium carbonate, titanium oxide, alumina, etc.), carbon black, white carbon, and other reinforcing aids, softener, plasticizers, processing aids, pigments, dyes, antioxidants, and the like so long as the requirements for the above air permeability or gas permeability are not impaired.

Further, when the above elastomer component is being mixed with the thermoplastic resin, the elastomer component may be dynamically vulcanized. The vulcanizer, vulcanization accelerator, activator, vulcanization conditions (temperature and time), etc. when dynamically vulcanizing the elastomer component may be suitably selected in accordance with the composition of the elastomer component added and are not particularly limited.

As the vulcanizer, the above-mentioned general rubber vulcanizer (cross-linking agent), for example, a sulfur vulcanizer, organic peroxide vulcanizer, phenol thermoplastic resin vulcanizer, and in addition zinc oxide, magnesium oxide, lyserge, p-quinonedioxime, p-dibenzoylquinonedioxime, tetrachloro-p-benzoquinone, poly-p-dinitrosobenzene, methylenedianiline, and methylene dianiline may be mentioned. Further, if necessary, the above general vulcanization accelerators may be added.

When the solubilities of the above specified thermoplastic resin component (A) and elastomer component (B) differ, it is preferable to use as a third component a suitable compatibilizer to make the two components soluble with each other. By mixing a compatibilizer into the system, the surface tension between the thermoplastic resin and the elastomer component falls and, as a result, the particle size of the elastomer forming the dispersed phase will become finer, and therefore the properties of the two components will be more effectively expressed. As such a compatibilizer, generally it is possible to use a copolymer having the structure or both or one of the thermoplastic resin and elastomer component or a structure of a copolymer having an epoxy group, carbonyl group, halogen group, amine group, oxazoline group, hydroxy group, etc. reactable with the thermoplastic resin or elastomer component. These may be selected according to the type of the thermoplastic resin and elastomer component to be mixed, but as the ones which are normally used, a styrene/ethylene/butylene block copolymer (SEBS) and its maleic acid modified form, EPDM, EPDM/styrene, or EPDM/acrylonitrile graft copolymer and their maleic acid modified forms, styrene/maleic acid copolymer, reactive phenoxy thermoplastic resin, etc. may be mentioned. The amount of the compatibilizer blended is not particularly limited, but preferably is 0.5 to 20 parts by weight based upon 100 parts by weight of the polymer component (total of the thermoplastic resin and elastomer component).

The production process of the thermoplastic elastomer composition constituting the gas barrier layer in the present invention comprises mixing a thermoplastic resin and elastomer component selected so as to satisfy the conditions of the above formula (1) by a twin-screw extruder etc. and causing the elastomer component to disperse into the thermoplastic resin forming the continuous phase. When vulcanizing the elastomer component, the vulcanizer may be added while mixing to cause the elastomer component to dynamically vulcanize. Further, the various compounding agents, except the vulcanizer, may be added to the thermoplastic resin or the elastomer component during the above mixing, but are preferably blended before the mixing. The kneader used for mixing the thermoplastic resin and elastomer component is not particularly limited, but a screw extruder, kneader, Bambury mixer, twin-screw extruder may be mentioned. Among these, for kneading a thermoplastic resin and elastomer component and for the dynamic vulcanization of the elastomer component, a twin-screw extruder are preferably used. Further, it is possible to use two or more types of kneaders and successively perform kneading. As the conditions for the mixing, the temperature should be at least the temperature at which the thermoplastic resin melts. Further, the shear rate at the time of mixing is preferably 1000 to 7500 $sec^{-1}$. The time for the overall mixing is from 30 sec to 10 minutes. Further, when adding a vulcanizer, the vulcanization time after addition is preferably from 15 sec to 5 minutes.

To obtain such a thermoplastic elastomer composition with a thermoplastic resin component as a continuous phase and an elastomer component as a dispersed phase, even if the thermoplastic resin component and the elastomer component are kneaded in a molten state, a thermoplastic elastomer of the desired dispersed structure will not necessarily be obtained. In addition to the above mixing conditions, it is further important to control the volume fraction of the two components used (in particular, for flexibility) to the desired elastomer volume fraction or to control the properties of the two components aiming at the maximum elastomer volume fraction.

For the control of the ratio of the two components, a predetermined relationship stands between the inherent melt viscosities of the thermoplastic resin component and the elastomer component used at the time of mixing and the solubilities of the two components (solubility parameters) (shown in formula (1)). By controlling the interrelationship between these properties, it is possible to maximize the kneadable elastomer component or to control the dispersed structure of the thermoplastic elastomer desired by a certain ratio of elastomer.

In the present invention, it was found that it was possible to control the melt viscosities and solubilities of the two components, thereby leading to the present invention. Due to the effect of the present invention, the control of the dispersed structure of other than specific components, which had been difficult in the past, and the control of the dispersed structure of the composition of a high rubber ratio become possible.

Note that, here, the melt viscosity means the melt viscosity of any temperature or component at the time of mixing.

The melt viscosity of each polymer material is dependent on the temperature, the shear rate ($sec^{-1}$), and the shear stress, so the stress and shear rate of the polymer material at any temperature in the molten state capable of flowing through capillary, in particular, the temperature region at the time of mixing, are measured and the melt viscosity is measured by the following formula:

$$\eta = \sigma/\gamma$$

(Here, $\sigma$: shear stress, $\gamma$: shear rate)

Note that, the melt viscosity is measured by using a Capillary Rheometer Capillograph 1C made by TOYO SEIKI SEISAKU-SHO, LTD.

Further, in the present invention, the thermoplastic resin component and the elastomer component and the melt viscosities and the solubility parameters of components need not be those of single components. When two or more types of polymers are used, the solubility parameter may be calculated using the weighted average values of each of the polymer components used, and, further, the melt viscosity may be calculated using the weighted average of the polymer components of the constituent thermoplastic resin component or the elastomer component at the temperature of mixing of any polymer component.

The thermoplastic elastomer composition produced by the above method and the control of the physical and chemical properties of the thermoplastic resin component (A) and the elastomer component (B) is next extruded or calendared to form a film. The film-forming process may be any process for forming a film from a usual thermoplastic resin or thermoplastic elastomer.

The thin film thus obtained had the structure of the elastomer component (B) dispersed as a discontinuous phase in the matrix of the thermoplastic resin (A) in a high elastomer ratio. By making this dispersed state, it is possible to impart a balance of flexibility and an air barrier property and further to obtain the effects of improvement of the resistance to heat deformation and improvement of the waterproofness and, further, to process like a thermoplastic elastomer composition to form a film by the usual forming machine for thermoplastic resin, that is, extrusion or calendaring.

The process of producing a hose composed of an inner tube, reinforcing layer, and outer cover using the thermoplastic elastomer composition according to the present invention will be explained below.

First, pellets of the thermoplastic elastomer composition of the present invention composition are used and the thermoplastic elastomer composition extruded on a mandrel coated in advance with a release agent from a thermoplastic resin-use extruder by the cross-head extrusion method to form an inner tube. Then, another thermoplastic elastomer of the present invention or another general type is extruded on the inner tube to form the outer layer of the inner tube.

Next, an adhesive is coated, sprayed, or otherwise applied on the inner tube depending upon the need. Next, a reinforcing yarn or reinforcing steel wire is braided on the inner tube by a braiding machine. If necessary, an adhesive is coated on the reinforcing layer for the bonding with the outer cover, then another thermoplastic elastomer of the present invention or another general type is similarly extruded from a cross-head thermoplastic resin-use extruder to form the outer cover. Finally, the mandrel is pulled out, whereupon a low permeability hose of the present invention is obtained.

As the adhesive coated on the inner tube or on the reinforcing layer, an isocyanate, urethane, phenol thermoplastic resin, resorcin, chlorinated rubber, HRH, other adhesives may be mentioned, but an isocyanate or urethane adhesive is preferred.

In the above process of production, a mandrel was used, but there is no vulcanization process as required for the production of a normal rubber hose or rubber thermoplastic resin composite hose, and therefore, there is no compression deformation caused by the heat during vulcanization or deformation caused by the pressure during vulcanization and the dimensions of the hose can be easily maintained, and therefore, when strict dimensional precision is not particularly required, the hose may be produced without using a mandrel as well.

Note that, the thermoplastic elastomer composition of the present invention may be used for rubber products relating to the control of permeation of gases (gas, air, etc.), for example, fenders, rubber gloves, fuel tanks, etc.

In the fourth aspect of the present invention, in the first step, it is necessary to form a thermoplastic elastomer composition composed of rubber composition/matrix thermoplastic resin where a rubber dispersed finely in a matrix thermoplastic resin. As this matrix thermoplastic resin component, a thermoplastic resin other than one used as the later mentioned barrier thermoplastic resin (low gas permeable thermoplastic resin) is used. For this, nylon 11 (N11), nylon 12 (N12), nylon 610 (N610), nylon 612 (N612), nylon 6T, nylon 6/6T copolymer, nylon 66/PP copolymer, nylon 66/PPS copolymer, and other polyamide thermoplastic resins, polybutylene terephthalate (PBT), polybutylene terephthalate/tetramethylene glycol copolymer, polyacrylate (PAR), polybutylenenaphthalate (PBN), liquid crystal polyester, polyoxyalkylenediimidate/polybutylene terephthalate copolymer, and other polyester thermoplastic resins; polyacrylonitrile (PAN), polymethacrylonitrile (PMN), acrylonitrile/styrene copolymer (AS), methacrylonitrile/styrene copolymer, methacrylonitrile/styrene/butadiene copolymer, and other polynitrile thermoplastic resins; polymethyl methacrylate (PMMA), polyethylmethacrylate, ethylene ethylacrylate copolymer (EEA), ethylene acrylic acid copolymer (EAA), ethylene methylacrylate (EMA), and other poly(metha)acrylate thermoplastic resins; vinyl acetate (EVA), polyvinyl chloride (PVC), and other vinyl resins; cellulose acetate, cellulose acetate butyrate, and other cellulose thermoplastic resins; polyvinylidene fluoride (PVDF), polyvinyl fluoride (PVF), polychlorofluoroethylene (PCTFE), tetrafluoroethylene/ethylene copolymer (ETFE), and other fluororesins; aromatic imides and other imide thermoplastic resins; etc. may be mentioned.

Further, as the rubber component forming the thermoplastic elastomer composition composed of the above rubber/matrix thermoplastic resin, natural rubber, synthetic polyisoprene rubber (IR), epoxylated natural rubber, styrene-butadiene rubber (SBR), polybutadiene rubber (BR), nitrile-butadiene rubber (NBR), hydrogenated NBR, hydrogenated SBR, and other diene rubbers and their hydrogenated compounds; ethylene propylene rubber (EPDM, EPM), maleic acid-modified ethylene propylene rubber (M-EPM), butyl rubber (IIR), anisobutylene and aromatic vinyl or diene monomer copolymers, acryl rubbers (ACM), ionomers, halogon-containing rubbers (Br-IIR, Cl-IIR, a bromide of isobutylene p-methylstyrene copolymer (Br-IPMS), chloroprene rubber (CR), hydrin rubbers (CHC, CHR), chlorosulfonated polyethylene (CSM), chlorinated polyethylene (CM), maleic acid-modified chlorinated polyethylene (M-CM)), and other olefin rubbers; methylvinylsilicone rubber, dimethylsilicone rubber, methylphenylvinylsilicone rubber, and other silicone rubbers; polysulfide rubber and other sulfur-containing rubbers; vinylidene fluoride rubbers, fluorine-containing vinyl ether rubbers, tetrafluoroethylene-propylene rubbers, fluorine-containing silicone rubbers, fluorine-containing phosphagen rubbers, and other fluororubbers; styrene elastomers, olefin elastomers, polyester elastomers, urethane elastomers, polyamide elastomers, and other thermoplastic elastomers, etc. may be mentioned. In particular, a rubber component include a bromide of an isobutylene-p-methylstyrene copolymer (Br-IPMS) is preferred.

Further, the rubber composition forming the dispersed phase may have suitably blended in it, in addition to these rubber components, other agents generally blended for improving the dispersion, heat resistance, etc. such as reinforcing agents, fillers, cross-linking agents, softener, antioxidants, and processing aids depending upon need.

Further, the content of the rubber polymer component in the rubber composition is preferably 25 to 99% by weight, particularly preferably 33 to 98% by weight. Further, the ratio of composition of the rubber composition forming the thermoplastic elastomer composition comprised of the above rubber/matrix thermoplastic resin and the thermoplastic resin composition forming the matrix is usually 10/90 to 90/10, preferably 20/80 to 85/15.

When the solubilities of the afore-mentioned thermoplastic resin composition and rubber composition differ, blending in a compatibilizer is preferable to cause the two to be soluble in each other. By blending in the compatibilizer, the surface tension between the thermoplastic resin composition and rubber composition is decreased and the size of the rubber particles forming the dispersed phase becomes smaller, and therefore, the properties of the two components can be expressed more effectively. As such a compatibilizer, in general one having the construction of a copolymer having one or both of the structures of the thermoplastic resin and rubber component or a structure of a copolymer having a group reactable with the thermoplastic resin or rubber component such as an epoxy group, carbonyl group, halogen group, amine group, oxazoline group, or hydroxy group can be used. These may be selected depending on the type of the thermoplastic resin and elastomer component to be mixed, but the generally used ones are anhydrous maleic acid-modified polypropylene, anhydrous maleic acid-modified ethylene-ethylacrylate copolymer, epoxy modified styrene/butadiene-styrene copolymer, styrene/ethylene/butylene block copolymer (SEBS) and its maleic acid-modified forms, EPDM, EPDM/styrene or EPDM/acrylonitrile graft copolymer and its maleic acid-modified form, styrene/maleic acid copolymer, reactive phenoxy thermoplastic resins, etc. may be mentioned. The amount of the compatibilizer blended is not particularly limited, but preferably is 0.5 to 20 parts by weight with respect to 100 parts by weight of the polymer component (total of thermoplastic resin and rubber component).

Further, using this compatibilizer, it is desirable to make the particle size of the rubber of the dispersed phase not more then 10 $\mu$m, further not more than 5 $\mu$m, in particular 0.1 to 2 $\mu$m.

Note that the vulcanizer, vulcanization accelerator, activator, vulcanization conditions (temperature and time), etc. when dynamically vulcanizing the rubber composition may be suitably selected depending upon the composition of the rubber composition added and is not particularly limited.

As the vulcanizer, the above-mentioned general rubber vulcanizers (cross-linking agents), that is, sulfur vulcanizers, organic peroxide vulcanizers, phenol thermoplastic resin vulcanizers, zinc oxide, magnesium oxide, litherge, p-quinoneoxime, p-dibenzoylquinoneoxime, tetrachloro-p- benzoquinone, poly-p-dinitrosobenzene, and methylenedianiline may be used. Further, if necessary, the above general vulcanization accelerators may also be added.

Further, in the present invention, the abovementioned first step batch (thermoplastic elastomer composition) has a barrier thermoplastic resin (low gas permeability thermoplastic resin) added and mixed. The barrier thermoplastic resin is controlled in morphology to a layer structure in the following sheeting, tubing, or other processing step. Effectively used as this barrier thermoplastic resin component are nylon 6 (N6), nylon 66 (N66), aromatic nylon (MXD6), and other polyamide thermoplastic resins, polyethylene terephthalate (PET) and other polyester thermoplastic resins, vinyl alcohol-ethylene copolymer (EVOH) and polyvinyl alcohol (PVA) and other polyvinyl family thermoplastic resins, polyvinylidene chloride (PVDC) and other polyvinylidene chloride thermoplastic resins, etc. may be mentioned.

Further, the amount of the barrier thermoplastic resin component blended in the above the first step batch is determined by the above predetermined formula relating to the necessary volume fraction ratios of the two components and the ratio of viscosities at the time of mixing in the desired composition, but usually the ratio of weight of the first step batch and the barrier thermoplastic resin component is selected in the range of 90/10 to 50/50.

In the present invention, the process of production of a composition having a layered structure due to the morphology of the multi-component system blend of the rubber/matrix thermoplastic resin/barrier thermoplastic resin where the rubber disperses finely and the barrier thermoplastic resin is concentrated comprises, in the first step, of mixing a rubber (unvulcanized) component and matrix thermoplastic resin component by a twin-screw extruder etc. to disperse the rubber component in the matrix thermoplastic resin forming the continuous phase. The various compounding agents for the rubber component or the matrix thermoplastic resin component including the vulcanizer may be added during the above mixing, but preferably are premixed before the mixing. The kneader used for kneading the rubber component and the matrix thermoplastic resin component is not particularly limited, but a screw extruder, kneader, Bambury mixer, twin-screw extruder, etc. may be mentioned. In particular, for mixing the matrix thermoplastic resin component as the rubber component and for the dynamic vulcanization for vulcanization during the mixing of the rubber component, a twin-screw extruder is preferably used. As the mixing conditions, the temperature should be at least the temperature at which the matrix thermoplastic resin melts. Further, the shear rate at the time of mixing is preferably 1000 to 7500 $sec^{-1}$. The mixing time in the first step us from 30 sec to 10 minutes. Further, when adding a vulcanizer, the dynamic vulcanization time after addition is preferably from 15 sec to 5 minutes.

In the next second step, first, the first step batch (thermoplastic elastomer composition) is extruded into strands from the front end of the twin-screw extruder. These are cooled by water etc., then pelletized by a thermoplastic resin-use pelletizer. Into these are blended pellets of the barrier thermoplastic resin composition. The blend is supplied in fixed quantities as a normal blend of pellets of a blender etc. (dry blend) or from two types of feeders during the kneading in the second step.

The blend is processed at a low (10 $sec^{-1}$ or more, less than 1000 $sec^{-1}$) shear rate by, for example, an ordinary thermoplastic resin use single-screw extruder to melt knead the first step batch and the barrier thermoplastic resin composition. This is then formed into a sheet, film, or tube by a T-sheeting die, straight or cross-head construction tubing die, inflation molding cylindrical die, etc. at the front end of the single-screw extruder for use for a pneumatic tire or hose or other rubber/thermoplastic resin laminate.

Note that, in the second step, the blend may be shaped by the above single-screw extruder for thermoplastic resin after being taken up in strands and pelletized by the above single-screw extruder for thermoplastic resin.

By controlling the above α value, ratio of viscosities, and ratio of volume fractions to knead the first step batch and the barrier thermoplastic resin composition in the above process, the above barrier thermoplastic resin composition is added to the matrix thermoplastic resin composition in the first step batch with a relatively high shear so the structure is controlled to a dispersed one where it is finely dispersed to form a flat layer and a low gas permeable elastomer thermoplastic resin composition formed with a gas barrier layer made of the barrier thermoplastic resin composition is obtained.

The film on thin tube thus obtained is composed of the low permeability thermoplastic elastomer resin composition controlled in the morphology of the multiple-component system blend of the rubber/matrix thermoplastic resin/barrier thermoplastic resin of the present invention. As explained in more detail later, it is composed of a composition where the rubber is finely dispersed and the barrier thermoplastic resin has a flat layered structure. This thin film therefore has, in addition to flexibility, a remarkable gas barrier property. Therefore, it can be effectively used for the hose tubes and hose covers of low permeability hoses.

For the thermoplastic resin used for the thermoplastic resin component in the thermoplastic elastomer composition in which is dispersed an elastomer blended as the component (A) in the functional thermoplastic elastomer composition according to the fifth aspect of the present invention, any thermoplastic resin component having an air permeation coefficient of not more than $25 \times 10^{-12}$ cc·cm/cm²·sec·cmHg, preferably $0.1 \times 10^{-12}$ to $10 \times 10^{-12}$ cc·cm/cm²·sec·cmHg or an HFC134a fluorocarbon gas permeation coefficient of not more than 5 mg·mm/24 hr·cm², and a Young's modulus of not less than 500 MPa, preferably 500 to 3000 MPa may be used. The amount blended is at least 15% by weight, preferably 20 to 85% by weight based upon total weight of the polymer component including the thermoplastic resin component and elastomer component.

As such a thermoplastic resin, for example, the following thermoplastic resins and any mixtures of the thermoplastic resins thereof or including these may be mentioned. Further, the thermoplastic resin component may contain an antioxidant, agent for preventing deterioration due to heat, stabilizer, processing aid, pigment, dye, etc.

Polyamide thermoplastic resins (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6, nylon 6T, nylon 6/6T copolymer, nylon 66/PP copolymer, nylon 66/PPS copolymer), polyester thermoplastic resins (for example, polybutylene terephthalate (PBT), polyethylene terephthalate (PET), polyethylene isophthalate (PEI), polybutylene terephthalate/tetramethylene glycol copolymer, PET/PEI copolymer, polyacrylate (PAR), polybutylenenaphthalate (PBN), liquid crystal polyester, polyoxyalkylenediimidodiacid/polybutylene terephthalate copolymer, and other aromatic polyesters), polynitrile thermoplastic resins (for example, polyacrylonitrile (PAN), polymethacrylonitrile, acrylonitrile/styrene copolymer (AS), methacrylonitrile/ styrene copolymer, methacrylonitrile/styrene/butadiene copolymer), poly(metha)acrylate thermoplastic resins (for example, polymethylmethacrylate (PMMA), polyethylmethacrylate), vinyl resins (for example, vinyl acetate, polyvinylalcohol (PVA), vinylalcohol/ethylene copolymer (EVOH), polyvinylidene chloride (PVDC), polyvinyl chloride (PVC), vinyl chloride/vinylidene chloride copolymer, vinylidene chloride/methylacrylate copolymer), cellulose thermoplastic resins (for example, cellulose acetate and cellulose acetate butyrate), fluororesins (for example, polyvinylidene fluoride (PVDF), polyvinyl fluoride (PVF), polychlorofluoroethylene (PCTFE), tetrafluoroethylene/ethylene copolymer (ETFE)), imide thermoplastic resins (for example, aromatic polyimide (PI)), etc. may be mentioned.

As explained above, these thermoplastic resins must have the specific air (gas) permeation coefficient, Young's modulus, and amount of blending. No material having a flexibility of a Young's modulus of not more than 500 MPa and an air permeation coefficient of not more than $25\times10^{-12}$ cc·cm/cm$^2$·sec·cmHg or an HFC134a fluorocarbon gas permeation coefficient of not more than 5 mg·mm/24 hr·cm$^2$ has yet been developed industrially. Further, if the air permeation coefficient is more than $25\times10^{-12}$ cc·cm/cm$^2$·sec·cmHg or the HFC134a fluorocarbon gas permeation coefficient is more than 5 mg·mm/24 hr·cm$^2$, the aforementioned air or gas barrier property of a gas barrier property composition for a hose will be decreased and the function of the gas barrier layer of the hose will not longer be performed. Further, if the amount of the thermoplastic resin blended is less than 10% by weight, similarly the gas barrier property will fall and the composition will not be able to be used as the air (gas) barrier layer of a hose.

The elastomer component in the thermoplastic elastomer composition including the elastomer component forming the dispersed phase blended as the component (A) in the functional thermoplastic elastomer composition according to the present invention is any elastomer with an air permeation coefficient of larger than $25\times10^{-12}$ cc·cm/cm$^2$·sec·cmHg or a gas permeation coefficient of larger than 5 mg·mm/24 hr·cm$^2$ and a Young's modulus of not more than 500 MPa or any blend of the same or an elastomer composition comprising these plus compounding agents generally blended into elastomers for improving the dispersion, heat resistance, etc. of the elastomer such as reinforcing agents, fillers, cross-linking agents, softener, antioxidants, and processing aids added as necessary. The amount blended is at least 10% by weight, preferably 10 to 85% by weight, with respect to the total weight of the component (A) constituting the functional thermoplastic elastomer composition forming the gas barrier layer.

The elastomer constituting this elastomer component is not particularly limited so long as it has the above air or gas permeation coefficient and Young's modulus, but for example the following may be mentioned.

Diene rubbers and their hydrogenated products (for example, NR, IR, epoxylated natural rubber, SBR, BR (high cis BR and low cis BR), NBR, hydrogenated NBR, hydrogenated SBR), olefin rubbers (for example, ethylenepropylene rubber (EPDM, EPM), maleic acid-modified ethylenepropylene rubber (M-EPM)), butyl rubber (IIR), isobutylene and aromatic vinyl or diene monomer copolymers, acryl rubber (ACM), ionomers), halogen-containing rubbers (for example, Br-IIR, CI-IIR, a bromide of isobutylene-p-methylstyrene copolymer (Br-IPMS), chloroprene rubber (CR), hydrin rubbers (CHC, CHR), chlorosulfonated polyethylene (CSM), chlorinated polyethylene (CM), maleic acid-modified chlorinated polyethylene (M-CM)), silicone rubber (for example, methylvinylsilicone rubber, dimethylsilicone rubber, methylphenylvinylsilicone rubber), sulfur-containing rubbers (for example, polysulfide rubber), fluororubber (for example, vinylidene fluoride rubbers, fluorine-containing vinylether rubbers, tetrafluoroethylene-propylene rubbers, fluorine-containing silicone rubbers, fluorine-containing phosphagen rubbers), thermoplastic elastomers (for example, styrene elastomers, olefin elastomers, polyester elastomers, urethane elastomers, and polyamide elastomers), etc. may be mentioned. In particular, an elastomer component containing a bromide of isobutylene p-methylstyrene copolymer (Br-IPMS) is preferred.

The functional thermoplastic resin component blended as the component (B) in the functional thermoplastic elastomer composition according to the present invention may be any which has an active substituent group contributing to the adhesiveness, anti-static property, barrier property, UV blockage, biocompatibility, etc. of the thermoplastic resin structure. However, this functional thermoplastic resin material must have be an insoluble one with respect to the above thermoplastic elastomer composition (A) in which the above elastomer component is dispersed which is blended in the functional thermoplastic elastomer of the present invention and have a difference in solubility parameter (SP value) of more than 1.0 or else when the dispersed state is subjected to the later explained shear stress, it will not form an effective flat shape and be positioned at the periphery of the layer or enable its inherent function to be used. Further, satisfaction of the condition in the above formula (1) that $\alpha<1.0$ is necessary for causing the functional thermoplastic resin component to finely disperse as a dispersed phase in the above component (A). Further, the functional thermoplastic resin material (B) is blended in so as to give a volume fraction of 1 to 40% with respect to the above functional thermoplastic elastomer composition.

Here, the SP value is found by calculation from the chemical structures of the thermoplastic resin component, elastomer component, and functional thermoplastic resin component used. It is found from the formula of Small and the formula of Hoftyzer-Van Krevelen based on the known atomic group contributing method.

The functional thermoplastic elastomer composition of the present invention is a blend of chemically insoluble polymers having basically solubility parameters of values (SP values) more than 1.0 as explained above, so with this alone, the strength of the interface between the two polymers is weak and when mechanical strength or a high durability and fatigue resistance are particularly required, the desired elongation and other mechanical properties cannot be exhibited, so addition of a compatibilizer is desirable. As such a compatibilizer, in general those having the construction of a copolymer having one or both of the structures of the thermoplastic resin component and functional thermoplastic resin component or a structure of a copolymer having a group reactable with the thermoplastic resin or rubber component such as an epoxy group, carbonyl group, halogen group, amine group, oxazoline group, or hydroxy group can be used. These may be selected depending on the type of the two thermoplastic resin components to be blended, but the generally used ones are styrene/ethylene/butylene block copolymer (SEBS) and its maleic acid-modified form, EPDM, EPDM/styrene, or EPDM/acrylonitrile graft copolymer and their maleic acid-modified forms, and other polyolefin family or modified polyolefin family thermoplastic resin components, styrene/maleic acid copolymer, reactive phenoxy thermoplastic resins, etc. The amount of the compatibilizer blended is not particularly limited, but preferably is 0.5 to 10% by weight, preferably 1.0 to 10% by weight with respect to the total weight of the component (A) and component (B) in the functional thermoplastic elastomer component.

The production process of the functional thermoplastic elastomer composition in the present invention comprises finely kneading a predetermined ratio of a thermoplastic resin component forming the continuous phase and an elastomer component forming the dispersed phase, preferably, an elastomer component which cross-links (vulcanizes) during kneading, that is, dynamically cross-links (vulcanizes), by for example a twin-screw extruder at a relatively high shear stress to produce a thermoplastic elastomer composition (A), then blending this and a predetermined functional thermoplastic resin (B) in a single-screw extruder for thermoplastic resin by a relatively low shear rate, then using a normal T-die or tubing die for forming a tube shape etc. to shape the blend from the end of the single-screw extruder in a range satisfying the conditions of the melt viscosity and volume fractions of the components (A) and (B) into a film, sheet, plate, rod, or tube so that the component (B) is concentrated at the outside.

Here, as the conditions of the relatively high shear stress of the twin-screw extruder, the shear rate should be 1000 to 7500 sec$^{-1}$. The relatively low shear stress conditions of the single-screw extruder etc. is preferably a shear rate of from 1 to less than 1000 sec$^{-1}$.

The articles thus extruded will, if in a range satisfying the conditions of the above formula (1) and difference of SP values, have the above functional thermoplastic resin component located primarily at the surface portion due to the rheologic fluid behavior.

Note that, the compatibilizer component (C) can be simultaneously kneaded under the above low shear stress conditions with the pre-prepared thermoplastic elastomer composition (A) and functional thermoplastic elastomer component (B) so as to improve the bonding force at the interface of the component components (A) and (B). Further, a similar effect can be obtained even if simultaneously or separately inserting and dispersing the thermoplastic elastomer component when kneading the thermoplastic resin component and the elastomer component of the thermoplastic elastomer composition (A) at a relatively high shear stress by the twin-screw extruding etc. That is, in the present invention, by adding the component (C) in 0.5 to 10% by weight with respect to the total weight of the component (A) and component (B), the properties of the thermoplastic elastomer composition itself will not be impaired and the function of the functional thermoplastic resin component will be given integrally. Further, in the present invention, since the above functional thermoplastic resin component is concentrated in the dispersed structure, even with a small amount of the functional thermoplastic resin component, its function can be exhibited to the maximum effective extent.

Production of the adhesive thermoplastic elastomer composition using an adhesive thermoplastic resin as the functional thermoplastic resin component in the present invention requires the production first of the thermoplastic elastomer composition of the component (A). The process of production of this component comprises mixing the above thermoplastic resin component and elastomer component (unvulcanized component without vulcanizing (cross-linking) agent) by a twin-screw extruder etc. to cause the elastomer component to disperse as a dispersed phase (domain) in the thermoplastic resin forming the continuous phase (matrix). When cross-linking (vulcanizing) the elastomer component at this time, the vulcanizer and, if necessary, the vulcanization accelerator, activator are added during the kneading so as to cause the elastomer component to dynamically vulcanize. Further, the various compounding agents, except vulcanizer, for the thermoplastic resin or the elastomer component may be added during the kneading or be premixed before the kneading. As the conditions for the mixing at this time, the temperature may be any temperature above that where the thermoplastic resin component melts. Further, the shear rate at the time of mixing is preferably 1000 to 7500 sec$^{-1}$. The mixing time is 30 sec to 10 minutes. Further, when adding a cross-linking (vulcanizing) agent, the vulcanization time after the addition is preferably from 15 sec to 5 minutes.

The elastomer composition according to the present invention may further have blended into it components blended into general elastomers such as fillers (calcium carbonate, titanium oxide, alumina, etc.), carbon black, white carbon, and other reinforcing agents, softener, plasticizers, processing aids, pigments, dyes, antioxidants, and the like so long as the requirements for the above air permeability or gas permeability are not impaired.

Further, when the above elastomer component is being mixed with the thermoplastic resin, the elastomer component may be dynamically vulcanized. The vulcanizer, vulcanization accelerator, vulcanization conditions (temperature and time), etc. when dynamically vulcanizing the elastomer component may be suitable selected depending upon the composition of the elastomer component added and are not particularly limited.

As the vulcanizer, the above-mentioned general rubber vulcanizers (cross-linking agents), that is, sulfur based vulcanizers, organic peroxide based vulcanizers, phenol thermoplastic resin based vulcanizers, zinc oxide, magnesium oxide, litharge, p-quinoneoxime, p-dibenzoylquinoneoxime, tetrachloro-p-benzoquinone, poly-p-dinitrosobenzene, and methylenedianiline may be used. Further, if necessary, the above general vulcanization accelerators may also be added. Further, as the vulcanization accelerator, general rubber compounding ingredients may be used together.

The thermoplastic elastomer composition produced by the above method is charged into a single-screw extruder either as it is or after being extruded from the twin-screw extruder and pelletized once. At the same time, the adhesive thermoplastic resin component is mixed in either separately or in the blended state. These are kneaded under gentle kneading conditions, then a T-die for sheeting attached to the front end of the machine or a tubing die having a pin or die construction for forming a tube is used to extrude the mixture with a certain shear stress to form the desired shape (film, sheet, plate, rod, tube, etc.) Further, the mixing time in the above single-screw extruder is preferably from 30 sec to 10 minutes.

The shaped article thus obtained has the structure where at least a part of the elastomer component is dispersed as a dispersed phase (domain) in the continuous phase (matrix) of the thermoplastic resin component and where the adhesive thermoplastic resin component is concentrated at the surface portion. Further, the compatibilizer component (c) which is added according to need forms a structure reinforcing the interface between the thermoplastic resin component and adhesive thermoplastic resin component, and therefore, improves the mechanical strength of the functional thermoplastic elastomer composition and can be suitably used.

By adopting such a dispersed structure, it is possible to obtain a shaped article which has the basic properties and advantages of the thermoplastic elastomer composition itself in which the elastomer is dispersed and, further, which is superior in adhesiveness and mechanical properties. When forming the shaped article composed of this adhesive thermoplastic elastomer composition as a film, it is possible to use it effectively for the gas barrier layer etc. of the inner tube or outer cover of a low permeability hose. Further, taking advantage of the fact that when this adhesive thermoplastic elastomer composition is extruded or molded into a rod or other predetermined shape, it forms a shaped article superior in adhesiveness, it can be effectively used for packing and the top materials for packing for window frames or for the packing materials for joints of automobile lights etc.

In the process of production of a gas low permeability hose composed of the adhesive thermoplastic elastomer composition according to an embodiment of the present invention, the composition can be used straight for the inner tube or the outer cover of a hose, but any construction using the adhesiveness and the gas barrier property can be used, for example, a low permeability hose comprising this as a sheet for use as a gas barrier layer for the inner layer of the inner tube and a rubber composition for the outer layer of the inner tube, reinforcing layer, and outer cover. Explaining the case of a low permeability hose composed of this as a sheet for use as a gas barrier layer for the inner layer of the inner tube and a rubber composition for the outer layer of the inner tube, reinforcing layer, and outer cover, first the adhesive thermoplastic elastomer composition obtained by the above process of the present invention is extruded on to a mandrel precoated with a release agent by an extruder for thermoplastic resin having a cross-head construction to form the gas barrier layer of the inner layer of the inner tube, then an extruder for rubber is used to extrude the rubber outer layer of the inner tube, a braiding machine is used to braid a suitable reinforcing yarn to form a fiber reinforcing layer, then similarly a rubber outer cover is extruded by a rubber use extruder having a rubber use cross-head construction. Next, a vulcanization drum etc. is used to vulcanize the rubber layer, the assembly is cooled, then the mandrel is pulled out to obtain the low permeability hose of the present invention.

Note that in the production process of the hose, while a mandrel is used, the low permeability hose of the present invention can be produced without the use of a mandrel when a particularly strict dimensional precision is not required.

In the production of the above hose, the inner layer of the inner tube serving as the gas barrier layer has a phase structure where the above adhesive thermoplastic resin material component is concentrated at the surface portion, so it is not necessary to coat an adhesive on the outer layer again as in the prior art. The outer layer of the inner tube need merely be extruded thereby simplifying the work by that amount.

INDUSTRIAL APPLICABILITY

As explained in detail above, the thermoplastic elastomer composition of the present invention has a superior gas barrier property and moisture barrier property and an excellent flexibility in a good balance and can be suitably used for various types of applications where these properties are demanded. Further, according to the production process of the thermoplastic elastomer composition of the present invention, it is possible to suitably produce a thermoplastic elastomer composition having such superior properties.

Further, the hose of the present invention using this thermoplastic elastomer composition has a superior gas barrier property and moisture barrier property and an excellent flexibility in a good balance and can particularly suitably be used for a hose for transporting a refrigerant. Further, the thermoplastic elastomer composition excellent in flexibility and superior in gas (air, gas) barrier property of the present invention, if used for a gas barrier layer of an inner tube and/or outer cover of a hose, enables these to be made thinner, and therefore, can contribute to the lower weight of the hose. While permeable hoses were explained in detail, the present invention is not limited to the above examples and can be of course improved and modified in various manners within a range not exceeding the gist of the present invention.

EXAMPLES

The present invention will now be further illustrated by, but is by no means limited to, the following Examples.

Examples I-1 to I-7 and Comparative Examples I-1 to I-8

The components shown in the following Table I-1, that is, the polyamide thermoplastic resin, rubber component (rubber polymer or rubber composition), and cross-linking agent were used as follows to prepare various thermoplastic elastomer compositions.

First, a twin-screw extruder was used to mix pellets of a polyamide thermoplastic resin charged from a first charging port at a speed of 200 rpm and a temperature of 220° C., then pellets of a rubber component not containing cross-linking agent were charged from a second charging port so as to disperse a rubber component in the polyamide thermoplastic resin. Next, a cross-linking agent was charged from a third charging port so as to dynamically cross-link the rubber polymer of the rubber component continuously over 45 sec and obtain the composition. Note that, Comparative Example I-6 of Table I-1 is an example where the polyamide thermoplastic resin, rubber component, and cross-linking agent are simultaneously charged from the first charging port.

Next, the composition was extruded as strands from the discharge port of the twin-screw extruder. These were water-cooled and pelletized by a pelletizer for thermoplastic resin, thereby obtaining pellets of the various types of thermoplastic elastomer compositions shown in Table I-1.

Note that, when using a number of polyamide thermoplastic resins as in Examples I-4 and I-5 of Table I-1, the pellets of the thermoplastic resins used are mixed in advance and the mixture is charged into the first charging port of the twin-screw extruder.

Further, when using a rubber polymer alone as the rubber component as in Example I-1 etc., pellets of the rubber polymer alone not including a cross-linking agent obtained by a rubber use pelletizer are used. On the other hand, when using a rubber composition as the rubber component as in Examples I-6 and I-7, the rubber polymer and compounding agents, not including the cross-linking agent, are mixed by a Bambury mixer, formed into a sheet of approximately 2.5 mm by a roll for rubber, then pelletized and used.

The components in Table I-1 were as follows:
Polyamide thermoplastic resin
  N6; nylon 6 (made by Toray Corp., CM1041)
  N12; nylon 12 (made by Toray Corp., AESN 0 TL)
  N612; nylon 612 (made by Daicel Chemical Industries, Daiamide D-18)

Rubber component

IIR; butyl rubber (made by Exxon Chemical, Exxon Butyl 268)

Cl-IIR; chlorinated butyl rubber (made by Exxon Chemical, Chlorobutyl 1066)

X-IPMS; brominated-polyisobutylene-p-methylstyrene copolymer rubber (paramethylstyrene content: 7.5 wt %, bromine content: 2.0 wt %, $ML_{1+8}$ (125° C.): 45)

Carbon black; GPF grade carbon black (made by Tokai Carbon, Seast V)

Oil; paraffin family oil (made by Nihon San Sekiyu, Sanpar 2280)

Cross-linking agent

Br-APR; brominated alkylphenol thermoplastic resin (made by Taoka Chemical Co., Tackirol 250-I)

Accelerator TT; tetramethylthiuramdisulfide (made by Ouchi Shinko Chemical Industrial, NOCCELER TT)

The pellets obtained from the thermoplastic elastomer compositions were formed into sample sheets having a thickness of 0.5 mm and a width of 300 mm using a thermoplastic resin use extruder having a T-die.

The sample sheets were subjected to tests of their tensile properties based on JIS K6301 "Test Method for Tensile Properties of Vulcanized Rubber" at 20° C. and 120° C. (Young's modulus [MPa], tensile strength [kgf/cm$^2$], elongation at break [%]) and further were measured as for refrigerant (HFC134a) gas permeation coefficient and moisture permeation coefficient (80° C.). Note that, the methods for measurement of the two coefficients were as follows:

Measurement of Refrigerant Gas Permeation Coefficient

Figure 3:
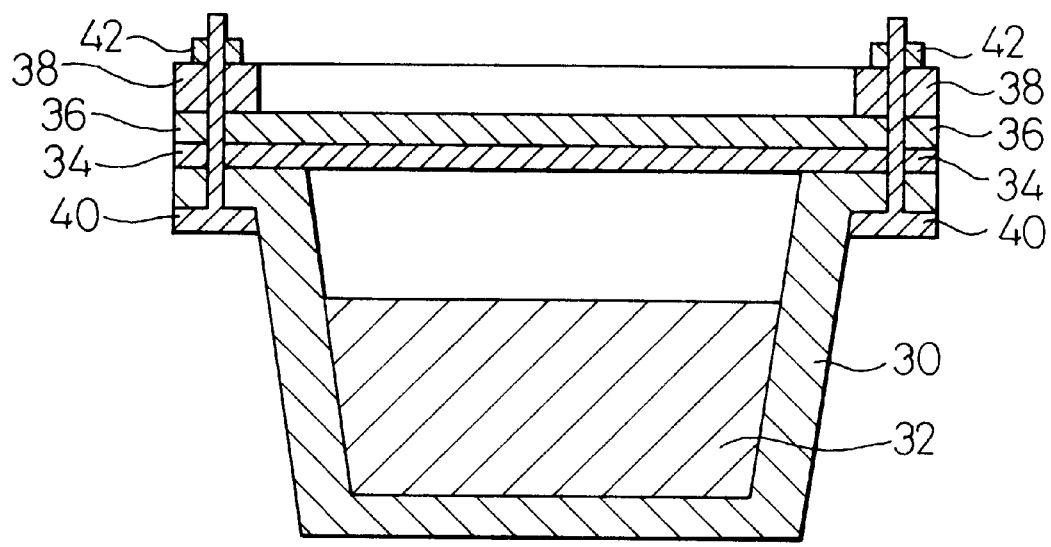
FIG. 3 is a conceptual view for explaining the method of measurement of the refrigerant gas permeation coefficient and moisture permeation coefficient.

A stainless steel cup 30 as shown in FIG. 3 was filled to a refrigerant (HFC134a, reference 32) to half of the cup's capacity. The top opening of the cup 30 was covered by a sample sheet 34 obtained by cutting the above sample sheet, then a sintered metal plate 36 was placed on top and the assembly was fastened through a fixing member 38 by bolts 40 and nuts 42.

The cup was allowed to stand in a 100° C. atmosphere. After 24 hours, the entire weight was measured and the loss was calculated, then the gas permeation coefficient was calculated by the following formula:

Gas permeation coefficient [(mg·mm)/(24 hr·cm$^2$)]=(M·t)/(T·A)

where, in the above formula, A=permeation area [cm$^2$], T=test time [day], M=weight loss [mg], t=thickness of test piece [mm].

Measurement of Moisture Permeation Coefficient

The same procedure was followed as in the measurement of the above gas permeation coefficient to measure the moisture permeation coefficient except that instead of a refrigerant, water was used, and the ambient temperature was made 80° C.

Further, the pellets of the above thermoplastic elastomer compositions were used to prepare sample hoses in the same way as in the afore-mentioned process of production which were measured as to their various properties.

The sample hoses were prepared by first using a single-screw thermoplastic resin use extruder having a cross-head to extrude the pellets on a nylon 11 mandrel of an outer diameter of 11.0 mm on which a release agent was coated so as thereby to form an inner tube of a thickness of 1.5 mm.

A urethane adhesive (Tyrite 7411) was coated on the outer surface of the inner tube, then a polyester yarn was braided to form a reinforcing layer. The same urethane adhesive was coated on the outer surface of the reinforcing layer, then the above pellets were used in the same way as with the inner tube to form an outer cover of a thickness of 1.0 mm and thereby fabricate sample hoses.

The sample hoses obtained were measured as follows:

Measurement of Amount of Gas Permeation of Hose

This was measured in accordance with JRA2001 of the JRA Standard (Japan Refrigeration Association Standard).

A sample hose of a length of 0.45 m was sealed with a refrigerant (HFC134a) in an amount of 0.6±0.1 g per cm$^3$ of the inner volume of the hose. The hose was allowed to stand at 100° C. for 96 hours, then was measured for the weight loss between the 24th hour and 96th hour (amount of gas permeation). The weight loss was divided by the length of the hose an 72 hours to calculate the gas permeation coefficient [g/m/72 hr].

Measurement of Amount of Moisture Permeation of Hose

A sample hose allowed to stand for 5 hours in a 50° C. oven was used. The hose was filled and sealed with a desiccant (Molecular Sieve 3A) to a volume corresponding to 80% of the inside volume of the sample hose.

The hose was allowed to stand in an atmosphere of 50° C. and 95% RH and was measured for the weight increase of the desiccant every 120 hours until 400 hours. The weight increase was divided by the area of the sample hose and 24 hours to calculate the moisture permeation coefficient [g/cm$^2$/24 hr] showing the amount of permeation of moisture per day. To have a suitable moisture barrier property, the permeation coefficient must be not more than 0.2 g/cm$^2$/24 hr.

Note that what is shown in Table I-1 is the permeation coefficient of the results of measurement up to 400 hours.

Bending Rigidity of Hose

The sample hoses were bent along arcs of various radii and the bending force [kg] measured.

More specifically, the measurement started from a bending radius of 10 times the outer diameter of the sample hose, then the bending radius was successively changed up to 3 times and the bending force measured.

From the results of the measurement, a graph was prepared showing the relationship between the bending force and the bending radius. From the obtained graph, the bending force at the time of prescribed radius (4 times) was read and made the bending rigidity of the hose.

The bending rigidity of a normal rubber hose is generally about 2 kg, but with a thermoplastic resin tube construction hose, the bending rigidity reaches as much as 6 to 7 kg. With such a high rigidity thermoplastic resin tube construction hose, the work efficiency in installing and connecting hoses in small spaces such as engines is extremely poor. To obtain better work efficiency, experience shows that a bending rigidity of not more than 3.5 kg is preferable. Further, the bending rigidity (that is, the flexibility) is also correlated with the absorption of vibration. The relationship between the two parameters is nonlinear. When the bending rigidity exceeds 3.5 kg, the vibration absorption suddenly falls. Considering this, the bending rigidity of the hose is preferably not more than 3.5 kg, particularly not more than 2 kg.

Pressure Resistance of Hose

Metal fittings were attached to the two ends of a sample hose and were connected to an oil hydraulic pressure tester. Pressure was applied with heating at 120° C. The pressure applied was raised by a rate of 50 kgf/cm$^2$ per minute. The pressure at which the pressure could not be withstood at the metal fittings and the ends withdraw was measured.

The results are shown also in Table I-1.

TABLE I-1

|  |  | Comp. Ex. I-1 | Comp. Ex. I-2 | Comp. Ex. I-3 | Comp. Ex. I-4 | Ex. I-1 | Comp. Ex. I-5 | Comp. Ex. I-6 |
|---|---|---|---|---|---|---|---|---|
| Polyamide resin (comp. A) | N6 | 50.0 | — | 50.0 | 50.0 | — | — | — |
|  | N612 | — | — | — | — | 50.0 | 50.0 | 50.0 |
|  | N12 | — | 50.0 | — | — | — | — | — |
| Rubber component (comp. B) | IIR | 50.0 | 50.0 | — | — | — | — | — |
|  | Cl-IIR | — | — | 50.0 | 50.0 | — | — | — |
|  | X-IPMS | — | — | — | — | 5.0 | 50.0 | 50.0 |
|  | Carbon black | — | — | — | — | — | — | — |
|  | Oil | — | — | — | — | — | — | — |
| Cross-linking agent | Br-APR | 5.0 | 5.0 | — | — | — | — | (Simultaneous mixture of resin and rubber) |
|  | Accelerator TT | — | — | 0.1 | 0.1 | — | — |  |
|  | ZnO | — | — | 2.5 | 2.5 | — | — |  |
|  | Stearic acid | — | — | — | — | — | — |  |
|  | Zinc stearate | — | — | — | — | 0.5 | — | 0.5 |
| Sheet physical properties | Tensile properties |  |  |  |  |  |  |  |
|  | 20° C. Young's modulus [MPa] | 168 | 125 | 162 | 122 | 72 | 132 | 125 |
|  | Tensile strength [kgf/cm$^2$] | 163 | 121 | 157 | 118 | 153 | 111 | 109 |
|  | Elongation at break [%] | 10 | 20 | 10 | 20 | 90 | 20 | 20 |
|  | Tensile properties |  |  |  |  |  |  |  |
|  | 120° Young's modulus [MPa] | 58 | 44 | 57 | 43 | 25 | 45 | 44 |
|  | Tensile strength [kgf/cm$^2$] | 103 | 75 | 97 | 72 | 87 | 69 | 68 |
|  | Elongation at break [%] | 10 | 20 | 10 | 20 | 80 | 20 | 20 |
|  | Permeation coefficient |  |  |  |  |  |  |  |
|  | HFC134a [(mg · mm)/(24 hr · cm$^2$) at 100° C.] | 1.25 | 1.44 | 1.24 | 1.41 | 1.37 | 10.15 | 10.12 |
|  | Moisture [(mg · mm)/(24 hr · cm$^2$) at 80° C.] | 10.32 | 1.22 | 10.30 | 1.21 | 1.48 | 1.43 | 1.42 |
| Hose properties | Permeation coefficient |  |  |  |  |  |  |  |
|  | HFC134a [(g/m)/72 hr at 100° C.] | 3.15 | 3.63 | 3.12 | 3.55 | 3.45 | 25.58 | 25.50 |
|  | Moisture, [mg/cm$^2$/24 hr at 50° C.] | 1.55 | 0.18 | 1.55 | 0.18 | 0.22 | 0.21 | 0.21 |
|  | Hose bending rigidity [kgf] | 1.46 | 1.25 | 1.43 | 1.23 | 0.98 | 1.28 | 1.25 |
|  | Hose pressure resistance [kg/cm$^2$ at 120° C.] | 50 | 80 | 50 | 80 | 200 | 80 | 80 |

|  |  | Ex. I-2 | Ex. I-3 | Comp. Ex. I-7 | Comp. Ex. I-8 | Ex. I-4 | Ex. I-5 | Ex. I-6 | Ex. I-7 |
|---|---|---|---|---|---|---|---|---|---|
| Polyamide resin (comp. A) | N6 | — | — | — | — | 10.0 | — | — | — |
|  | N612 | 50.0 | 15.0 | 10.0 | 90.0 | 40.0 | 40.0 | 50.0 | 50.0 |
|  | N12 | — | — | — | — | — | 10.0 | — | — |
| Rubber component (comp. B) | IIR | — | — | — | — | — | — | — | — |
|  | Cl-IIR | — | — | — | — | — | — | — | — |
|  | X-IPMS | 50.0 | 85.0 | 90.0 | 10.0 | 50.0 | 50.0 | 50.0 | 50.0 |
|  | Carbon black | — | — | — | — | — | — | — | 25.0 |
|  | Oil | — | — | — | — | — | — | 25.0 | 25.0 |
| Cross-linking agent | Br-APR | — | — | — | — | — | — | — | — |
|  | Accelerator TT | — | — | — | — | — | — | — | — |
|  | ZnO | 0.25 | — | — | — | 0.25 | 0.25 | 0.25 | 0.25 |
|  | Stearic acid | 1.0 | — | — | — | 1.0 | 1.0 | 1.0 | 1.0 |
|  | Zinc stearate | 0.5 | 0.5 | 0.5 | 0.5 | 0.5 | 0.5 | 0.5 | 0.5 |
| Sheet physical properties | Tensile properties |  |  |  |  |  |  |  |  |
|  | 20° C. Young's modulus [MPa] | 68 | 39 | — | 396 | 75 | 65 | 65 | 66 |
|  | Tensile strength [kgf/cm$^2$] | 155 | 68 | — | 189 | 160 | 157 | 152 | 157 |
|  | Elongation at break [%] | 100 | 100 | — | 10 | 100 | 120 | 120 | 120 |
|  | Tensile properties |  |  |  |  |  |  |  |  |
|  | 120° C. Young's modulus [MPa] | 23 | 19 | — | 386 | 25 | 20 | 20 | 20 |
|  | Tensile strength [kgf/cm$^2$] | 89 | 36 | — | 101 | 92 | 90 | 89 | 9 |
|  | Elongation at break [%] | 90 | 80 | — | 10 | 90 | 100 | 100 | 100 |
|  | Permeation coefficient |  |  |  |  |  |  |  |  |
|  | HFC134a [(mg · mm)/(24 hr · cm$^2$) at 100° C.] | 1.32 | 1.92 | — | 1.08 | 1.18 | 1.4 | 1.43 | 1.45 |
|  | Moisture [(mg · mm)/(24 hr · cm$^2$) at 80° C.] | 1.45 | 1.35 | — | 5.67 | 1.51 | 1.44 | 1.45 | 1.46 |
| Hose properties | Permeation coefficient |  |  |  |  |  |  |  |  |
|  | HFC134a [(g/m)/72 hr at 100° C.] | 3.33 | 4.9 | — | 2.72 | 2.97 | 3.53 | 3.6 | 3.65 |
|  | Moisture [(mg/cm$^2$)/24 hr at 50° C.] | 0.22 | 0.20 | — | 0.85 | 0.23 | 0.22 | 0.22 | 0.22 |
|  | Hose bending rigidity [kgf] | 0.96 | 0.82 | — | 2.59 | 1 | 0.95 | 0.95 | 0.95 |
|  | Hose pressure resistance [kg/cm$^2$ at 120° C.] | 210 | 200 | — | 50 | 210 | 220 | 220 | 220 |

As shown in Table I-1, the conventional thermoplastic elastomer compositions (Comparative Examples I-1 to I-4), that is, thermoplastic elastomer compositions comprised using a polyamide thermoplastic resin (N6, N12) and butyl rubber or chlorinated butyl rubber and dynamically cross-linked suffered from decomposition or deterioration probably due to the high shear deterioration of the rubber component during the twin-screw extruding, and therefore, the polyamide thermoplastic resin and the rubber composition did not blend well, the breakage strength was low, as shown by the elongation at break, and excellent results could not be obtained in particular in the hose pressure resistance.

As opposed to this, in the thermoplastic elastomer composition of the present invention, the X-IPMS used as the rubber component had a high resistance to deterioration at a high shear strength, so gave superior tensile properties and flexibility. Further, sufficient physical properties were given at heating (120° C.) as well. On top of this, a superior refrigerant (HFC134a)gas barrier property and moisture barrier property were given and the desired properties of sheets and hoses were obtained. Further, the pressure resistance when made into a hose was sufficient.

Further, when the properties of the thermoplastic elastomer compositions were observed through a transmission electron microscope, thermoplastic elastomer compositions of the present invention, as shown in FIG. 1(a), showed the polyamide thermoplastic resin phase 10 serving as a matrix and the cross-linked particles 12 of the X-IPMS composition dispersed well. As opposed to this, in Comparative Example I-5 where dynamic cross-linking was not performed and in Comparative Example I-6 where the polyamide thermoplastic resin, X-IPMS composition, and cross-linking agent were simultaneously added and mixed, as shown in FIG. 1(b), polyamide thermoplastic resin phase and the rubber phase formed layers and the fluorocarbon gas barrier property and tensile properties were both poor.

Further, in Comparative Example I-7, since the amount of the X-IPMS composition blended was large, the cross-linked rubber composition ended up forming the matrix and kneading became impossible. In Comparative Example I-8, conversely the amount of the X-IPMS composition blended was too small, so the flexibility and elongation at break were low.

As opposed to this, in Examples I-1 to I-7 according to the present invention, all of the compounds were superior in the tensile properties of the sheet, the refrigerant gas and moisture barrier property, and also the hose properties.

Example II

The test and measurement methods used in the following examples were as follows:

Method of Measurement of Gas Permeation Coefficient of Thermoplastic Elastomer Composition Material The gas permeation coefficient of the thermoplastic elastomer composition materials was measured by the same method as in Example I. The refrigerant used was CFC12 or HFC134a. The sample sheet used was an extruded sheet or a sheet obtained by cutting open in inner tube in the case of an inner tube of a hose.

Amount of Gas Permeation of Hose

This was measured in the same way as in Example I.

Method of Measurement of Young's Modulus

This was performed based on JIS K6251 "Test Method for Tensile Properties of Vulcanized Rubber". That is, samples of the examples were extruded by T-die into sheets by thermoplastic resin use extruder which were then punched into JIS No. 3 dumbbell shapes in parallel to the direction of extrusion of the thermoplastic resin at the time of extrusion of the sheets. A tangent was drawn to the curve of the initial strain curve of the obtained stress and strain curve and the Young's modulus was found from the inclination of the tangent.

Bending Rigidity of Hose

A hose was bend along an arc having a predetermined radius and the bending force was measured. The measurement was started with a bending radius of 10 times the outer diameter of the hose (10D) and the bending force measured successively until 3 times (n=2).

The relationship between the bending force and bending radii obtained as a result was plotted and the value at the time of the prescribed radius (4X) was read from the curve.

The bending rigidity of a conventional hose is generally about 2.0 kgf, but with a thermoplastic resin tube construction hose, the bending rigidity reaches as much as 6 to 7 kgf. With such a thermoplastic resin tube construction hose, the working efficiency in installing and connecting hoses in small spaces such as engines is extremely poor. To obtain better work efficiency, experience shows that a bending force of not more than 3.5 kgf is preferable.

Further, the flexibility is also correlated with the absorption of vibration. The relationship between the two is nonlinear. When the bending force exceeds 3.5 kgf, the repulsion force sharply increases and the vibration absorption becomes extremely poor. Therefore, the bending force of the hose is preferably not more than 3.5 kgf, particularly not more than 2.0 kgf.

Examples II-1 to II-4 and Comparative Examples II-1 to II-7

The p-methylstyrene/isobutylene copolymer bromide (X-IPMS) polymer Nos. 1 to 8 shown in Table II-1 were pelletized by a rubber use pelletizer. Pellets of nylon 6 were charged as the thermoplastic resin into the first charging port of a twin-screw extruder and mixed, then X-IPMS polymer pellets were charged from the second charging port and mixed to disperse the X-IPMS component finely in the nylon thermoplastic resin, then the zinc stearate, stearic acid, and zinc oxide shown in Table II-2 were charged as the vulcanization system from the third charging port to cause the X-IPMS component to cross-link and fix the dispersion of the X-IPMS phase. Suitably thereafter, the low permeability thermoplastic elastomer composition obtained was extruded in strands from the front end of the twin-screw extruder and extruder. These were then water-cooled and, after cooled, pelletized by a pelletizer for thermoplastic resin. Next, the pellets were used to produce a film of a width of 300 mm and a thickness of 0.50 mm by an extruder for thermoplastic resin having a T-die and the gas permeation coefficient and Young's modulus were found. The results are shown in Table II-3.

The polymerization reaction of the X-IPMS is performed, for example, by mixing p-methylstyrene and isobutylene in a copolymerization reactor in the presence of a Lewis acid catalyst or other solvent or diluent. As the diluent, propane, butane, pentane, hexane, toluene, methylene chloride, chloroform, and other hydrocarbon solvents may be mentioned, but among these methylene chloride is preferred.

As the method of polymerization, the slurry polymerization method, the solution polymerization method, the cement suspension polymerization method, etc. may be mentioned. The polymerization temperature, in the case of the slurry polymerization method, is −85° C. to −115° C., more preferably −89° C. to −96° C. In the solution polymerization method and cement suspension polymerization method, while depending on the molecular weight of the copolymer and the catalyst system used, the polymerization temperature is −35 to −100° C., more preferably −40 to −80° C.

The total residence time differs depending on the activity and concentration of the catalyst, the concentration of the monomer, the reaction temperature, and the molecular weight, but in general is about 1 minute to 5 hours, preferably about 10 minutes to 60 minutes.

The halogenating or other functional group may be introduced by radical halogenation or another known method in the above polymerized p-methylstyrene·isoprene copolymer. The initiator used for the halogenation is one with a half life under desired conditions of 0.5 to 2500 minutes, preferably 10 to 300 minutes. The amount of the initiator used should be 0.02 to 1% by weight with respect to the copolymer, preferably 0.02 to 0.3% by weight. As a suitable initiator, azobisisobutylnitrile, azobis(2,4-dimethylvalero)nitrile, azobis(2-dimethylbutyro)nitrile, or other bisazo compounds may be mentioned.

TABLE II-1

Composition and Physical Properties of Modified Polyisobutylene Rubber (X-IPMS)

| Modified poly-isoprene rubber no. | p-methyl-styrene content [wt %] | Bromine content [wt %] | $ML_{1+8}$ (125° C.) | HFC134a permeation coefficient at 100° C. (mg · mm/ 24 hr · cm$^2$) | Young's modulus (MPa) |
|---|---|---|---|---|---|
| 1 | 7.5 | 2.0 | 38 | 8.58 | 4.8 |
| 2 | 7.5 | 2.0 | 45 | 8.24 | 4.6 |
| 3 | 5.0 | 1.2 | 35 | 15.35 | 2.6 |
| 4 | 5.0 | 1.2 | 45 | 12.38 | 2.4 |
| 5 | 5.0 | 0.8 | 45 | 11.88 | 4.6 |
| 6 | 7.5 | 2.0 | 28 | 8.92 | 4.6 |
| 7 | 7.5 | 0.8 | 45 | 9.74 | 4.6 |
| 8 | 24.0 | 1.2 | 45 | 2.14 | 6.6 |

TABLE II-2

Rubber Formulation (Parts by Weight)

| Rubber polymer | Modified polyisobutylene rubber (X-PMS) | 100 |
|---|---|---|
| Vulcanization system | Zinc stearate | 1 |
| | Stearic acid | 2 |
| | ZnO (JIS #3) | 0.5 |

TABLE II-3

| | Ex. II-5 | Ex. II-6 | Comp. Ex. II-8 | Comp. Ex. II-9 | Comp. Ex. II-10 | Comp. Ex. II-11*[3] | Comp. Ex. II-12*[4] | Comp. Ex. II-13*[5] | Comp. Ex. II-14 | Comp. Ex. II-15 | Comp. Ex. II-16 |
|---|---|---|---|---|---|---|---|---|---|---|---|
| Modified polyisoprene rubber 1*[1] | 60 | — | — | — | — | — | — | — | 80 | 90 | 20 |
| Modified polyisoprene rubber 2*[1] | — | 60 | — | — | — | — | — | — | — | — | — |
| Modified polyisoprene rubber 3*[1] | — | — | 60 | — | — | — | — | — | — | — | — |
| Modified polyisoprene rubber 4*[1] | — | — | — | 60 | — | — | — | — | — | — | — |
| Modified polyisoprene rubber 5*[1] | — | — | — | — | 60 | — | — | — | — | — | — |
| Modified polyisoprene rubber 6*[1] | — | — | — | — | — | 60 | — | — | — | — | — |
| Modified polyisoprene rubber 7*[1] | — | — | — | — | — | — | 60 | — | — | — | — |
| -Modified polyisoprene rubber 8*[1] | — | — | — | — | — | — | — | 60 | — | — | — |
| N6*[2] | 40 | 40 | 40 | 40 | 40 | 40 | 40 | 40 | 20 | 10 | 80 |
| HFC134a permeation rate [mg · mm/24 hr · cm$^2$] | 1.10 | 1.07 | 1.55 | 1.37 | 1.33 | 1.12 | 1.18 | 0.48 | 2.09 | Not kneadable | 0.14 |
| Young's modulus [MPa] | 119 | 119 | 118 | 117 | 119 | 119 | 119 | 120 | 58 | Not kneadable | 233 |
| $T_B$ [MPa] | 26 | 27 | 26 | 26 | 20 | 21 | 20 | 27 | 16 | Not kneadable | 46 |

*[1]See Table II-1.
*[2]AMILAN CM1017 (gas permeation coefficient 0.050 [mg · mm/24 hr · cm], Young's modulus 290 [MPa])
*[3]Rubber/resin dispersion state poor, $T_B$ low.
*[4]$T_B$ low, compression set large.
*[5]Embrittlement temperature high (breaks at −40° C., others do not break at −40° C.)

Examples II-5 to II-8 and Comparative Examples II-8 to II-14

The formulations shown in Table II-4 (using as thermoplastic resin nylon 6/66) were tested in the same way as Examples II-1 to II-9 and Comparative Examples II-1 to II-2. The results are shown in Table II-4.

TABLE II-4

|  | Ex. II-7 | Ex. II-8 | Comp. Ex. II-17 | Comp. Ex. II-18 | Comp. Ex. II-19 | Comp. Ex. II-20*[3] | Comp. Ex. II-21*[4] | Comp. Ex. II-22*[5] | Comp. Ex. II-23 | Comp. Ex. II-24 | Comp. Ex. II-25 |
|---|---|---|---|---|---|---|---|---|---|---|---|
| Modified polyisoprene rubber 1*[1] | 60 | — | — | — | — | — | — | — | 80 | 90 | 20 |
| Modified polyisoprene rubber 2*[1] | — | 60 | — | — | — | — | — | — | — | — | — |
| Modified polyisoprene rubber 3*[1] | — | — | 60 | — | — | — | — | — | — | — | — |
| Modified polyisoprene rubber 4*[1] | — | — | — | 60 | — | — | — | — | — | — | — |
| Modified polyisoprene rubber 5*[1] | — | — | — | — | 60 | — | — | — | — | — | — |
| Modified polyisoprene rubber 6*[1] | — | — | — | — | — | 60 | — | — | — | — | — |
| Modified polyisoprene rubber 7*[1] | — | — | — | — | — | — | 60 | — | — | — | — |
| -Modified polyisoprene rubber 8*[1] | — | — | — | — | — | — | — | 60 | — | — | — |
| N6.66*[2] | 40 | 40 | 40 | 40 | 40 | 40 | 40 | 40 | 20 | 10 | 80 |
| HFC134a permeation rate [mg · mm/24 hr · cm$^2$] | 1.19 | 1.17 | 1.69 | 1.49 | 1.45 | 1.22 | 1.29 | 0.52 | 2.16 | Not kneadable | 0.17 |
| Young's modulus [MPa] | 72 | 72 | 70 | 70 | 72 | 72 | 72 | 73 | 35 | Not kneadable | 139 |
| $T_B$ [MPa] | 36 | 36 | 36 | 35 | 29 | 30 | 30 | 36 | 21 | Not kneadable | 66 |

*[1]See Table II-1.
*[2]AMILAN CM6001 (gas permeation coefficient 0.062 [mg · mm/24 hr · cm$^2$], Young's modulus 170 [MPa])
*[3]Rubber/resin dispersion state-poor, $T_B$ low.
*[4]$T_B$ low, compression set large.
*[5]Embrittlement temperature high (breaks at −40° C., others do not break at −40° C.)

Examples II-9 to II-12 and Comparative Examples II-15 to II-21

The formulations shown in Table II-5 (using as thermoplastic resin nylon 11) were tested in the same way as Examples II-1 to II-9 and Comparative Examples II-1 to II-2. The results are shown in Table II-5.

TABLE II-5

|  | Ex. II-9 | Ex. II-10 | Comp. Ex. II-26 | Comp. Ex. II-27 | Comp. Ex. II-28 | Comp. Ex. II-29*[3] | Comp. Ex. II-30*[4] | Comp. Ex. II-31*[5] | Comp. Ex. II-32 | Comp. Ex. II-33 | Comp. Ex. II-34 |
|---|---|---|---|---|---|---|---|---|---|---|---|
| Modified polyisoprene rubber 1*[1] | 40 | — | — | — | — | — | — | — | 80 | 90 | 20 |
| Modified polyisoprene rubber 2*[1] | — | 40 | — | — | — | — | — | — | — | — | — |
| Modified polyisoprene rubber 3*[1] | — | — | 40 | — | — | — | — | — | — | — | — |
| Modified polyisoprene rubber 4*[1] | — | — | — | 40 | — | — | — | — | — | — | — |
| Modified polyisoprene rubber 5*[1] | — | — | — | — | 40 | — | — | — | — | — | — |
| Modified polyisoprene rubber 6*[1] | — | — | — | — | — | 40 | — | — | — | — | — |
| Modified polyisoprene rubber 7*[1] | — | — | — | — | — | — | 40 | — | — | — | — |
| -Modified polyisoprene rubber 8*[1] | — | — | — | — | — | — | — | 40 | — | — | — |
| N11*[2] | 60 | 60 | 60 | 60 | 60 | 60 | 60 | 60 | 20 | 10 | 80 |
| HFC134a permeation rate [mg · mm/24 hr · cm$^2$] | 1.99 | 1.96 | 2.52 | 2.31 | 2.27 | 2.03 | 2.10 | 1.14 | 4.71 | Not kneadable | 1.23 |

TABLE II-5-continued

|  | Ex. II-9 | Ex. II-10 | Comp. Ex. II-26 | Comp. Ex. II-27 | Comp. Ex. II-28 | Comp. Ex. II-29*[3] | Comp. Ex. II-30*[4] | Comp. Ex. II-31*[5] | Comp. Ex. II-32 | Comp. Ex. II-33 | Comp. Ex. II-34 |
|---|---|---|---|---|---|---|---|---|---|---|---|
| Young's modulus [MPa] | 105 | 105 | 104 | 104 | 105 | 105 | 105 | 106 | 35 | Not kneadable | 139 |
| $T_B$ [MPa] | 37 | 38 | 37 | 37 | 30 | 31 | 30 | 37 | 15 | Not kneadable | 48 |

*[1]See Table II-1.
*[2]RILSAN BESN O TL (gas permeation coefficient 0.690 [mg · mm/24 hr · cm$^2$], Young's modulus 290 [MPa])
*[3]Rubber/resin dispersion state poor, $T_B$ low.
*[4]$T_B$ low, compression set large.
*[5]Embrittlement temperature high (breaks at −40° C., others do not break at −40° C.)

Examples II-13 to II-16 and Comparative Examples II-22 to II-28

The formulations shown in Table II-6 (using as thermoplastic resin nylon MXD6) were tested in the same way as Examples II-1 to II-9 and Comparative Examples II-1 to II-2. The results are shown in Table II-6.

TABLE II-6

|  | Ex. II-11 | Ex. II-12 | Comp. Ex. II-34 | Comp. Ex. II-35 | Comp. Ex. II-36 | Comp. Ex. II-37*[3] | Comp. Ex. II-38*[4] | Comp. Ex. II-39*[5] | Comp. Ex. II-40 | Comp. Ex. II-41 |
|---|---|---|---|---|---|---|---|---|---|---|
| Modified polyisoprene rubber 1*[1] | 70 | — | — | — | — | — | — | — | 90 | 20 |
| Modified polyisoprene rubber 2*[1] | — | 70 | — | — | — | — | — | — | — | — |
| Modified polyisoprene rubber 3*[1] | — | — | 70 | — | — | — | — | — | — | — |
| Modified polyisoprene rubber 4*[1] | — | — | — | 70 | — | — | — | — | — | — |
| Modified polyisoprene rubber 5*[1] | — | — | — | — | 70 | — | — | — | — | — |
| Modified polyisoprene rubber 6*[1] | — | — | — | — | — | 70 | — | — | — | — |
| Modified polyisoprene rubber 7*[1] | — | — | — | — | — | — | 70 | — | — | — |
| -Modified polyisoprene rubber 8*[1] | — | — | — | — | — | — | — | 70 | — | — |
| MXD6*[2] | 30 | 30 | 30 | 30 | 30 | 30 | 30 | 30 | 10 | 80 |
| HFC134a permeation rate [mg · mm/24 hr · cm$^2$] | 1.33 | 1.29 | 1.99 | 1.71 | 1.67 | 1.36 | 1.45 | 0.50 | Not kneadable | 0.06 |
| Young's modulus [MPa] | 453 | 453 | 452 | 452 | 453 | 453 | 453 | 455 | Not kneadable | 1201 |
| $T_B$ [MPa] | 49 | 50 | 49 | 49 | 40 | 43 | 41 | 50 | Not kneadable | 119 |

*[1]See Table II-1.
*[2]MXD6#6007 (gas permeation coefficient 0.017 [mg · mm/24 hr · cm$^2$], Young's modulus 1500 [MPa])
*[3]Rubber/resin dispersion state poor, $T_B$ low.
*[4]$T_B$ low, compression set large.
*[5]Embrittlement temperature high (breaks at −40° C., others do not break at −40° C.)

Examples II-17 to II-22 and Comparative Examples II-29 to II-32

Using the compositions shown in Table II-7, one layer or two layer inner tubes having an inside diameter of 11.2 mm were extruded on an N11 mandrel of an outer diameter of 11.0 mm using a cross-head thermoplastic resin-use extruder, then an intermediate reinforcing layer (braided polyester fibers) and outer cover were formed to produce hoses. Note that inner tube/reinforcing layer, reinforcing layer/outer cover were bonded by Tylite 7411 as an adhesive. The gas barrier property and bending rigidity of the resultant hoses were measured. The results are shown in Table II-7.

TABLE II-7

|  |  | Ex. II-13*[2] | Ex. II-14*[2] | Ex. II-15*[2] | Comp. Ex. II-42*[2] | Comp. Ex. II-43*[2] |
|---|---|---|---|---|---|---|
| Inner tube inner layer | Material | X-IPMS/N11*[1] | X-IPMS/N11*[1] | X-IPMS/N11*[1] | N6/N11/PO*[4] | X-IPMS/N11*[1] |
|  | Thickness [mm] | 2.00 | 1.80 | 1.00 | 0.18 | 0.18 |
| Inner tube outer layer | Material | — | — | — | Cl-IIR | — |
|  | Thickness [mm] | — | — | — | 1.72 | — |
| Bonding layer |  | ChemLok 402*[3] | ChemLok 402*[3] | ChemLok 402*[3] | ChemLok 402*[3] | ChemLok 402*[3] |
| Reinforcing layer | Material | Polyester | Polyester | Polyester | Polyester | Polyester |
| Bonding layer |  | ChemLok 402*[3] | ChemLok 402*[3] | ChemLok 402*[3] | ChemLok 402*[3] | ChemLok 402*[3] |
| Outer tube | Material | Cl-IIR | Cl-IIR | X-IPMS/N11*[1] | Cl-IIR | Cl-IIR |
|  | Thickness [mm] | 1.00 | 1.00 | 1.00 | 1.00 | 1.00 |
| Gas permeability [g/m/72 hr] | HFC134a | 2.80 | 3.00 | 2.50 | 3.50 | 15.46 |
| Bending rigidity (index)*[5] |  | 130 | 118 | 107 | 100 | 87 |

*[1]Same as Example II-9 in Table II-5.
*[2]Hose inside diameter of 11.2 mm N11 (BESN O TL), mandrel used, diameter 11.0 mm.
*[3]Made by LORD FAR EAST
*[4]N6 (Toray, AMILAN CM 1041)/NII (Atochem, RILSAN BESN O TL)/PO (Mitsui Petrochemical Industries, TAFMER MP 0641) = 65/20/15.
*[5]100 is 1.3 kgf.

TABLE II-8

|  |  | Ex. II-16*[2] | Ex. II-17*[2] | Ex. II-18*[2] | Comp. Ex. II-44*[2] |
|---|---|---|---|---|---|
| Inner tube inner layer | Material | X-IPMS/N6.66*[1] | X-IPMS/N6.66*[1] | X-IPMS/N6.66*[1] | X-IBMS/N6.66 |
|  | Thickness [mm] | 2.00 | 1.80 | 1.00 | 0.18 |
| Inner tube outer layer | Material | — | — | — | — |
|  | Thickness [mm] | — | — | — | — |
| Bonding layer |  | ChemLok 402*[3] | ChemLok 402*[3] | ChemLok 402*[3] | ChemLok 402*[3] |
| Reinforcing layer | Material | Polyester | Polyester | Polyester | Polyester |
| Bonding layer |  | ChemLok 402*[3] | ChemLok 402*[3] | ChemLok 402*[3] | ChemLok 402*[3] |
| Outer tube | Material | Cl-IIR | Cl-IIR | X-IPMS/N6.66*[1] | Cl-IIR |
|  | Thickness [mm] | 1.00 | 1.00 | 1.00 | 1.00 |
| Gas permeability [g/m/72 hr] | HFC134a | 2.50 | 2.80 | 2.20 | 12.72 |
| Bending rigidity (index)*[4] |  | 113 | 97 | 115 | 84 |

*[1]Same as Example II-7 in Table II-4.
*[2]Hose inside diameter of 11.2 mm N11 (BESN O TL), mandrel used, diameter 11.0 mm.
*[3]Made by LOAD FAR EAST.
*[4]100 is 1.3 kgf.

The materials used in the above examples were as follows:

1) Modified IIR-1: Modified polyisobutylene rubber No.1 shown in Table II-1.
2) N11: RILSAN BMNO TL; Toray Corp.
3) N6: AMILAN CM 1017; Toray Corp.
4) N6: AMILAN CM 1041; Toray Corp.
5) N11: RILSAN BESN O TL; Toray Corp.
6) PO: TAFMER MP 0610; Mitsui Petrochemical Industries
7) N6/66: AMILAN CM 6041; Toray Corp.
8) Cl-IIR: Exxon Chlorobutyl 1066; Exxon Chemical Corp.

In Examples II-5 and II-6 of Table II-3, the thermoplastic elastomer compositions of the present invention were found to be materials with an excellent balance of HFC134 gas barrier property, flexibility, and tensile properties. In Comparative Examples II-8 and II-9, the Young's modulus and $T_B$ were good, but the gas barrier property was poor. Comparative Examples II-10 and II-12 had low amounts of bromine in the X-IPMS, so the cross-linking was insufficient and the compression set large and the $T_B$ fell. Comparative Example II-11 had an X-IPMS with a small Mooney viscosity, so the ratio of viscosities with the thermoplastic resin was not met and the state of dispersion of the rubber component serving as the domain was poor and caused a deterioration of the physical properties. Comparative Example II-13 was satisfactory in gas barrier property and flexibility, but due to the large amount of X-IPMS, the embrittlement temperature became high and the composition could not be used. In Comparative Example II-15, the thermoplastic resin failed to form the matrix and became the dispersed phase, so the rubber component formed the matrix and was cross-linked, whereby the scorching of the rubber component occurred and mixing became impossible. In Comparative Example II-16, the thermoplastic resin component was large, so the gas barrier property was extremely good, but the flexibility was impaired.

Similar results were obtained in Tables II-4, II-5, and II-6.

Tables II-7 and II-8 show the properties of hoses made using the thermoplastic elastomer compositions of the present invention.

Comparative Example II-42 of Table II-7 shows a currently used hose. Examples II-13 and II-14 show the use of the thermoplastic elastomer composition of the present invention (same X-IPMS /N11 system as in Example II-9) to improve the gas barrier property. Further, in Example II-14, even though the inner tube was made small in thickness, the gas barrier property was excellent and the flexibility good as well. Example II-15 shows a hose using the thermoplastic elastomer of the present invention for both of the inner tube and the outer cover. The inner tube could be made much thinner while maintaining the flexibility at the current level. The gas barrier property was good as well and the weight could be reduced tremendously.

Comparative Example II-43 shows the use of the thermoplastic elastomer of the present invention of the same thickness as the present for the inner tube. The flexibility is improved, but the gas barrier property is extremely poor.

Table II-8 shows hoses using the X-IPMS/N6, 66 family thermoplastic elastomers of the present invention the same as Example II-7. Similar properties as in Table II-7 were shown.

Example III

Examples III-1 to III-3 and Comparative Examples III-1 to III-4

The elastomers and the cross-linking adjuvants shown in the following Table III-1 were premixed by a Bambury mixer and formed into a sheet of 2 mm by a rubber-use roll, then pelletized by a rubber use pelletizer to give the elastomer component, minus the cross-linking agent, for the twin-screw extruder with the thermoplastic resin component.

TABLE III-1

| Formulation of Elastomer Component | | | | |
|---|---|---|---|---|
| Polymer compounding agents | | Ex. III-1, 2, and 4 and Comp. Ex. III-1 to 3, 6, and 7 | Ex. III-3 | Ex. III-5 and 6 |
| Polymer of elastomer component | Brominated IPMS | 100 | 50 | 50 |
| | H-NBR | — | 40 | 40 |
| | CSM | — | 10 | 10 |
| Filler | Carbon black GPF* | — | — | 40 |
| Softening agent | Paraffin type** | — | — | 20 |
| Plasticizer | Ester type*** | — | — | 10 |
| Cross-linking adjuvant | ZnO (JIS #3) | 2 | 5 | 2 |
| Cross-linking agent | Stearic acid | 1 | 2 | 2 |
| | Zinc stearate | 3 | 2 | 2 |
| | Powdered sulfur | — | 0.5 | 0.5 |
| | Promoter IT | — | 1.5 | 1.5 |
| | Promoter M | — | 0.5 | 0.5 |

(Notes) *Seast V, Tokai Carbon
**SUNPAR 2280, Esso Chemical
***ADK CIZER C9N, Asahi Denka Kogyo The pellets of the thermoplastic resin component shown in Table III-2 and the above obtained pellets of the elastomer component were dispersed and mixed with each other by a twin-screw extruder with the thermoplastic resin component added from the first charging port and the elastomer component added from the second charging port. The temperature at the time of kneading was controlled to a temperature from the melting temperature of the thermoplastic resin +40° C. and the shear rate was controlled to 1000 sec$^{-1}$ to 3000 sec$^{-1}$. The cross-linking agent of the elastomer component was adjusted and charged from the third charging port depending upon the blending ratio with the thermoplastic resin component to give a blend shown in the above Table III-1 per 100 parts by weight of elastomer so as to cause the elastomer component dispersed in the thermoplastic resin component to cross-link (vulcanize) during mixing, that is, dynamically.

The thermoplastic elastomer composition obtained was extruded in strands from the discharge port of the twin-screw extruder. The strands were water cooled, then pelletized by a thermoplastic resin use pelletizer.

These pellets were used for press-forming by a thermoplastic resin-use press forming machine at a temperature 40° C. higher than the melting temperature of the thermoplastic resin used so as to prepare a sheet for observation of the state of dispersion by a transmission electron microscope (TEM) and measurement of the physical properties. Using the sheet, the matrix phase was confirmed and the Young's modulus was measured.

Further, the air permeation coefficient and the gas permeation coefficient were measured by forming the pellets of the thermoplastic elastomer composition into film of a thickness of 150 mm using a thermoplastic resin-use single-screw extruder equipped with a T-die head then using the sheet to perform the predetermined air or HFC134a gas permeation test.

Figure 4:
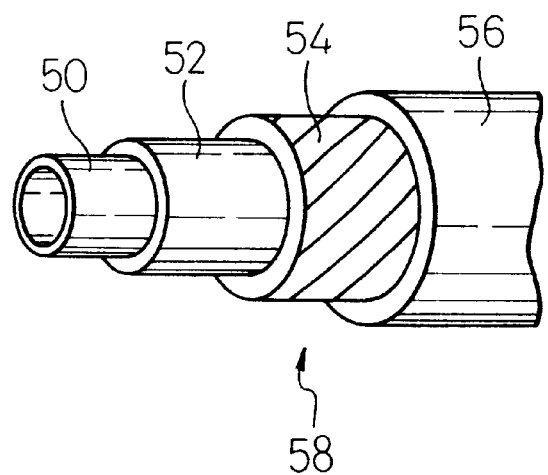
FIG. 4 is a sectional view of a hose using the thermoplastic elastomer of the present invention for the inner tube of a hose.

Further, pellets of the thermoplastic elastomer compositions obtained in Examples III-1 to III-3 were charged into a thermoplastic resin-use single-screw extruder having a cross-head construction to extrude on a nylon 11 mandrel of an outside diameter of 11 mm, coated in advance with a release agent, a tube with an inner diameter of 11.2 mm and a thickness of 150 $\mu$m. Suitably thereafter, a rubber use extruder having a cross-head construction was used to extrude over the thermoplastic elastomer composition on the above nylon 11 mandrel an unvulcanized brominated butyl rubber composition of the following formulation (I) to a thickness of 2.0 mm. On this shaped article was further braided by a braiding machine a RFL dip-treated polyester fiber (made by Toray, Tetron, 1500 d/2) reinforcing yarn to form a reinforcing layer. On this reinforcing layer was further extruded by a rubber use extruder having a cross-head construction the unvulcanized brominated butyl rubber composition of the following rubber formulation (I) to a thickness of 1.5 mm to form the outer cover. On this unvulcanized hose assembly was then wrapped a double layer of nylon cloth wrapping tape. The hose was then heated and vulcanized on a vulcanization drum at 153° C.×60 minutes. After the vulcanization, the wrapping tape was removed, then the mandrel was pulled out to obtain the sample hose shown in FIG. 4. In FIG. 4, 50 is an inner layer of the inner tube, 52 is the outer layer of the inner tube, 54 is a reinforcing layer, 56 is an outer cover, and 58 is a low permeability hose.

| Formulation (I) of Rubber Composition parts by weight | | |
|---|---|---|
| Brominated butyl rubber | 100 | Exxon Bromobutyl 2244, (Exxon Chemical Corp.) |
| Carbon black HAF | 30 | Seast N, (made by Tokai Carbon) |
| ZnO | 3 | Zinc Oxide (JIS No. 3), (Seido Chemical Industry) |
| Sulfur | 2 | Powdered sulfur, (Karuizawa Refinery) |
| DM | 1 | Noccelar DM, (Ouchi Shinko Chemical) |
| Industrial Stearic acid | 1 | Beads Stearic Acid NY, (Nihon Yushi) |

On the other hand, as Comparative Example III-5, a rubber hose of the above hose construction having an inner layer of the inner tube not having a layer of the thermoplastic elastomer composition of the present invention of a thickness of 150 $\mu$m was prepared to the same dimensions and similarly measured for the permeability, flexibility, and durability.

Note that the methods of measurement and methods of evaluation used in the above examples were as follows:

Method of Confirmation of Matrix Phase

A sample prepared by the freeze cutting method was used for confirmation by observation by a transmission type electron microscope.

Method of Measurement of Young's Modulus of Film

This was based on JIS K6251 "Test Method for Tensile Properties of Vulcanized Rubber".

Test piece: Sample of films prepared in the examples were punched into JIS No. 3 dumbbell shapes parallel to the direction of extrusion of the thermoplastic resin at the time of extrusion of the films. A tangent was drawn at the curve of the initial strain region of the obtained stress and strain curve and the Young's modulus was found from the inclination of that tangent.

Method of Measurement of Air Permeation Coefficient of Film

This was measured based on JIS K7126 "Test Method of Gas Permeation of Plastic Films and Sheets (Method A)".

Test piece: Samples of films prepared in the examples were used.

Test gas: Air ($N_2:O_2=8:2$)

Test temperature: 30° C.

Method of Measurement of Gas Permeation Coefficient of Thermoplastic Elastomer Composition Material This was measured in the same way as in Example II.

Flexibility of Hose

This was measured in the same way as the "Bending Rigidity of Hose" of Example I.

Gas Permeability of Hose

This was measured in the same way as in Example I.

In the past, the amount of leakage of CFC 12 gas of a rubber hose was 20 to 25 gf/m/72 hours. Further, the refrigerant replacement cycle of a rubber hose was about two years. On the other hand, elimination of maintenance requires a replacement cycle of 10 years. Therefore, elimination of maintenance requires, regardless of the type of the gas, a gas leakage of no more than 5 gf/m/72 hours.

Impulse Durability

The impact pressure test based on JIS K6375, page 7.7 (impulse test) was performed. As the test oil, use was made of a mineral oil corresponding to Type 2 prescribed in JIS K2213 (Turbine Oil). A pulse was repeated applied at an oil temperature of 93° C. and a maximum pressure of 200 kgf/cm² and the times until breakage was measured. When there was no damage derived from peeling of the inner layer of the inner tube, the test was broken off at 200,000X.

The results are shown in Table III-2.

Here, with Comparative Examples III-1 to III-3 of Table III-2, no matter what the conditions above the melting temperature of the thermoplastic resin component the processing was performed at, it was not possible to obtain the desired structure of the thermoplastic elastomer where the thermoplastic resin served as the continuous phase and the elastomer component served as the dispersed phase, so thermoplastic properties were not exhibited, and therefore, the flowability was insufficient and a sheet and film for measurement of physical properties could not be obtained.

TABLE III-2

Elastomer Component/Thermoplastic Resin Component = 60/40

|  |  | Ex. III-1 | Ex. III-2 | Ex. III-3 |
|---|---|---|---|---|
| Elastomer component* |  | Modified IPMS [1] | Modified IPMS [1] | Modified IPMS [1] = 50<br>HNBR [2] = 40<br>CSM [3] = 10 |
| Thermoplastic resin component |  | N11 [4] = 70<br>EVOH [5] = 30 | N612 [6] | N6.66 [7] |
| Physical constants of formulation | $\phi_m$ | 0.398 | 0.394 | 0.376 |
|  | $\eta_d/\eta_m$ | 2.53 | 2.13 | 1.80 |
|  | ASP | 4.00 | 4.21 | 4.60 |
|  | Value of left side of formula (1) | 1.74 | 1.73 | 1.76 |
| Original physical properties of thermoplastic elastomer composition (properties) | Matrix phase | Thermoplastic resin | Thermoplastic resin | Thermoplastic resin |
|  | Young's modulus (MPa) | 36 | 32 | 43 |
|  | Air permeation coefficient (cc · cm/cm² · sec, cmHg) | 6.5 | 6.7 | 5 |
|  | Gas permeation coefficient (mg · mm/24 hr, cm²) | 0.76 | 0.67 | 1.54 |
| Properties of hose | Hose flexibility (kgf) Hose gas permeation performance (gf/m/72 hr) Hose durability (impulse test) 10,000X | 1.77<br>0.67<br>Broken off after 200,000X | 1.76<br>0.65<br>Broken off after 200,000X | 1.81<br>0.86<br>Broken off after 200,000X |

|  |  | Comp. Ex. III-1 | Comp. Ex. III-2 | Comp. Ex. III-3 | Comp. Ex III-4 (hose |
|---|---|---|---|---|---|
| Elastomer component* |  | Modified IPMS [1] | Modified IPMS [1] | Modified IPMS [1] | — |
| Thermoplastic resin component |  | N6 [8] | N6/N11/PO [9] | N6.66 [7] | — |
| Physical constants of formulation | $\phi_m$ | 0.385 | 0.397 | 0.385 | — |
|  | $\eta_d/\eta_m$ | 1.49 | 0.70 | 0.78 | — |
|  | ASP | 5.91 | 5.55 | 5.91 | — |
|  | Value of left side of formula (1) | 1.54 | 1.54 | 1.54 | — |
| Original physical properties of thermoplastic elastomer composition (properties) | Matrix phase | Elastomer | Elastomer | Elastomer | — |
|  | Young's modulus (MPa) | ** | ** | ** | — |
|  | Air permeation coefficient (cc · cm/cm² · sec, cmHg) | ** | ** | ** | — |
|  | Gas permeation | ** | ** | ** | — |

TABLE III-2-continued

Elastomer Component/Thermoplastic Resin Component = 60/40

|  |  |  |  |  |  |
|---|---|---|---|---|---|
| Properties of hose | coefficient (mg · mm/ 24 hr, cm²) Hose flexibility (kgf) Hose gas permeation performance (gf/m/72 hr) Hose durability (impulse test) 10,000X | — — — | — — — | — — — | 1.21 5.01 50,000X (Leakage due to expansion) |

*Components other than vulcanizer. Cross-linking agent added in accordance with Table I using polymer in elastomer component as 100 parts by weight.
**Hot press forming and film extrusion not possible.
Notes: [1] Modified IPMS: Brominated isobutylene-p-methylstyrene copolymer, PMS = 5 wt %, Br = 1.2 wt % (Exxon Chemical)
[2] H-NBR: Hydrogenated NBR (ZETPOL 1020, made by Nippon Zeon).
[3] CMS: Chlorosulfoniated PE (HYPALON 40, made by Dupont).
[4] N11: Nylon 11 (RILSAN BMN O, Toray)
[5] EVOH: Ethyloenevinylalcohol (EVAL XEP171B, Kurarey)
[6] N612: Nylon 612 (D-18, Daicel Hughs)
[7] N6/66: Nylon 6/66 (AMILAN CM6001, Toray)
[8] N6: Nylon 6 (Amylan CM1017, Toray)
[9] N6/N11/PO: Nylon 6/Nylon 11/Polyolefin oxide In Examples III-1 to III-3 (elastomer component/thermoplastic resin component=60/40) of Table III-2, even with the thermoplastic elastomer compositions with the high elastomer component ratio, when the conditions of the above formula (1) were satisfied, a composition where the thermoplastic resin component was the continuous phase and the elastomer component formed a dispersed phase was obtained and, as properties, flexibility (Young's modulus) and air and freon gas (HFC134a) permeability were obtained.

Compared with this, as shown in the case of Comparative Examples III-1 to III-3, when the above formula (1) showing the relationship between the ratio of melt viscosities and difference in mutual solubilities (ΔSP) of the kneaded thermoplastic resin component and elastomer component is not satisfied, it is learned that the desired thermoplastic elastomer having the thermoplastic resin as the continuous phase is not obtained.

Further, compared with Comparative Example III-4, the thermoplastic elastomer composition obtained in the present invention (Examples III-1 to III-3) maintained their performance as a film and as a hose even after heating and processing and resulted in improvements in the product properties and thus achieved the objectives.

Examples III-4 to III-6 and Comparative Examples III-5 to III-6

The thermoplastic elastomer compositions shown in Table III-3 were processed in the same way as in the above Table III-2 by a twin-screw extruder to prepare pellets which were similarly used to prepare pressed sheets for measurement of the physical properties and film of 150 μm for measurement of the permeation coefficient by a T-die sheet molding machine. The film was used to prepare hoses under similar conditions. These samples were used for measurements and tests similar to those of Table III-2.

Note that the methods of measurement and the methods of evaluation used in these examples were the same as the case of the above examples.

The results are shown in Table III-3.

TABLE III-3

Elastomer Component/Thermoplastic Resin Component = 70/30, 80/20

|  |  | Ex. III-4 (70/30) | Ex. III-5 (70/30) | Ex. III-6 (80/20) |
|---|---|---|---|---|
| Elastomer component* | | Modified IPMS [1] | Formulation 3 | Formulation 3 |
| Thermoplastic resin component | | N11 [4] | N11 [4] | N11 [4] |
| Physical constants of formulation | $\phi_m$ | 0.299 | 0.299 | 0.201 |
| | $\eta_d/\eta_m$ | 3.17 | 3.34 | 3.04 |
| | ΔSP | 3.71 | 2.01 | 2.01 |
| | Value of left side of formula (1) | 2.37 | 2.66 | 2.95 |
| Original physical properties of thermoplastic elastomer composition (properties) | Matrix phase | Thermoplastic resin | Thermoplastic resin | Thermoplastic resin |
| | Young's modulus (MPa) | 27 | 31 | 51 |
| | Air permeation coefficient (cc · cm/ cm² · sec, cmHg) | 7.8 | 5.3 | 2.6 |
| | Gas permeation coefficient (mg · mm/ 24 hr, cm²) | 0.81 | 1.24 | 0.41 |
| Properties of hose | Hose flexibility (kgf) Hose gas permeation performance (gf/m/72 hr) Hose durability (impulse test) 10,000X | 1.68 0.69 Broken off after 200,000X | 1.76 0.81 Broken off after 200,000X | 1.87 0.44 Broken off after 200,000X |

|  |  | Comp. Ex. III-5 (70/30) | Comp. Ex. III-6 (70/30) |
|---|---|---|---|
| Elastomer component* | | Modified IPMS [1] | Modified IPMS [1] |
| Thermoplastic resin component | | N6 [8] | N6 [8] |
| Physical constants of formulation | $\phi_m$ | 0.287 | 0.299 |
| | $\eta_d/\eta_m$ | 1.88 | 2.13 |
| | ΔSP | 5.91 | 4.21 |
| | Value of left side of formula (1) | 2.07 | 2.28 |
| Original physical properties of thermoplastic elastomer composition (properties) | Matrix phase | Elastomer component | Elastomer component |
| | Young's modulus (MPa) | — | — |
| | Air permeation coefficient (cc · cm/ cm² · sec, cmHg) | — | — |
| | Gas permeation coefficient (mg · mm/ 24 hr, cm²) | — | — |
| Properties | Hose | — | — |

TABLE III-3-continued

Elastomer Component/Thermoplastic Resin Component = 70/30, 80/20

| of hose | flexibility (kgf) Hose gas permeation performance (gf/m/72 hr) Hose durability (impulse test) 10,000X | — — | — — |

Notes [1] See notes of Table III-2.
[4] See notes of Table III-2.
[8] See notes of Table III-2.
*Components other than vulcanizer. Cross-linking agent added in accordance with Table III-I using polymer in elastomer component as 100 parts by weight.

From the results of Example III-4 to III-6 in Table III-3, it is learned that even if the ratio of the elastomer component and thermoplastic resin component is made higher than 60/40 such as 70/30 and 80/20 and the amount of the elastomer component is increased, so long as a relationship of the melt viscosity and compatibility (ΔSP) of the two components is maintained which satisfies the above formula (1), the thermoplastic elastomer composition of the desired structure is obtained and the flexibility and barrier property (air and gas) can be controlled and further a hose using this thermoplastic elastomer composition can be obtained which satisfies the new objectives.

Further, as shown in Comparative Example III-5 and III-6, even if the ratio of the elastomer component and thermoplastic resin component is 70/30, when the relationship of the melt viscosity and solubility (ΔSP) of the components does not satisfy the above formula (1), it is learned that the thermoplastic elastomer composition of the desired structure cannot be obtained.

Example IV

The methods of evaluation used in the following examples were as follows:

Melt Viscosity

Here, the melt viscosity means the melt viscosity of any temperature or component at the time of mixing. The melt viscosity of each polymer material is dependent on the temperature, the shear rate ($sec^{-1}$), and the shear stress, so the stress and shear rate of the polymer material at any temperature in the molten state capable of flowing through a small tube, in particular, the temperature region at the time of mixing, are measured and the melt viscosity is measured by the following formula (6):

$\eta = \sigma/\gamma$ (where, $\sigma$: shear stress, $\gamma$: shear rate) (6)

Note that, the melt viscosity is measured by using a Capillary Rheometer Capillograph IC made by Toyo Seiki.

Measurement of Young's Modulus and Elongation of Film

This was performed based on JIS K6251 "Test Method for Tensile Properties of Vulcanized Rubber".

Test piece: Samples of the film prepared by extrusion in the examples were used and punched into JIS No. 3 dumbbell shapes in the direction of flow of the thermoplastic resin at the time of extrusion.

A tangent was drawn against the curve of the initial strain region of the obtained stress-strain curve and the Young's modulus was found from the inclination of the tangent.

Further, the length between standard lines at the time of breakage of a sample of the film prepared in each example was measured to calculate the elongation by the following formula.

$$E_B = (L_1 - L_0)/L_0 \times 100$$

where, $E_B$: elongation at break (%)
$L_0$: length between standard lines (mm)
$L_1$: length between standard lines at time of breakage (mm)

Method of Measurement of Gas Permeation Degree of Film (Air Permeation Coefficient)

This was performed based on JIS K7126 "Test Method of Gas Permeation Degree of Plastic Films and Sheets (Method A)".

Test piece: Film samples prepared in example were used.

Test gas: Air ($N_2:O_2=8:2$)

Test temperature: 30° C.

Method of Measurement of Degree of Permeation of HFC134a Gas Through Film

This was measured in the same way as in Example I.

Gas Permeability of Hose

This was measured in the same way as in Example I.

In the past, the amount of leakage of CFC12 gas of a rubber hose was 20 to 25 gf/m/72 hours. Further, the refrigerant replacement cycle of a rubber hose was about two years. On the other hand, elimination of maintenance requires a replacement cycle of 10 years. Therefore, elimination of maintenance requires, regardless of the type of the gas, a gas leakage of no more than 5 gf/m/72 hours.

Impulse Durability

This was measured in the same way as in Example III.

Examples IV-1 to IV-12 and Comparative Examples IV-1 to IV-13

First, the kneaded batch of the rubber/matrix thermoplastic resin of the first step was prepare using the rubber component and matrix thermoplastic resin component and the ratios of blending (parts by weight) shown in the following Table IV-1 and Table IV-3. Pellets of the predetermined thermoplastic resin composition serving as the matrix thermoplastic resin component were charged into a first charging port of a twin-screw extruder and mixed, then pellets of the rubber component were charged from a second charging port and kneaded so as to finely disperse the rubber component in the matrix thermoplastic resin composition, then a predetermined amount of zinc stearate, stearic acid, or zinc oxide with respect to 100 parts by weight of rubber, shown in Table IV-2, was charged from a third charging port integrally and continuously as a dynamic vulcanization system so as to cause the rubber component to dynamically cross-link and fix the dispersion of the rubber phase. Suitably thereafter, the first step batch obtained was extruded from the front end of a twin-screw extruder in the form of strands which were water cooled. After cooling, they were then was pelletized by a pelletizer for thermoplastic resin. Next, the pellets were melted in a thermoplastic resin use single-screw extruder of 40 mm caliber having a T-die at a 40 rpm rotational speed to form a film with a width of 400 mm and a thickness of 0.20 mm which was then used to find the Young's modulus, elongation, gas permeation degree and HFC134a permeation degree. The results are shown in Table IV-3.

TABLE IV-1

Polymer Used in First Step Kneading

| | Viscosity [poise][a] | Young's modulus [MPa] | Air permeation coefficient [cm$^2$ · cm/ cm$^2$ · sec · cmHg] | HFC134a gas permeation coefficient [mg · mm/ 24 hr · cm$^2$] |
|---|---|---|---|---|
| X-IMPS[b] | 900 | 1 | 50.0 × 10$^{-12}$ | 17.720 |
| NII-(1)[c] | 300 | 280 | 5.4 × 10$^{-12}$ | 0.690 |
| N11-(2)[d] | 650 | 290 | 6.5 × 10$^{-12}$ | 0.690 |
| N12-(1)[e] | 350 | 360 | 1.2 × 10$^{-11}$ | 1.089 |
| N12-(2)[f] | 700 | 460 | 7.7 × 10$^{-12}$ | 1.089 |

[a] Shear rate 2304 [s$^{-1}$], kneading temperature 270 [° C.]
[b] Modified polyisobutylene rubber (X-IPMS) (p-methylstyrene content: 5.0 wt %, bromine content: 1.2 wt %, ML$_{1+8}$ (125° C.): 45)
[c] N11-(1) BMN O (Toray)
[d] N11-(2) BESN O TL (Toray)
[e] N12-(1) AMN O (Toray)
[f] N12-(2) AESN O TL (Toray)

TABLE IV-2

Rubber Formulation (Parts by Weight)

| Rubber polymer | X-IPMS a) | 100 |
|---|---|---|
| Dynamic vulcanization system | Zinc stearate | 1 |
| | Stearic acid | 2 |
| | ZnO (JIS #3) | 0.5 | a) Modified polyisobutylene rubber (X-IPMS) (p-methylstyrene content: 5.0 wt %, bromine content: 1.2 wt %, ML$_{1+8}$ (125° C.): 45)

matrix thermoplastic resin component was relatively large in amount and they were not preferable as first step batches in terms of flexibility, so as the first step batch used in the mixing by the low shear rate in the next second step, the above mixed batch 1 (hereinafter, referred to as, "the first step batch-(1)") and mixed batch 5 (hereinafter, referred to as, "the first step batch-(2)") were used. Further, the mixed batch 9 was an example not including a compatibilizer, but compared with this mixed batch 9, the above mixed batches are better in elongation due to the compatibilizer and therefore are found to be preferable.

Next, mixed batches comprised of the barrier thermoplastic resin of the second step and the rubber/matrix thermoplastic resin composition of the first step batch were prepared using the barrier thermoplastic resin components and the first step batches-(1) and (2) and their ratios of blending (parts by weight) shown in the following Table IV-4 and Table IV-5 to Table IV-8. Pellets of the first step batch-(1) or (2) obtained above as the rubber/matrix thermoplastic resin component were charged by a dry blend into a hopper of a 40 mm caliber single-screw extruder, then kneaded at a shear rate of 400 sec$^{-1}$. This was then extruded from a T-die provided at the front end of the single-screw kneader and extruder to form a film of a width of 400 mm and a thickness of 0.20 mm. The Young's modulus, gas permeation degree, and HFC134a permeation degree were found. Further, the aspect ratio of the barrier thermoplastic resin present as a flat layer structure in the film obtained was found by observation by a optical microscope and the following calculation formula. The results are shown in Tables IV-5 to IV-8.

TABLE IV-3

Thermoplastic Elastomer Kneaded Batch of First Step[a]

| | | Knead 1 | Knead 2[b] | Knead 3 | Knead 4[b] | Knead 5 | Knead 6[b] | Knead 7 | Knead 8[b] | Knead 9[c] |
|---|---|---|---|---|---|---|---|---|---|---|
| Rubber | X-IPMS | 70 | 80 | 50 | 70 | 70 | 80 | 50 | 70 | 70 |
| Matrix resin | N11-(1) | 30 | 20 | — | — | — | — | — | — | 30 |
| | N11-(2) | — | — | 50 | 30 | — | — | — | — | — |
| | N12-(1) | — | — | — | — | 30 | 20 | — | — | — |
| | N12-(2) | — | — | — | — | — | — | 50 | 30 | — |
| Solubilizing agent | PP-g-MAH[d] | 7 | 8 | 5 | 7 | 7 | 8 | 5 | 7 | — |
| Dispersion properties | α | 0.78 | 1.33 | 0.72 | 1.69 | 0.91 | 1.56 | 0.78 | 1.81 | 0.78 |
| Original physical properties | Young's modulus ∂Mpa] | 40.0 | Not kneadable | 120.0 | Not kneadable | 65.0 | Not kneadable | 150.0 | Not kneadable | 40.0 |
| | Elongation [%] | 300 | Not kneadable | 410 | Not kneadable | 280 | Not kneadable | 400 | Not kneadable | 180 |
| | Air permeation × 10$^{-12}$ [cc · cm/cm· sec · cmHg] | 40.0 | Not kneadable | 25.0 | Not kneadable | 45.0 | Not kneadable | 28.0 | Not kneadable | 40.0 |
| | HFC134a permeation [mg · mm/24 hr · cm$^2$] | 5.2 | Not kneadable | 4.3 | Not kneadable | 6.2 | Not kneadable | 3.8 | Not kneadable | 5.2 |

[a] Biaxial mixing conditions: Mixing temperature 270[° C.], shear rate 2304 [s$^{-1}$].
[b] Phases invert and scorching occurs.
[c] Tensile properties decline due to poor dispersion of rubber of dispersed phase.
[d] PP-g-MAH: Mitsui Petrochemical Industries ADMER QB540.

From the above results, the mixed batches 2, 4, 6, and 8, where the α value was more than 1 all had the phases reversed during the twin-screw mixing and suffered from scorching, so mixing as the first step batch was not possible—making them undesirable. Further, the mixed batches 3 and 7 gave excellent dispersed states, but the Method of Measurement of Aspect Ratio Just the barrier thermoplastic resin composition was dyed by RuO$_4$, iodine, etc. and directly observed by an optical microscope. The image obtained here was analyzed and the ratio was found by the formula A=a/b using the long axis of the layer of the barrier thermoplastic resin composition as "a" and the short axis as "b".

TABLE IV-4

Polymer Used in Second Step Kneading

| Classification | Grade name | Viscosity [poise][a] | Young's modulus [MPa] | Permeation × $10^{-12}$ [$cm^3 \cdot cm/cm^2 \cdot sec \cdot cmHg$] | HFC134a permeation [$ng \cdot mm/24 hr \cdot cm^2$] |
|---|---|---|---|---|---|
| Thermoplastic elastomer composition | First step batch (1) | 2400 | 40 | 40 | 5.200 |
| | First step batch (2) | 2600 | 65 | 45 | 6.200 |
| Barrier resin | MXD6-(1)[b] | 9600 | 1500 | 0.15 | 0.017 |
| | MXD6-(2)[c] | 5800 | 1500 | 0.15 | 0.017 |
| | N6.66-(1)[d] | 7800 | 240 | 1.8 | 0.058 |
| | N6.66-(2)[e] | 4900 | 170 | 0.3 | 0.062 |
| | N6-(1)[f] | 7700 | 400 | 0.78 | 0.050 |
| | N6-(2)[g] | 690 | 290 | 0.82 | 0.059 |
| | EVOH-(1)[h] | 8200 | 900 | 0.041 | 0.008 |
| | EVOH-(2)[i] | 2800 | 900 | 0.041 | 0.008 |

[a] Shear rate 250 [$s^{-1}$], mixing temperature 270 [° C.]
[b] MXD6-(1) #6121 (Mitsubishi Gas Chemical)
[c] MXD6-(2) #6001 (Mitsubishi Gas Chemical)
[d] N6.66-(1) CM6041 (Toray)
[e] N6.66-(2) CM6001 (Toray)
[f] N6-(1) CM1041 (Toray)
[g] N6-(2) CM1017 (Toray)
[h] EVOH-(1) Prototype (Kuraray)
[i] EVOH-(2) EP-151B (Kuraray)

Further, pellets of the thermoplastic elastomer composition of the above second step mixed batch were charged into a single-screw extruder for thermoplastic resin having a cross-head construction. The thermoplastic elastomer composition was extruded on a nylon 11 mandrel of an outer diameter of 11 mm coated in advance with a release agent to form a tube of a thickness of 150 μm. Suitably thereafter, a rubber use extruder having a cross-head construction was used to extrude over the thermoplastic elastomer composition on the above nylon 11 mandrel an unvulcanized brominated butyl rubber composition of the following Formulation (II) to a thickness of 2.0 mm. On this shaped article was further braided by a braiding machine a polyester fiber (made by Toray Corp., Tetron, 1500d) reinforcing yarn given RFL dip treatment to form a reinforcing layer. On this reinforcing layer, further, the unvulcanized brominated butyl rubber composition of the Formulation (II) was extruded using the rubber use extruder having a cross-head construction to a thickness of 1.5 mm to form an outer cover.

The unvulcanized hose assembly was double wrapped by nylon cloth wrapping tape and press vulcanized on a vulcanization drum at 153° C.×60 minutes.

After the vulcanization, the wrapping tape was removed and further the mandrel pulled out to obtain the test hose (see FIG. 4).

On the other hand, as a Comparative Example, a rubber hose of the above hose construction having an inner layer of the inner tube not having a layer of the thermoplastic elastomer composition of the second step kneaded batch of the present invention of a thickness of 150 μm was prepared to the same dimensions and similarly measured for the gas permeability, flexibility, and durability. The results are shown in Table IV-5 to IV-8.

| Formulation of (II) Rubber Composition parts by weight | | | |
|---|---|---|---|
| Brominated butyl rubber | 100 | Exxon Bromobutyl 2244, Exxon Chemical Corp. | |
| Carbon black HAF | 30 | Seast N, Tokai Carbon | |
| ZnO | 3 | Zinc oxide JIS No. 3, Seido Chemical Industry | |
| Sulfur | 2 | Powdered sulfur, Karuizawa Refinery | |
| DM | 1 | Noccelar DM, Ouchi Shinko Chemical Industrial | |
| Stearic acid | 1 | Beads Stearic Acid NY, Nihon Yushi | |

TABLE IV-5

Second Step Kneading[a]

| | | Ex IV-1 | Ex IV-2 | Comp. Ex. IV-1[b] | Comp. Ex. IV-2[c] | Ex. IV-3 | Ex. IV-4 | Comp. Ex. IV-3[b] |
|---|---|---|---|---|---|---|---|---|
| Thermoplastic elastomer | 1st step batch (1) | 80 | 50 | 10 | 80 | — | — | — |
| | 1st step batch (2) | — | — | — | — | 80 | 50 | 20 |
| Barrier resin | MXD6-(1) | 20 | 50 | 90 | — | 20 | 50 | 80 |
| | MXD6-(2) | — | — | — | 20 | — | — | — |
| | N6.66-(1) | — | — | — | — | — | — | — |
| | N6.66-(2) | — | — | — | — | — | — | — |
| | N6-(1) | — | — | — | — | — | — | — |
| | N6-(2) | — | — | — | — | — | — | — |
| Dispersion properties | ηd/ηm | 4.0 | 4.0 | 4.0 | 2.4 | 3.7 | 3.7 | 3.7 |
| | α | 0.06 | 0.25 | 2.25 | 0.10 | 0.07 | 0.27 | 1.08 |
| | Aspect ratio A | 100 | 150 | 3 | 5 | 80 | 130 | 4 |
| Original physical properties | Young's modulus [MPa] | 80 | 380 | 1450 | 90 | 85 | 410 | 1400 |
| | Permeation × $10^{-12}$ [$cc \cdot cm/cm^2 \cdot sec \cdot cmHg$] | 12.0 | 5.5 | 0.1 | 29.3 | 13.2 | 6.8 | 0.1 |
| | HFC134a permeation | 0.190 | 0.110 | 0.024 | 0.620 | 0.250 | 0.136 | 0.026 |

TABLE IV-5-continued

| | | | | Second Step Kneading[a] | | | | |
|---|---|---|---|---|---|---|---|---|
| | | Ex IV-1 | Ex IV-2 | Comp. Ex. IV-1[b] | Comp. Ex. IV-2[c] | Ex. IV-3 | Ex. IV-4 | Comp. Ex. IV-3[b] |
| Hose | [mg · mm/24 hr · cm$^2$] Gas permeation [gf/m/72 hr] | 1.8 | 0.9 | 0.2 | 6.1 | 2.1 | 1.2 | 0.1 |
| | Impulse durability [10,000X] | Broken off at 200,000X | Broken off at 200,000X | Crack, break at 20,000X | Broken off at 200,000X | Broken off at 200,000X | Broken off at 200,000X | Crack, break at 20,000X |

[a] Film molding conditions: Molding temperature 270[° C.], shear rate 250 [s$^{-1}$].
[b] Phase invert and flexibiity is impaired.
[c] Ratio of viscosity < 3.0, so aspect ratio is small and barrier property is impaired.

TABLE IV-6

| | | Second Step Kneading[a] | | | | | | |
|---|---|---|---|---|---|---|---|---|
| | | Comp. Ex IV-4[c] | Comp. Ex IV-5[b] | Ex. IV-5 | Ex. IV-6 | Comp. Ex. IV-6[b] | Comp. Ex. IV-7[c] | Ex. IV-7 |
| Thermoplastic elastomer | 1st step batch (1) | — | — | 80 | 50 | 10 | 80 | — |
| | 1st step batch (2) | 80 | — | — | — | — | — | 80 |
| Barrier resin | MXD6-(1) | — | — | — | — | — | — | — |
| | MXD6-(2) | 20 | 50 | — | — | — | — | — |
| | N6.66-(1) | — | — | 20 | 50 | 90 | — | 20 |
| | N6.66-(2) | — | — | — | — | — | 20 | — |
| | N6-(1) | — | — | — | — | — | — | — |
| | N6-(2) | — | 50 | — | — | — | — | — |
| Dispersion properties | ηd/ηm | 2.2 | 8.4 | 3.3 | 3.3 | 3.3 | 2.0 | 3.0 |
| | α | 0.07 | 0.11 | 0.08 | 0.31 | 2.77 | 0.10 | 0.07 |
| | Aspect ratio A | 3 | 200 | 60 | 100 | 3 | 4 | 50 |
| Original physical properties | Young's modulus [MPa] | 91 | 1130 | 65 | 115 | 630 | 70 | 85 |
| | Permeation × 10$^{-12}$ [cc · cm/cm$^2$ · sec · cmHg] | 35.2 | 0.1 | 14.5 | 8.2 | 1.9 | 35.1 | 15.2 |
| | HFC134a permeation [mg · mm/24 hr · cm$^2$] | 0.850 | 0.086 | 0.350 | 0.100 | 0.075 | 0.950 | 0.410 |
| Hose | Gas permeation [gf/m/72 hr] | 7.6 | 1.0 | 2.1 | 0.8 | 0.7 | 8.4 | 3.3 |
| | Impulse durability [10,000X] | Broken off at 200,000X | Crack, break at 30,000X | Broken off at 200,000X | Broken off at 200,000X | Crack, break at 30,000X | Broken off at 200,000X | Broken off at 200,000X |

[a] Film molding conditions: Molding temperature 270[° C.], shear rate 250 [s$^{-1}$].
[b] Phase invert and flexibiity is impaired.
[c] Ratio of viscosity < 3.0, so aspect ratio is small and barrier property is impaired.

TABLE IV-7

| | | Second Step Kneading[a] | | | | | | |
|---|---|---|---|---|---|---|---|---|
| | | Ex IV-8 | Comp. Ex IV-8[b] | Comp. Ex. IV-9[c] | Ex. IV-9 | Ex. IV-10 | Comp. Ex. IV-10[b] | Comp. Ex. IV-11[c] |
| Thermoplastic elastomer | 1st step batch (1) | — | — | — | 80 | 50 | 10 | 80 |
| | 1st step batch (2) | 20 | 80 | — | — | — | — | — |
| Barrier resin | MXD6-(1) | — | — | — | — | — | — | — |
| | MXD6-(2) | — | — | — | — | — | — | — |
| | N6.66-(1) | 50 | 80 | — | — | — | — | — |
| | N6.66-(2) | — | — | 20 | — | — | — | — |
| | N6-(1) | — | — | — | 20 | 50 | 90 | — |
| | N6-(2) | — | — | — | — | — | — | 20 |
| Dispersion properties | ηd/ηm | 3.0 | 3.0 | 1.9 | 3.2 | 3.2 | 3.2 | 0.3 |
| | α | 0.27 | 1.08 | 0.07 | 0.08 | 0.31 | 2.81 | 0.87 |
| | Aspect ratio A | 80 | 3 | 5 | 70 | 110 | 3 | 5 |
| Original physical properties | Young's modulus [MPa] | 135 | 560 | 91 | 75 | 156 | 890 | 80 |
| | Permeation × 10$^{-12}$ [cc · cm/cm$^2$ · sec · cmHg] | 10.2 | 0.4 | 38.2 | 13.1 | 7.4 | 0.9 | 38.1 |

TABLE IV-7-continued

| | | Second Step Kneading[a] | | | | | | |
|---|---|---|---|---|---|---|---|---|
| | | Ex IV-8 | Comp. Ex IV-8[b] | Comp. Ex. IV-9[c] | Ex. IV-9 | Ex. IV-10 | Comp. Ex. IV-10[b] | Comp. Ex. IV-11[c] |
| | HFC134a permeation [mg · mm/24 hr · cm$^2$] | 0.300 | 0.092 | 1.250 | 0.250 | 0.190 | 0.064 | 0.860 |
| Hose | Gas permeation [gf/m/72 hr] | 2.9 | 0.8 | 9.6 | 2.2 | 1.7 | 0.7 | 7.9 |
| | Impulse durability [10,000X] | Broken off at 200,000X | Crack, break at 25,000X | Broken off at 200,000X | Broken off at 200,000X | Broken off at 200,000X | Crack, break at 30,000X | Broken off at 200,000X |

[a]Film molding conditions: Molding temperature 270[° C.], shear rate 250 [s$^{-1}$].
[b]Phase invert and flexibiity is impaired.
[c]Ratio of viscosity < 3.0, so aspect ratio is small and barrier property is impaired.

TABLE IV-8

| | | Second Step Kneading[a] | | | | |
|---|---|---|---|---|---|---|
| | | Ex IV-11 | Ex IV-12 | Comp. Ex. IV-12[b] | Comp. Ex. IV-13[c] | Hose comparative ex. |
| Thermo- | 1st step batch (1) | — | — | — | — | Brominated butyl rubber |
| plastic elastomer | 1st step batch (2) | 80 | 50 | 20 | 80 | |
| Barrier resin | MXD6-(1) | — | — | — | — | |
| | MXD6-(2) | — | — | — | — | |
| | N6.66-(1) | — | — | — | — | |
| | N6.66-(2) | — | — | — | — | |
| | N6-(1) | 20 | 50 | 80 | — | |
| | N6-(2) | — | — | — | 20 | |
| Dispersion properties | ηd/ηm | 3.0 | 3.0 | 3.0 | 0.3 | — |
| | α | 0.08 | 0.31 | 1.25 | 0.87 | — |
| | Aspect ratio A | 40 | 90 | 3 | 9 | — |
| Original physical properties | Young's modulus [MPa] | 85 | 162 | 680 | 92 | 5.0 |
| | Permeation × 10$^{-12}$ [cc · cm/cm$^2$ · sec · cmHg] | 14.2 | 9.5 | 1.0 | 39.6 | — |
| | HFC134a permeation [mg · mm/24 hr · cm$^2$] | 0.280 | 0.260 | 0.092 | 1.160 | 9.0 |
| Hose | Gas permeation [gf/m/72 hr] | 2.3 | 2.2 | 0.8 | 8.8 | 28.1 |
| | Impulse durability [10,000X] | Broken off at 200,000X | Broken off at 200,000X | Crack, break at 35,000X | Broken off at 200,000X | Broken off at 200,000X |

[a]Film molding conditions: Molding temperature 270[° C.], shear rate 250 [s$^{-1}$].
[b]Phase invert and flexibiity is impaired.
[c]Ratio of viscosity < 3.0, so aspect ratio is small and barrier property is impaired.

From the above results, it was confirmed that in Examples IV-1 to IV-12 simultaneously satisfying the conditions of the ratio of melt viscosities, the α value, and the aspect ratio set by the present invention, compared with Comparative Examples IV-1 to IV-13, the desired Young's modulus, gas permeation degree, and HFC134a permeation degree were achieved. Further, when the compositions of Examples IV-1 to IV-2 were used for hoses, the desired durability was obtained in all cases and extremely excellent results were shown compared with the prior art of Comparative Examples IV-1 to IV-13 in terms of the gas (air, gas) permeability.

Examples IV-13 to IV-16 and Comparative Examples IV-14 to IV-17

Further, the results of second step kneading performed in exactly the same way as in the above Examples IV-1 to IV-12 and Comparative Examples IV-1 to IV-13 except that use was made of a predetermined EVOH (ethylene vinyl alcohol copolymer thermoplastic resin) polymer as the barrier thermoplastic resin in the second step are shown in the following Table IV-9. Further, the results of hoses used in exactly the same way as shown in the above Examples IV-1 to IV-12 and Comparative Examples IV-1 to IV-13 are shown in the following Table IV-9.

TABLE IV-9

| | | | | | Second Step Kneading[a] | | | | | |
|---|---|---|---|---|---|---|---|---|---|---|
| | | Ex IV-13 | Ex IV-14 | Comp. Ex. IV-14[b] | Comp. Ex. IV-15[c] | Ex. IV-15 | Ex. IV-16 | Comp. Ex. IV-16[b] | Comp. Ex. IV-17[c] |
| Thermo-plastic elastomer | 1st step batch (1) | 80 | 50 | 10 | 80 | — | — | — | — |
| | 1st step batch (2) | — | — | — | — | 80 | 50 | 20 | — |
| Barrier resin | EVOH-(1) | 20 | 50 | 90 | — | 20 | 50 | 80 | 80 |
| | EVOH-(2) | — | — | 20 | — | — | 20 | | |
| Dispersion properties | $\eta d/\eta m$ | 3.4 | 3.4 | 3.4 | 1.2 | 3.2 | 3.2 | 3.2 | 1.1 |
| | $\alpha$ | 0.07 | 0.29 | 2.65 | 0.21 | 0.08 | 0.31 | 1.25 | 0.22 |
| | Aspect ratio A | 110 | 140 | 4 | 4 | 80 | 110 | 3 | 6 |
| Original physical properties | Young's modulus [MPa] | 80 | 95 | 900 | 83 | 85 | 98 | 810 | 110 |
| | Permeation × $10^{-12}$ [cc · cm/cm$^2$ · sec · cmHg] | 3.2 | 0.8 | 0.05 | 25.1 | 4.8 | 1.3 | 0.70 | 31.3 |
| | HFC134a permeation [mg · mm/24 hr · cm$^2$] | 0.110 | 0.070 | 0.010 | 0.510 | 0.130 | 0.100 | 0.020 | 0.720 |
| Hose | Gas permeation [gf/m/72 hr] | 1.0 | 0.6 | 0.1 | 5.1 | 1.2 | 0.9 | 0.2 | 8.0 |
| | Impulse Durability [10,000X] | Broken off at 200,000X | Broken off at 200,000X | Crack, break at 15,000X | Broken off at 200,000X | Broken off at 200,000X | Broken off at 200,000X | Crack, break at 15,000X | Broken off at 200,000X |

[a]Film molding conditions: Molding temperature 270[° C.], shear rate 250 [s$^{-1}$].
[b]Phase invert and flexibiity is impaired.
[c]Ratio of viscosity < 3.0, so aspect ratio is small and barrier property is impaired.

From the above results, it was confirmed that even with Examples IV-13 to IV-16, satisfying simultaneously the conditions of the ratio of the melt viscosities, α value, and aspect ratio of the present invention, compared with Comparative Examples IV-14 to IV-17, the desired Young's modulus, gas permeation degree, and HFC134a permeation degree could all be achieved. Further, even in the case of use of Example IV-13 to IV-16 for hoses, the required durability conditions could be satisfied and also a remarkable effect could be exhibited in terms of the gas (air and gas) permeation.

Example IV-18

In this example, the explanation is made of the fact that, in the low permeability thermoplastic elastomer composition obtained in the present invention, due to the three-way morphology of the multiple-component system blend of the rubber/matrix thermoplastic resin/barrier thermoplastic resin, the rubber was finely dispersed and the barrier thermoplastic resin formed a flat layer structure.

Figure 5A:
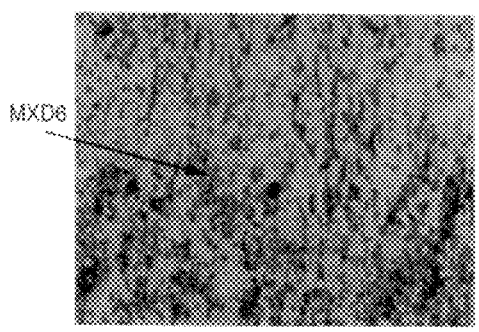
FIGS. 5(a), 5(b), and 5(c) are photomicrographs showing the morphology at sectional views in the Z-axial surface (a) and X-axial (b) and Y-axial (c) directions of a film formed using the low permeability thermoplastic elastomer composition of the present invention and FIG. 5(d) the axial directions relative to the film extrusion direction.
Figure 5B:
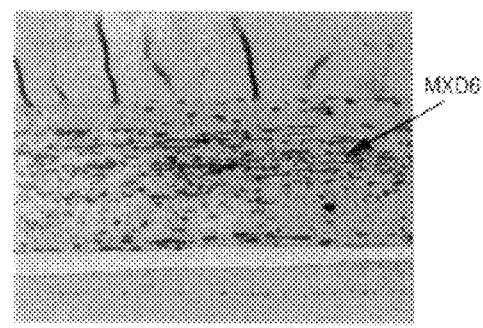
Figure 5C:
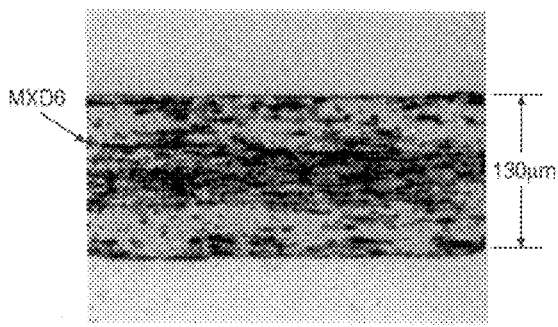
Figure 5D:
Figure 5D:

For direct observation of the morphology, use was made of an optical microscope (Nikon MICRORHOT-FXA) and a transmission type electron microscope (Hitachi Model H-800). Samples prepared in the following way were directly observed along the Z-axial section (FIG. 5(a)), X-axial section (FIG. 5(b)), and Y-axial section (FIG. 5(c)) at ×200 magnifications. FIG. 5(d) shows the X, Y and Z axial directions relative to the extrusion direction of the film sample of FIGS. 5(a)–(c). Further, the X-axial section was directly observed at ×6000 magnification. The results are shown in FIGS. 5(a), 5(b), and 5(c) and FIGS. 6(a), 6(b), 6(c), and 6(d).

Preparation of Samples:

As the first step batch, modified butyl rubber/N11 was mixed by a twin-screw extruder, then pellets of the MXD6 of the barrier thermoplastic resin were blended in and these were shaped by a single-screw extruder having a T-die into a film (thickness of 0.20 mm) (modified butyl rubber/N11/MXD6=60/28/12). The takeup speed was 3.30 m/min. The film samples were stained by iodine etc. and formed into super thin slices by a microtome etc.

Figure 6A:
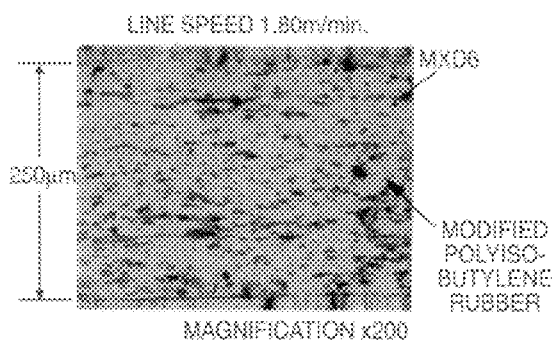
FIGS. 6(a), 6(b), 6(c), and 6(d) are photomicrographs showing the changes in morphology at sectional views in the X-axial direction in the case of changing the takeup speed (1.80 m/min and 3.30 m/min) of film formed using the low permeability thermoplastic elastomer composition of the present invention.
Figure 6B:
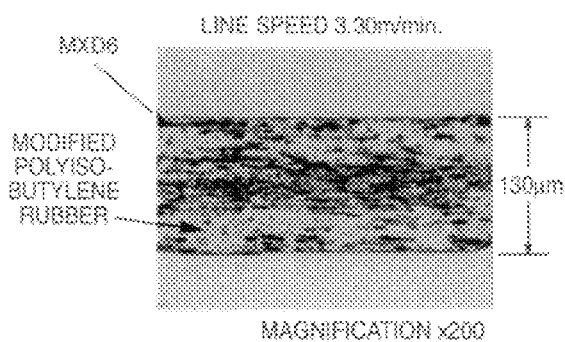
Figure 6C:
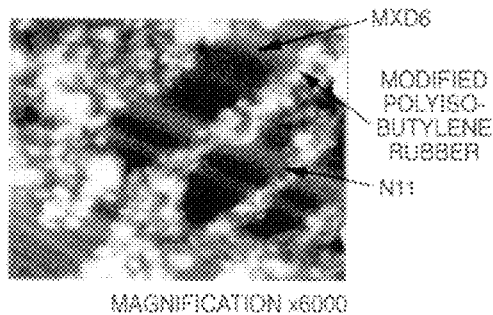
Figure 6D:
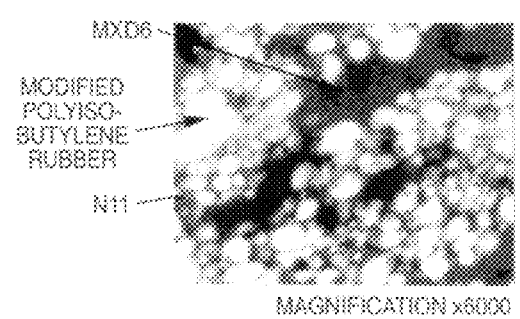

According to the micrographs of FIGS. 5(a) to 5(c) and FIGS. 6(a) to 6(d) (FIGS. 6(a) and 6(b) are X-axial sections observed at magnifications of ×200 in the case of a takeup speed of 1.80 m/min and 3.30 m/min, respectively, while FIGS. 6(c) and 6(d) are the X-axial sections FIGS. 6(a) and 6(b) enlarged to magnifications of ×6000), the low permeability thermoplastic elastomer composition obtained according to the present invention is understood to form a morphology wherein the rubber component (modified butyl rubber) is finely dispersed in the matrix thermoplastic resin component (N11) and the barrier thermoplastic resin component (MXD6) is present in a flat layer structure.

Example IV-19

In this Example, it is explained that an adjustment of the ratio of melt viscosities in the composition of the present invention and a fluctuation in the conditions of the processing by the T-die (take up speed) cause a change in the flat shape of the barrier thermoplastic resin composition and a change in the gas barrier property.

Figure 7:
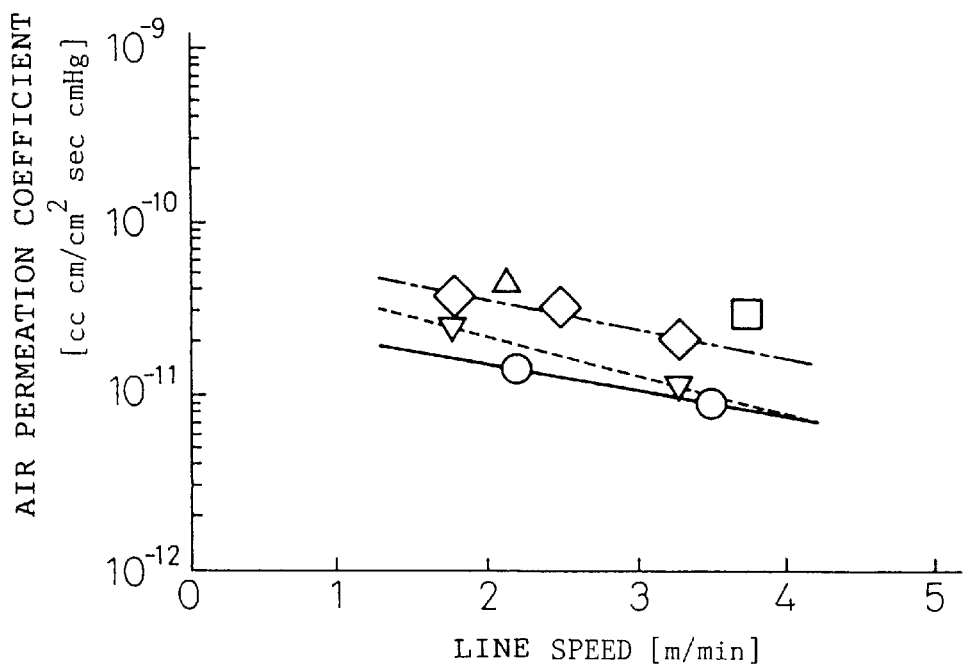
FIG. 7 is a view showing the addition of functions by control of the morphology in a low permeability thermoplastic elastomer composition of the present invention.

The relationship of the gas permeation degree in the case of a change of the type of the barrier thermoplastic resin composition in the composition of the present invention or in the case of a change in the processing (take up speed) by the T-die is shown in FIG. 7. Further, the state of the change of shape of the barrier thermoplastic resin layer in the case of using the same type of barrier thermoplastic resin composition and changing only the takeup speed during the processing is shown in the above FIG. 6.

According to these figures, the gas permeation degree differs depending on the barrier thermoplastic resin composition which is used. Further, even if the same type of barrier thermoplastic resin composition is used, if the takeup speed at the time of processing is large, the shape (flatness) of the barrier thermoplastic resin layer will change (become flatter) and the gas permeation degree will fall.

Example V

Preparation of thermoplastic elastomer composition (A)

The components shown in the following Formulation (III), that is, the thermoplastic resin component, elastomer component, and vulcanization system were used to prepare the thermoplastic elastomer composition (A).

First, a rubber use Bambury mixer was used to mix the elastomer component in the ratio of weight shown in Formulation (III), then a rubber use roll was used to form it into a sheet of a thickness of 2 mm. Suitably thereafter, this was pelletized by a rubber pelletizer for use in the production of the thermoplastic elastomer composition shown next. Under a relatively high shear rate of 250 revolutions, the thermoplastic resin component, that is, the illustrated polypropylene thermoplastic resin, was charged into a 44 mm caliber twin-screw extruder from the first charging port and melted while mixing. Next the pellets of the aforementioned elastomer component were charged from the second charging port so as to give the ratio of composition shown in Formulation (III) continuously and mixed so that the elastomer component finely dispersed in the polypropylene thermoplastic resin. Then a vulcanization system of the ratio of $\gamma$ shown was added from a third charging port, with mixing, so as to give the ratio of composition of the Formulation (III) with respect to the thermoplastic resin component and elastomer component and cause vulcanization. Suitably thereafter, the mixture was extruded in strands from the front end of the twin-screw extruder. The strands were cooled in a water tank, then pelletized by a thermoplastic resin-use pelletizer and used for mixing with the functional thermoplastic resin material.

Formulation (III). Formulation (A) of Thermoplastic Elastomer Composition

| Component | Material | Product name | Manufacturer | Composition of component | Thermoplastic elastoer formulation (A) |
|---|---|---|---|---|---|
| Thermoplastic resin component | Polypropylene (PP) | MA710 | Tokuroma K.K. | 100 | 45 |
| Elastomer component | EPDM | Mitsui EPT 4045 | Mitsui Petrochemical Industries | 100 | 55 |
| | HAF carbon black | Seast N | Tokai Carbon | 60 | |
| | Paraffin family softening agent | Sunpar 2280 | Japan San-Petrochemicals | 20 | 5 |
| | ZnO | ZnO JIS #3 | | 1 | |
| | Stearic acid | | | | |
| Vulcanization system | Powdered sulfur | | | 0.5 | 1.04 |
| | Promoter BZ | Nocceler BZ | Ouchi Shinko Chemical Industrial | 1.0 | |
| | Promoter TRA | SANCELER TRA-C | Sanshin Chemical Industrial | 0.5 | |
| | Promoter | Nocceler | Ouchi | 0.5 | |

Formulation (III). Formulation (A) of Thermoplastic Elastomer Composition -continued

| Component | Material | Product name | Manufacturer | Composition of component | Thermoplastic elastoer formulation (A) |
|---|---|---|---|---|---|
| | TT | TT-PO | Shinko Chemical Industrial | | |
| | Promoter CZ | Nocceler CZ-G | Ouchi Shinko Chemical Industrial | 1.0 | |

Preparation of Functional Thermoplastic Elastomer Composition

Pellets of the thermoplastic elastomer composition obtained above and pellets of the modified polyester adhesive thermoplastic resin shown in Table V-1 were blended as the functional thermoplastic resin component in advance in a ratio of weight shown in Table V-2. The blended pellets were charged into a 40 mm caliber single-screw kneader and extruder from the charging port and mixed at a relatively low shear rate of 40 rpm. Suitably thereafter, they were extruded as strands from the die provided at the front end of the single-screw kneader and extruder. The strands were water-cooled, then pelletized by a pelletizer for thermoplastic resin and used for measurement of the compression set.

Preparation of Thin Film Sheet

When preparing the thin film sheet, a T-die attached to the front end of the above single-screw extruder was used to prepare a film of a thickness of 150 $\mu$m and a width of 350 mm. The film obtained was measured as to its air permeation coefficient, fluorocarbon gas permeation coefficient, elongation at break, and peeling strength with the rubber material or textile material to be laminated with.

Preparation of Rubber Hose

Pellets of the thermoplastic elastomer composition obtained above were charged into a single-screw extruder for thermoplastic resin having a cross-head construction. The thermoplastic elastomer composition was extruded on a nylon 11 mandrel of an outer diameter of 11 mm coated in advance with a release agent to form a tube having inner diameter of 11.2 mm and a thickness of 150 $\mu$m. Suitably thereafter, an extruder for rubber having a cross-head construction was used to extrude over the thermoplastic elastomer composition on the above nylon 11 mandrel an unvulcanized brominated butyl rubber composition of the following Formulation (III) to a thickness of 2.0 mm. On this shaped article was further braided by a braiding machine a polyester fiber (made by Toray Corp., Tetron, 1500d/2) reinforcing yarn given RFL dip treatment to form a reinforcing layer. On this reinforcing layer, further, the unvulcanized brominated butyl rubber composition of the Formulation (III) was extruded using the extruder for rubber having a cross-head construction to a thickness of 1.5 mm to form an outer cover. (see FIG. 4).

The unvulcanized hose assembly was double wrapped by nylon cloth wrapping tape and press vulcanized on a vulcanization drum at 153° C.×60 minutes.

After the vulcanization, the wrapping tape was removed and further the mandrel pulled out to obtain the test hose.

| Formulation (IV) of Rubber Composition parts by weight | | |
|---|---|---|
| Brominated butyl rubber | 100 | Exxon Bromobutyl 2244, Exxon Chemical Corp. |
| Carbon black HAF | 30 | Seast N, Tokai Carbon |
| ZnO | 3 | Zinc oxide JIS No. 3, Seido Chemical Industry |
| Sulfur | 2 | Powdered sulfur, Karuizawa Refinery |
| DM | 1 | Noccelar DM, Ouchi Shinko Chemical Industrial |
| Stearic acid | 1 | Beads Stearic Acid NY, Nihon Yushi |

On the other hand, as a Comparative Example, a rubber hose of the above hose structure not having the functional thermoplastic elastomer composition of the thickness of 150 µm of the present invention in the inner layer of the inner tube was prepared in the same dimensions, except for the film, and similarly measured for the impulse durability of the hose. The compositions and properties of the hoses obtained are shown in the later mentioned Table V-3, Table V-4, and Table V-6.

Preparation of Hose Made Only of Functional Thermoplastic Elastomer Composition

Using pellets of the adhesive thermoplastic elastomer prepared based on a thermoplastic elastomer composition comprised of the above acryl rubber/polyester thermoplastic resin and EPDM/polypropylene thermoplastic resin and a cross-head construction thermoplastic resin use extruder, an inner tube was extruded to a thickness of 2.0 mm on a mandrel of the same material and same dimensions as the above rubber hose. On this shaped article was braided a reinforcing yarn of non-dip treated polyester fiber (made by Toray Corp., Tetron, 1550 d/2) using a braiding machine to form a reinforcing layer. On this reinforcing layer was further extruded, using an extruder for thermoplastic resin, a functional (adhesive) thermoplastic resin composition of a thickness of 1.5 mm shown in Table V-4 as the outer cover material. Suitably thereafter, the mandrel was pulled out and the result used for the evaluation of the durability of the hose and the bonding force between the inner tube and outer cover and the reinforcing layer. The results are shown in Table V-4.

The methods of evaluation used in the following Examples were as follows:

Measurement of Melt Viscosity

Here, the melt viscosity means the melt viscosity of any temperature or component at the time of mixing. The melt viscosity of each polymer material is dependent on the temperature, the shear rate ($sec^{-1}$), and the shear stress, so the stress and shear rate of the polymer material at any temperature in the molten state capable of flowing through a small tube, in particular, the temperature region at the time of mixing, are measured and the melt viscosity is measured by the following formula (6):

$$\eta = \sigma/\dot{\gamma} \tag{6}$$

(Here, σ: shear stress, $\dot{\gamma}$: shear rate)

Note that, the melt viscosity is measured by using a Capillary Rheometer Capillograph 1C made by Toyo Seiki.

Peeling Strength Test

This was performed based on JIS K6256 "Test Method for Adhesion of Vulcanized Rubber".

Test Method (Evaluation Method) I

In the functional thermoplastic elastomer compositions based on the EPDM/PP or acryl rubber/copolyester thermoplastic elastomer compositions of Examples V-1 to V-7 and Comparative Examples V-1 to V-4, the compositions of the Examples and Comparative Examples aimed at imparting adhesiveness with the reinforcing layer were formed into sheets by T-die in the afore-mentioned manner. The sheets were superposed on polyester flat weave sailcloth (made by Toray, comprised of Tetron 1550d/2), then heat fused with the same by a press (press temperature: 200° C., press time: 1 minute, press pressure: 1 to 2 kg/cm³). The resultant laminates were cut into short strips of 25 mm width and 150 mm length which were then used for a 180 degree peeling test at a peeling rate of 50 mm/minute.

Test Method II

In the case of multiple layers of rubber of a hose, since the imparting of adhesiveness to the rubber composition becomes an issue, bonding and peeling tests were performed on the following rubber.

The compositions of Example V-8 and Comparative Example V-5 composition were used to similarly form by a T-die a film having a thickness of 150 µm. On the other hand, a composition of the above rubber composition (IV) (hose rubber composition) mixed in advance by a Bambury mixer was formed into a sheet of a thickness of 2.3 mm by a rubber roll. The bonded sample of the film was press vulcanized at 185° C. for 15 minutes by a press. The bonded sample with the hose rubber composition (IV) was press vulcanized at 183° C.×60 minutes by a press. These were subjected to a 180 degree peeling test under the same conditions as the above.

Measurement of Elongation at Break ($E_B\%$)

The above T-die formed film was used and punched into a dumbbell shape in the direction of flow to form a test piece which was used for measurement based on JIS K6251.

Measurement of Compression-Set (C-set)

For the samples of the Examples and Comparative Examples, as explained above, pellets of a single-screw kneader were used according to JIS K6262 to form predetermined shapes by a mold for preparation of compression-set samples at a temperature of 40° C. higher than the melting temperature of the functional thermoplastic elastomer composition. These were cooled to obtain compression set samples of predetermined dimensions. Using these samples, the compression-set at 25% compression, 100° C., and 72 hours was measured.

Impulse Test of Hose

Metal fittings were attached to the two ends of a rubber hose having a thin film of an inner layer of an inner tube of the functional plastic thermoplastic resin prepared above and a hose composed of only the functional thermoplastic resin, then an impulse durability test was conducted on the hoses under the following conditions:

Test conditions: The test was performed based on SAE J188 Type 1.

(Oil: Automulti Oil (Idemitsu), 120° C.)

An impulse was applied at a pressure of 210 $kgf/cm^2$ 1,000,000 times to confirm there was no abnormality such as detachment of metal fittings or breakage of hose.

Examples V-1 to V-5 and Comparative Examples V-1 to V-3

The viscosities and the physical properties of the thermoplastic elastomer composition (A) and the functional (adhesive) thermoplastic resin component used in Examples V-1 to V-5 and Comparative Examples V-1 to V3 prepared above are shown in Table V-1. Further, test pieces for use in the tests were prepared as explained above from the functional (adhesive) thermoplastic elastomer compositions of the predetermined weight ratios of polymers of Table V-1. The test results are shown in Table V-2.

with a similar $\Delta SP$ formulation, when the $\alpha$ value is larger than 1.0, the adhesive thermoplastic resin component is not positioned at the surface (Comparative Example V-1). Further, even if the condition that the $\alpha$ value be smaller than 1.0 is satisfied, if the $\Delta SP$ is smaller than 1 and the solubility

TABLE V-1

| | Polymer Used | | | |
|---|---|---|---|---|
| | Composition | Viscosity [poise][a] | $E_B$ [%] | C-set[f] |
| Thermoplastic elastomer composition (A) | EPDM/PP[a] | 6300 | 410 | 45 |
| Functional (bondable) thermoplastic resin | Polyester adhesive resin[a] | 1800 | 350 | 98 |
| | Polyester adhesive resin[c] | 2600 | 650 | 98 |
| | Olefin adhesive resin[d] | 1400 | 600 | 100 |

(Notes)
[a]EPDM/PP = 55/45 (EPDM: Ethylene-propylene-diene copolymer, PP: Polypropylene resin)
[b]VYLON GM400 (Toyobo)
[c]VYLON GM990 (Toyobo)
[d]ADMER QB540 (Mitsui Petrochemical Industries) (maleic anhydride modified polypropylene)
[f]Shear rate 200 [sec$^{-1}$] at 200[° C.] (conditions of mixing temperature)

TABLE V-2

| | | Bonding of EPDM/PP Functional Thermoplastic Elastomer Composition With Reinforcing Yarn | | | | | | | |
|---|---|---|---|---|---|---|---|---|---|
| Component | Formulation | Ex. V-1 | Ex. V-2 | Comp. Ex. V-1 | Ex. V-3 | Ex. V-4 | Ex. V-5 | Comp. Ex. V-2 | Comp. Ex. V-3 |
| (A) Thermoplastic elastomer composition | EPDM/PP[a] | 67 | 70 | 78 | 67 | 70 | 56 | 80 | 60 |
| (B) Functional thermoplastic resin | Polyeter adhesive resin[b] | 30 | 30 | 20 | — | — | — | — | — |
| | Polyester adhesive resin[c] | — | — | — | 30 | 30 | 40 | — | — |
| (C) Solubilizing agent | Olefin adhesive resin[d] | 3 | — | 2 | 3 | — | 4 | 20 | 40 |
| $\Delta SP$ | | 2.50 | 2.50 | 2.50 | 2.46 | 2.46 | 2.46 | 0.72 | 0.72 |
| $\alpha$ vaue | | 0.66 | 0.67 | 1.11 | 0.96 | 0.96 | 0.60 | 0.88 | 0.33 |
| Bonding force | Peeling strength [N/mm] | 2.40 | 2.40 | 0.10 | 2.50 | 2.46 | 2.46 | 0.10 | 0.30 |
| Physical properties | $E_B$ (%) | 400 | 70 | 450 | 460 | 80 | 480 | 430 | 530 |
| | C-set 100° C. × 72 hr | 50 | 50 | 48 | 52 | 51 | 85 | 48 | 90 |

(Notes)
[a]EPDM/PP = 55/45: specific gravity 0.96
[b]VYLON GM400 (Toyobo): specific gravity 1.02
[c]VYLON GM990 (Toyobo): specific gravity 1.04
[d]Nisseki N Polymer A-1600 (Nippon Petrochemicals)

From the results of Table V-2, it is learned that, in Examples V-1 to V-5 of the present invention, satisfaction of the requirements of the difference of the values of the solubility parameters ($\Delta SP$) and the volume fraction of the functional thermoplastic resin material (adhesive thermoplastic resin material) of the value of formula (1) prescribed in the present invention was due to the added adhesive thermoplastic resin component concentrated at the surface portion due to the processing, and therefore, an excellent bond was obtained with the reinforcing fibers despite no bonding treatment being performed. On the other hand, even with a similar $\Delta SP$ formulation, when the $\alpha$ value is larger is too good, it similarly will not be positioned at the surface (Comparative Examples V-2 and V-3) and a sufficient functionality (adhesiveness) cannot be imparted. Further, as a more preferable mode, when desiring to obtain a functional (adhesive) thermoplastic elastomer composition having excellent physical properties in addition to maintaining an excellent bonding force, it is clear that it is best to add an olefin thermoplastic resin as a compatibilizer after the above requirements are satisfied (clear from a comparison of Examples V-1 and V-2 and Examples V-3 and V-4).

Examples V-6 and V-7 and Comparative Example V-4

The thermoplastic elastomer compositions were processed by the same method using 3 parts of stearic acid and 5 parts of butane tetracarboxylic acid to prepare the ACM/COPE thermoplastic elastomer compositions shown in the following Table V-3.

Using this composition as the inner tube and the method shown in the above process of production, hoses were prepared composed of only the functional thermoplastic elastomer composition. The results of the bonding force of the hoses obtained and the hose impulse durability are shown in Table V-4.

TABLE V-3

Hose Materials

|  | Composition | Viscosity [poise] | $E_B$ [%] | C-set |
|---|---|---|---|---|
| Thermoplastic elastomer composition (A) | EPDM/PP | 6300 | 410 | 45 |
| Thermoplastic elastomer composition (B) | ACM/COPE | 6200 | 360 | 43 |
| Bondable thermoplastic resin | Polyester adhesive resin (c) | 1800 | 350 | 98 |
|  | Polyolefin adhesive resin (b) | 1400 | 600 | 100 |

(Notes)
(A) EPDM/PP = 55/45
(B) ACM/COPE = 70/30 (ACM: AR-31 (Nippon Zeon), COPE: Hytrel 5557 (Duk pont-Toray Co. LTD.))
(b) ADMER QB540 (Mitsui Peterochemical Industries)
(c) VYLON GM400 (Toyobo)

TABLE V-4

Properties of Hose

| Hose | Ex. V-6 | Ex. V-7 | Comp. Ex. V-4 |
|---|---|---|---|
| Inner tube material | (B)/(b)/(c) = 67/30/3 | (A)/(b)/(c) = 67/30/3 | (A)/(b)/(c) = 67/30/3 |
| Reinforcing layer | Untreated polyester | Untreated polyester | Untreated polyester |
| Outer tube material | (A)/(b)/(c) = 67/3/30 (Ex. 1) | (A)/(c) = 70/30 (Ex. 2) | (A)/(b)/(c) = 78/2/20 (Comp. Ex. 1) |
| Inner tube/YB bonding [N/m] | 2.31 | 2.31 | 2.32 |
| Outer tube/YB bonding [N/m] | 2.26 | 2.23 | 0.03 |
| Hose durability (target: clearing 200,000X) | Good, broken off after 1,000,000X | Good, outer tube breaks at 280,000X | Poor, reinforcing layer breaks at 20,000X |

As clear from a comparison of the results of the above Examples V-6 and V-7 and the Comparative Example, when an olefin adhesive thermoplastic resin is not added as a chemically soluble compatibilizer in this combination in the material of the outer cover of the hose construction, while the adhesiveness can be secured and is good, the physical properties are relatively weak and the outer cover breaks, so the durability falls. While the 200,000× targeted as a condition of the impulse durability is cleared, the durability does decline (Example V-7). On the other hand, even if the compatibilizer is used, due to the ΔSP value or the α value, the adhesive thermoplastic resin does not concentrate at the surface and a bonding power is not obtained meaning that, while the physical properties may be good, the durability of the hose is poor and therefore it cannot withstand use (Comparative Example V-4). As compared with this, in the composition described in Example V-6, the results of the bonding force and the impulse durability test are both extremely good.

Example V-8 and Comparative Example V-5

Using the same technique as with the thermoplastic elastomer compositions (A) and (B), a thermoplastic elastomer composition (C) used in these Examples was prepared from the composition shown in Table V-5. In this case, as the dynamic vulcanization system for the modified butyl elastomer, 0.5 part by weight of zinc oxide, 2.0 parts by weight of stearic acid, and 1.0 part by weight of zinc stearate were added with respect to 100 parts by weight of elastomer.

Further, a polyolefin adhesive thermoplastic resin having the properties shown in Table V-5 was used as a functional thermoplastic resin material to prepare a functional (adhesive) thermoplastic elastomer composition by the afore-mentioned method.

Next, the afore-mentioned method was used to prepare hoses having a thin layer of a functional (bonding) thermoplastic elastomer composition at its innermost layer using the compositions shown in the following Example V-8 and Comparative Example V-5. An impulse durability test was conducted on these hoses. The results are also shown in Table V-6.

TABLE V-5

Material of Inner Liner

| Component | Composition | Viscosity (poise) |
|---|---|---|
| Thermoplastic elastomer composition (C) | Modified IIR/N11 = 70/30* | 5200 |
| Polyolefin adhesive resin | (b) | 1500 |
| | (c) | 3300 |

*Modified film: Brominated p-methylstyrene-isobutylene copolymer
Modified polyisobutylene rubber (X-IPMS) (p-methylstyrene content: 5.0 wt %, bromine content: 1.2 wt %, $ML_{1+8}$ (125° C.): 45)
N11: BMNO TL (Toray)
(b) Nisseki N Polymer: A-1600 (Nippon Petrochemicals)
(c) REXPEARL: RA3150 (Nippon Petrochemicals)

TABLE V-6

Properties of Hose

| | | Composition | Ex. V-8 | Comp. Ex. V-5 |
|---|---|---|---|---|
| Inner liner material | | Thermoplastic elastomer composition (C) | 70 | 70 |
| | | Polyolefin family adhesive resin (b) | 30 | — |
| | | Polyolefin family adhesive resin (c) | — | 30 |
| Material properties | Peeling strength with rubber composition [N/mm] | Rubber composition (II) | 1.6 | 0.1 |
| | | Rubber composition (III) | 1.8 | 0.05 |
| | ΔSP | | 4.2 | 4.2 |
| | α | | 0.67 | 1.48 |
| Hose properties | Impulse durability test | | Broken off at 1,000,000X | Hose breaks at 20,000X. Rubber inner tube breaks due to cracks. |

As clear from the results of the above Table V-6, even in combinations different from the past, e.g., the modified IIR/N11/polyolefin adhesive thermoplastic resin, in so far as the predetermined conditions of the ΔSP value and the α value are both satisfied, an excellent bonding with a rubber composition is obtained due to the concentration of the adhesive thermoplastic resin at the surface of the film layer and further excellent results were obtained in durability tests of the hoses.

We claim:

1. A thermoplastic elastomer composition comprising:
   i) from 15 to 80 parts by weight of a polyamide thermoplastic resin as component A;
   ii) from 20 to 85 parts by weight of a rubber composition as component B, said rubber composition containing a copolymer rubber composed of a copolymer of a $C_4$ to $C_7$ isomonoolefin and a p-alkylstyrene, where at least a part of the p-alkylstyrene unit portions thereof have a halogen atom; and
   iii) a cross-linking agent,
      wherein component A forms a continuous phase and at least part of component B is dispersed in component A as a dispersed phase and at least part of the dispersed phase is cross-linked by the cross-linking agent.

2. A process for producing the thermoplastic elastomer composition of claim 1 comprising:
   mixing component A with component B at least at the melting temperature of component A, then
   adding the cross-linking agent during the mixing to cross-link component B.

3. A hose comprising an inner tube, a reinforcing layer, and an outer cover, wherein at least part of the inner tube and/or part of the outer cover is formed from the thermoplastic elastomer composition of claim 1.

4. The thermoplastic elastomer composition of claim 1, wherein component B has a p-alkylstyrene content of 5.5 to 25% by weight, a halogen content of at least 1.0% by weight, and a Mooney viscosity $ML_{1+8}$ (125° C.) of at least 30 and component A has a gas permeation coefficient of not more than 2 mg·mm/24 hr·cm².

5. A low permeability hose comprising an inner tube, a reinforcing layer, and an outer cover wherein at least one of the inner tube and outer cover of the hose is formed from the thermoplastic elastomer composition of claim 4.

6. A thermoplastic elastomer composition of claim 1, wherein component A has an air permeation coefficient of not more than $25 \times 10^{-12}$ cc·cm/cm²·sec·cmHg and component B has an air permeation coefficient of not more than $1.0 \times 10^{-10}$ cc·cm/cm²sec·cmHg, and wherein component A has a melt viscosity ($\eta_m$), and component B has a melt viscosity ($\eta_d$), and the difference in solubility parameters of component A and component B at a kneading temperature satisfy the following relationship (1):

$$\frac{a|\Delta SP|+b}{\phi_m} < \frac{\eta_d}{\eta_m} \tag{1}$$

where ΔSP is the difference in solubility parameters of component B and component A;
$\Phi_m$ is the volume fraction of component A; and
a=−0.0518, and b=0.90.

7. The thermoplastic elastomer composition of claim 1, wherein component A has a gas permeation coefficient of not more than 5.0 mg·mm/24 hr·cm² and component B has a gas permeation coefficient of not more than 30.0 mg·mm/24 hr·cm², and wherein component A has a melt viscosity ($\eta_m$), and component B has a melt viscosity ($\eta_d$), and the difference in solubility parameters of component A and component B at a kneading temperature satisfy the following relationship (1):

$$\frac{a|\Delta SP|+b}{\phi_m} < \frac{\eta_d}{\eta_m} \quad (1)$$

where ΔSP is the difference in solubility parameters of component B and component A;

$\Phi_m$ is the volume fraction of component A; and a=−0.0518, and b=0.90.

8. A hose containing the thermoplastic elastomer composition of claim 7 as a gas barrier layer.

9. A low permeability thermoplastic elastomer composition comprising the thermoplastic elastomer composition of claim 1 and a barrier thermoplastic resin composition, the thermoplastic elastomer composition having a phase structure wherein the barrier thermoplastic resin composition is dispersed in the form of a layer in the thermoplastic elastomer composition.

10. The low permeability thermoplastic elastomer composition of claim 9, wherein the thermoplastic resin component A forming the continuous phase has an air permeation coefficient of at least 5 cm³·cm/cm²·sec·cmHg or a HFC134a freon gas permeation coefficient of at least 5 mg·mm/24 hr·cm² and the barrier thermoplastic resin composition has an air permeation coefficient of not more than 5 cm³·cm/cm²·sec·cmHg or a HFC134a freon gas permeation coefficient of not more than 5 mg·mm/24hr·cm².

11. The low permeability thermoplastic elastomer composition of claim 9 or 10 wherein the volume fraction and the melt viscosity of the thermoplastic elastomer composition comprising component A as the continuous phase and component B as the dispersed phase, and the barrier thermoplastic resin composition satisfy the following formula (2) and formula (3):

$$\eta_d / \eta_m > 3.0 \quad (2)$$

$$\alpha = \frac{\phi_d}{\phi_m} \times \frac{\eta_m}{\eta_d} < 1.0 \quad (3)$$

where, $\Phi_d$ is the volume fraction of the barrier thermoplastic resin composition;

$\eta_d$ is the melt viscosity of the barrier thermoplastic resin composition;

$\Phi_m$ is the volume fraction of the thermoplastic elastomer composition comprising component A as the continuous phase and component B as the dispersed phase; and $\eta_m$ is the melt viscosity of the thermoplastic elastomer composition comprising component A as the continuous phase and the rubber component B as the dispersed phase.

12. The low permeability thermoplastic elastomer composition of claim 9 or 10, wherein the barrier thermoplastic resin composition is at least one thermoplastic resin selected from the group consisting of polyamide thermoplastic resins, polyester thermoplastic resins, vinyl thermoplastic resins, and polyvinylidene chloride thermoplastic resins.

13. The low permeability thermoplastic elastomer composition of claim 9 or 10, wherein the layer of the barrier thermoplastic resin composition has a flatness, which is an aspect ratio A in the range of 10 to 500, where A=a/b and a is the length of the long axis and b is the length of the short axis of the layer.

14. A process for producing the low permeability thermoplastic elastomer composition of claim 9 comprising the steps of:

preparing the thermoplastic elastomer composition of the component A and component B and then mixing the barrier thermoplastic resin composition with the thermoplastic elastomer composition as a second step.

15. A low permeability hose comprising an inner tube and an outer cover, wherein at least one of the inner tube and outer cover is formed from the composition of claim 9 or 10.

16. A functional thermoplastic elastomer composition comprising:

the thermoplastic elastomer composition of claim 1 as component I, and an insoluble functional thermoplastic resin as component II blended into component I, said component II having a difference in solubility parameter (SP value) based upon component I of more than 1.0, where the following formula (4) is satisfied:

$$\alpha = \frac{\phi_A}{\phi_B} \times \frac{\eta_B}{\eta_A} < 1.0 \quad (4)$$

where, $\Phi_A$ is the volume fraction of component I;

$\Phi_B$ is the volume fraction of component II;

$\eta_A$ is the melt viscosity of component I;

$\eta_B$ is the melt viscosity of component II; and the volume fraction of component II based on the total of components I and II is from 1 to 40%.

17. The functional thermoplastic elastomer composition of claim 16, where a solubilizing component III is further included in an amount of from 0.5 to 10% by weight based upon the total weight of component I and component II.

18. The functional thermoplastic elastomer composition of claim 16 or 17, wherein the insoluble functional thermoplastic resin component II is an adhesive thermoplastic resin.

19. A hose comprising an inner tube having an inner and an outer layer, an outer cover and a reinforcing layer adjoining the outer cover, where at least one member of the outer cover of the hose, the inner layer of the inner tube, the outer layer of the inner tube, and the reinforcing layer is formed from the composition of claim 18.

20. A process for producing the functional thermoplastic elastomer composition of claim 16 comprising the steps of:

preparing the thermoplastic elastomer composition as component I, then mixing in the insoluble functional thermoplastic resin component II, and then processing the resultant mixture into a sheet or tube while applying shear stress so as to make the insoluble functional thermoplastic resin component II be positioned at a surface portion thereof.

* * * * *

UNITED STATES PATENT AND TRADEMARK OFFICE
CERTIFICATE OF CORRECTION

PATENT NO. : 5,910,544
DATED : June 8, 1999
INVENTOR(S) : Osamu OZAWA et al.

It is certified that error appears in the above-identified patent and that said Letters Patent is hereby corrected as shown below:

Title Page, Item [86], in the PCT Number, "PCT/KP96/03215" should read --PCT/JP96/03215--.

Signed and Sealed this

Twenty-first Day of December, 1999

Attest:

Q. TODD DICKINSON

Attesting Officer     Acting Commissioner of Patents and Trademarks